May 4, 1943.    H. L. KRUM    2,317,995
SELECTIVE SIGNALING SYSTEM AND APPARATUS
Filed Jan. 22, 1931    26 Sheets-Sheet 1
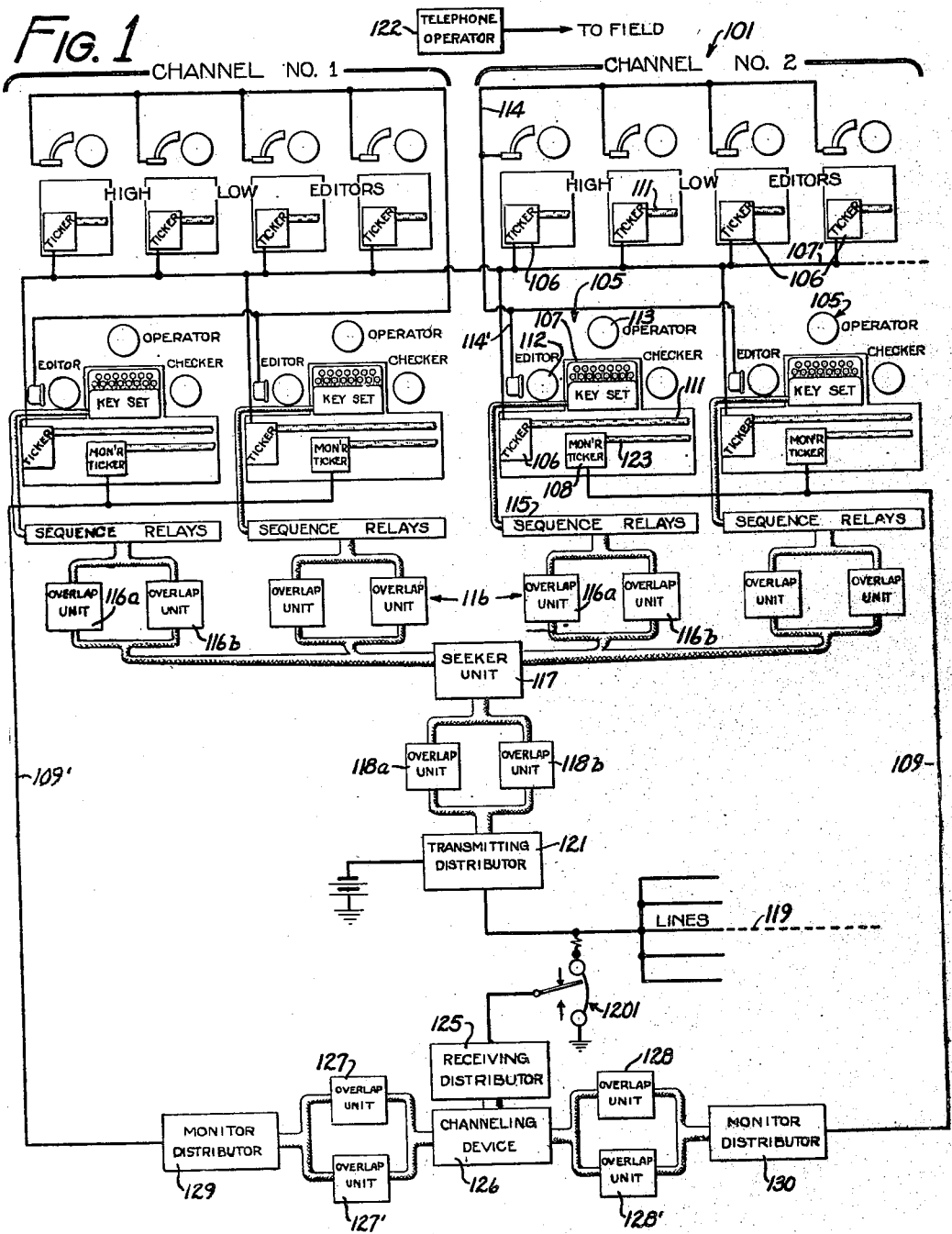
INVENTOR
HOWARD L. KRUM
BY Strauch & Hoffman
ATTORNEYS

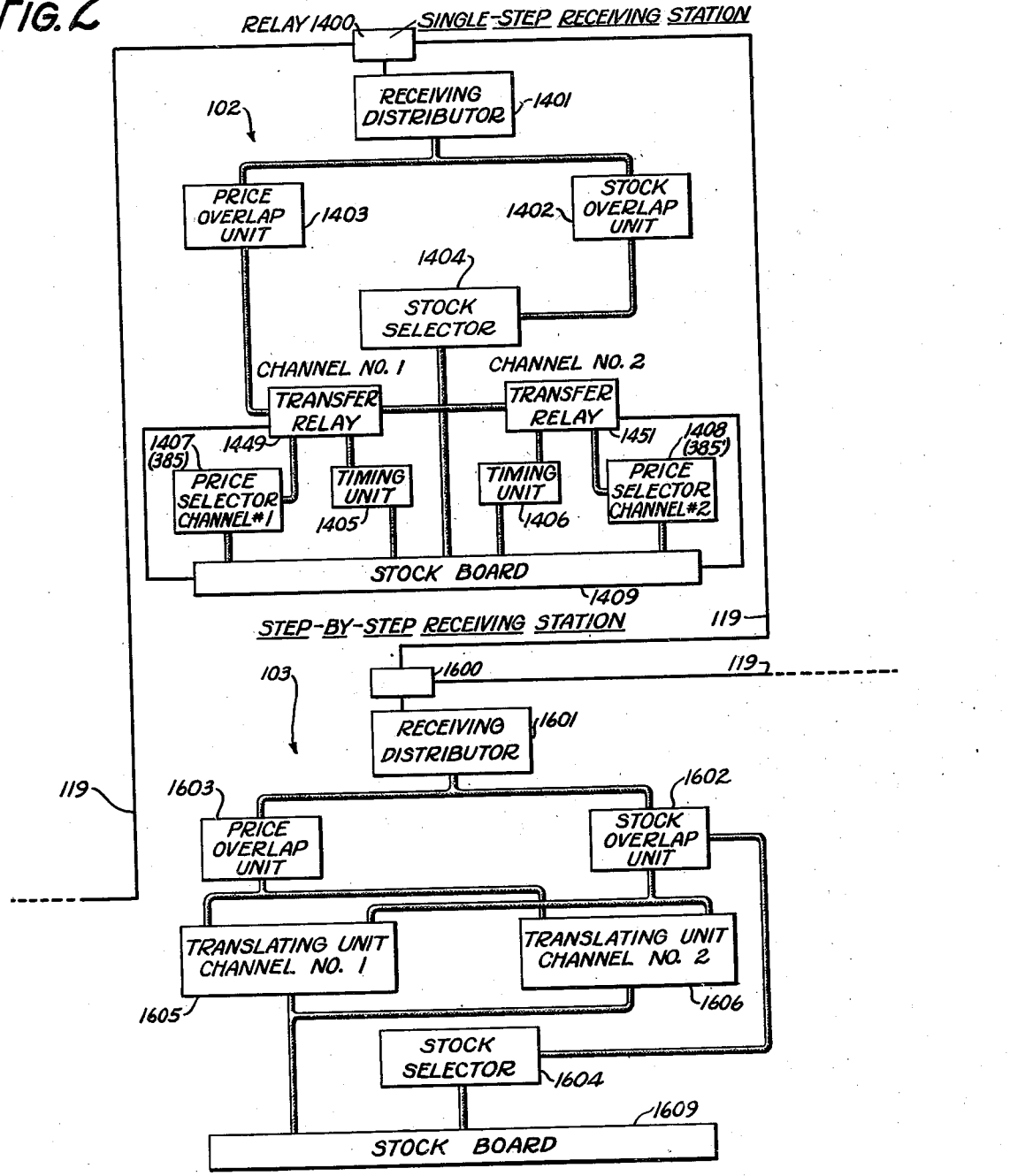

May 4, 1943.   H. L. KRUM   2,317,995
SELECTIVE SIGNALING SYSTEM AND APPARATUS
Filed Jan. 22, 1931   26 Sheets-Sheet 3
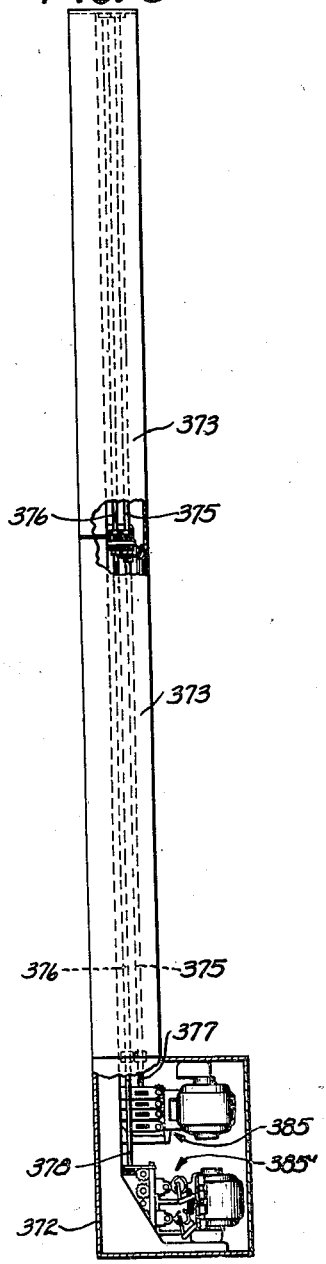
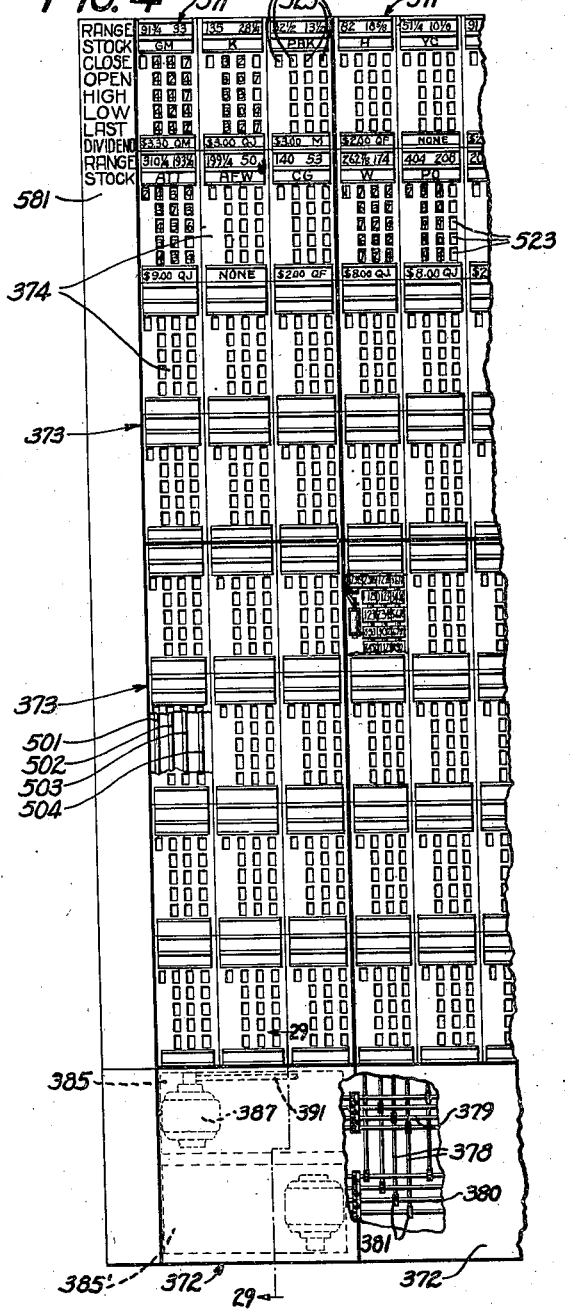
INVENTOR
HOWARD L. KRUM
BY
ATTORNEYS May 4, 1943.  H. L. KRUM  2,317,995
SELECTIVE SIGNALING SYSTEM AND APPARATUS
Filed Jan. 22, 1931   26 Sheets-Sheet 4

FIG. 5 — LETTERS SIGNALS
FIG. 6 — MONITOR TICKER TYPEWHEEL
FIG. 7 — FIGURES SIGNALS
FIG. 8 — RANGE

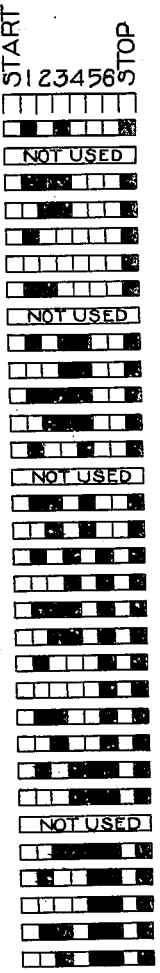
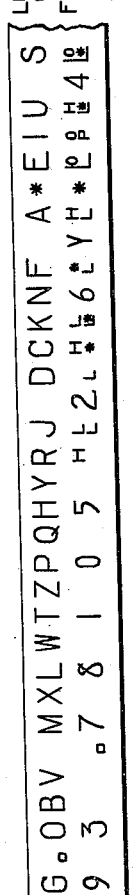
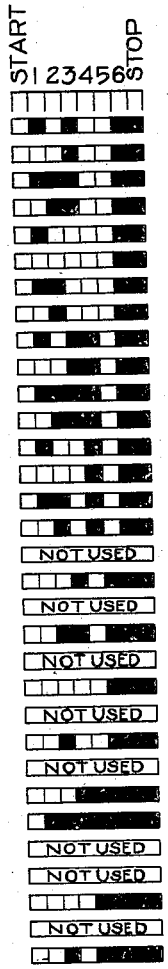
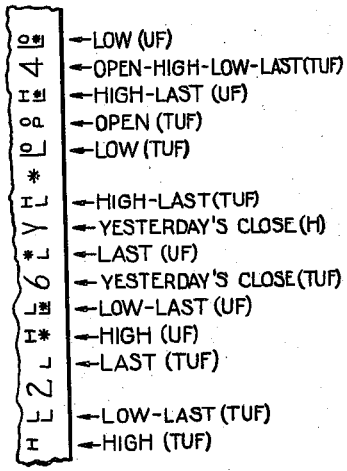

FIG. 8 labels:
- LOW (UF)
- OPEN-HIGH-LOW-LAST (TUF)
- HIGH-LAST (UF)
- OPEN (TUF)
- LOW (TUF)
- HIGH-LAST (TUF)
- YESTERDAY'S CLOSE (H)
- LAST (UF)
- YESTERDAY'S CLOSE (TUF)
- LOW-LAST (UF)
- HIGH (UF)
- LAST (TUF)
- LOW-LAST (TUF)
- HIGH (TUF)

FIG. 9
LEGEND
H – HUNDREDS
T – TENS
U – UNITS
F – FRACTIONS

FIG. 10
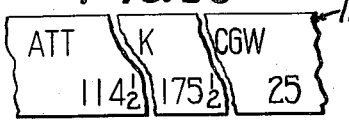
TAPE FROM STOCK TICKER

FIG. 11
TAPE FROM MONITOR TICKER

INVENTOR
HOWARD L. KRUM
BY Strauch & Hoffman
ATTORNEYS

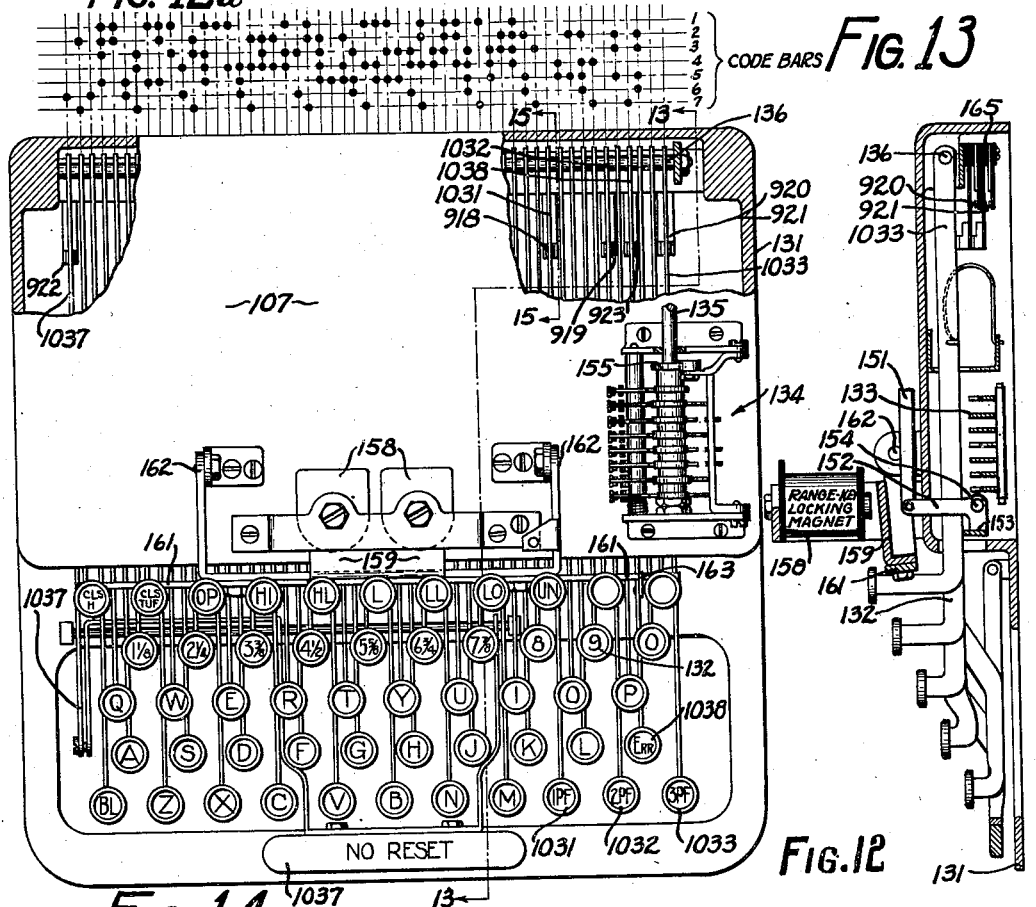

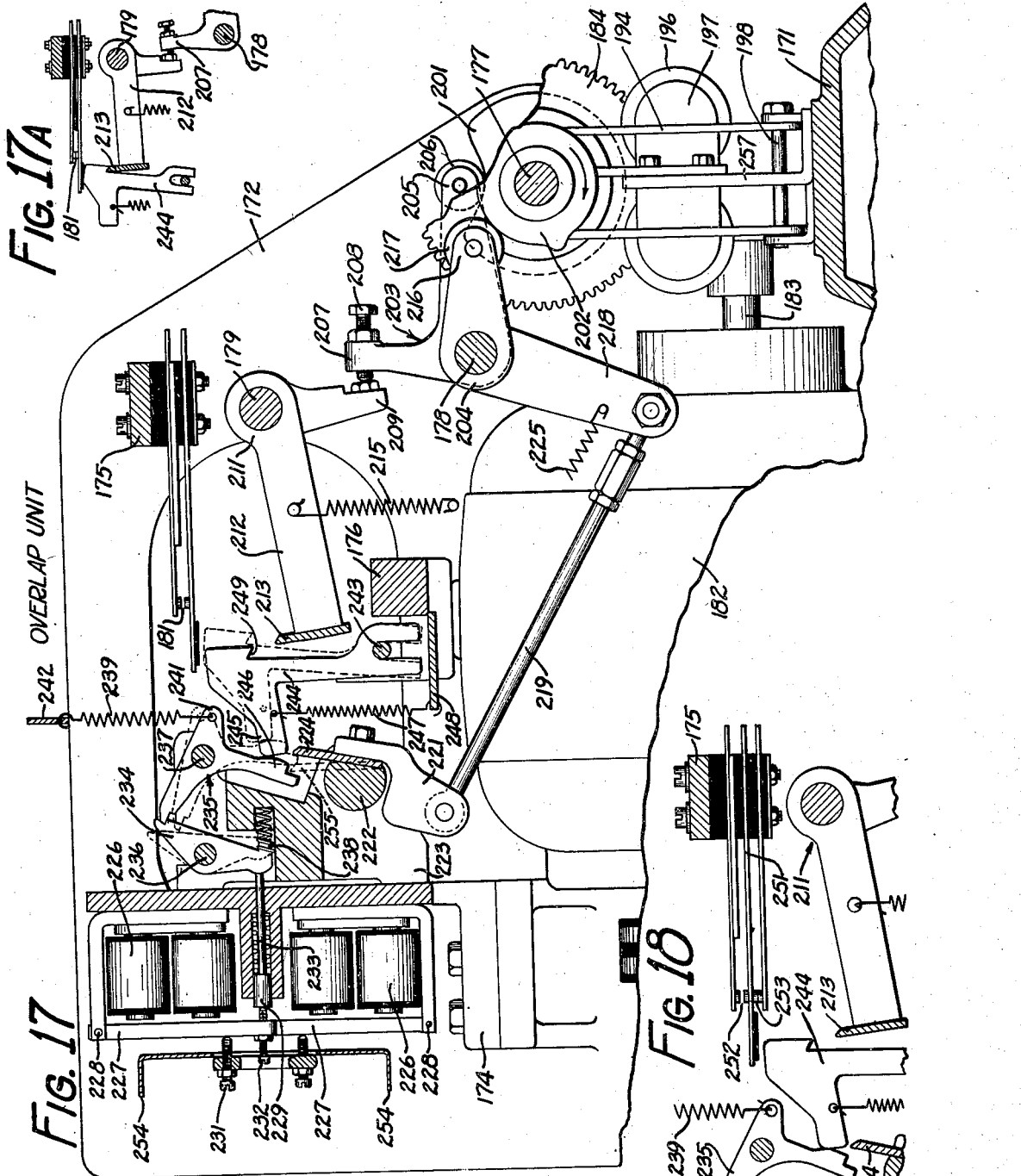

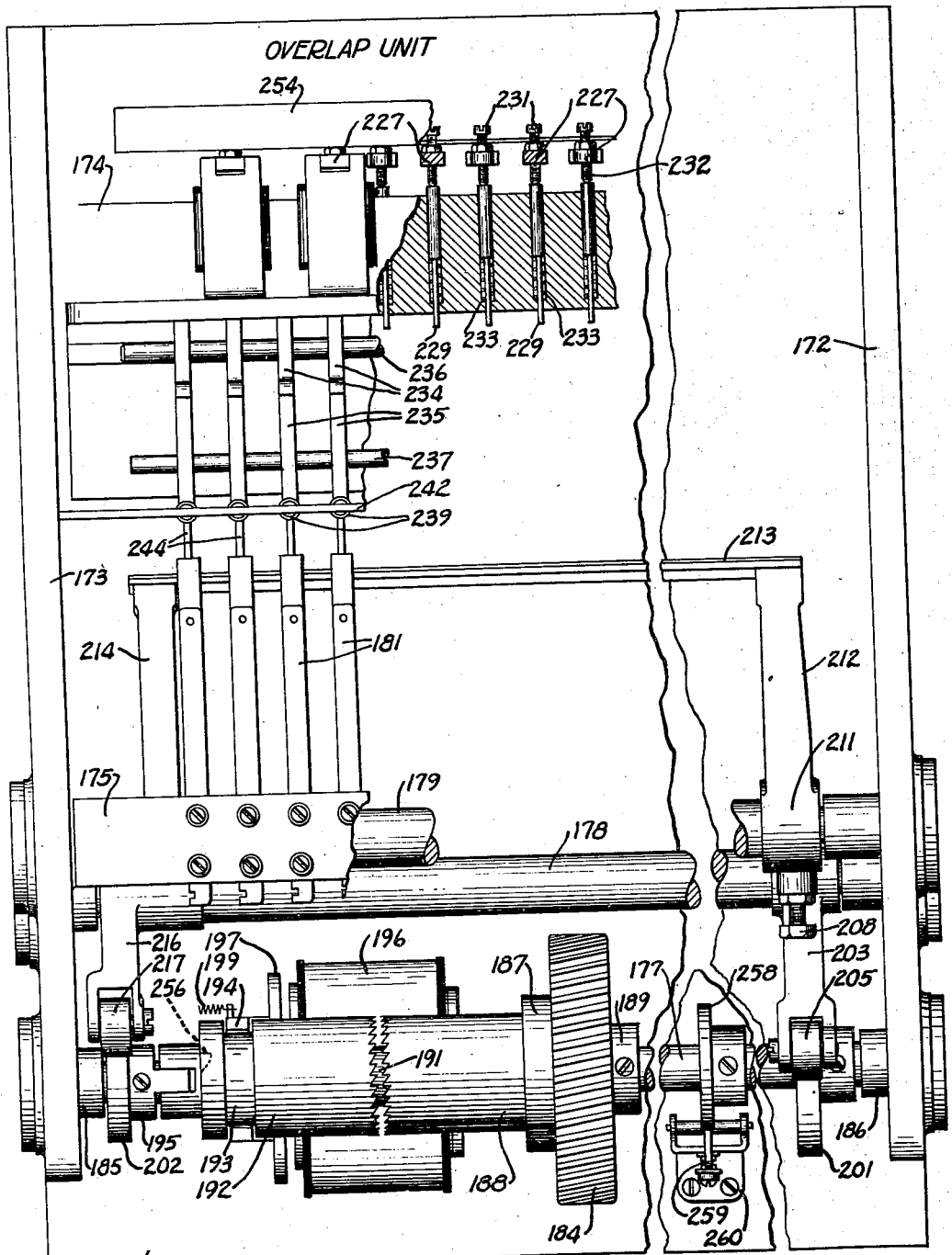

May 4, 1943. H. L. KRUM 2,317,995
SELECTIVE SIGNALING SYSTEM AND APPARATUS
Filed Jan. 22, 1931 26 Sheets-Sheet 8

INVENTOR
HOWARD L. KRUM
BY
Strauch & Hoffman
ATTORNEYS

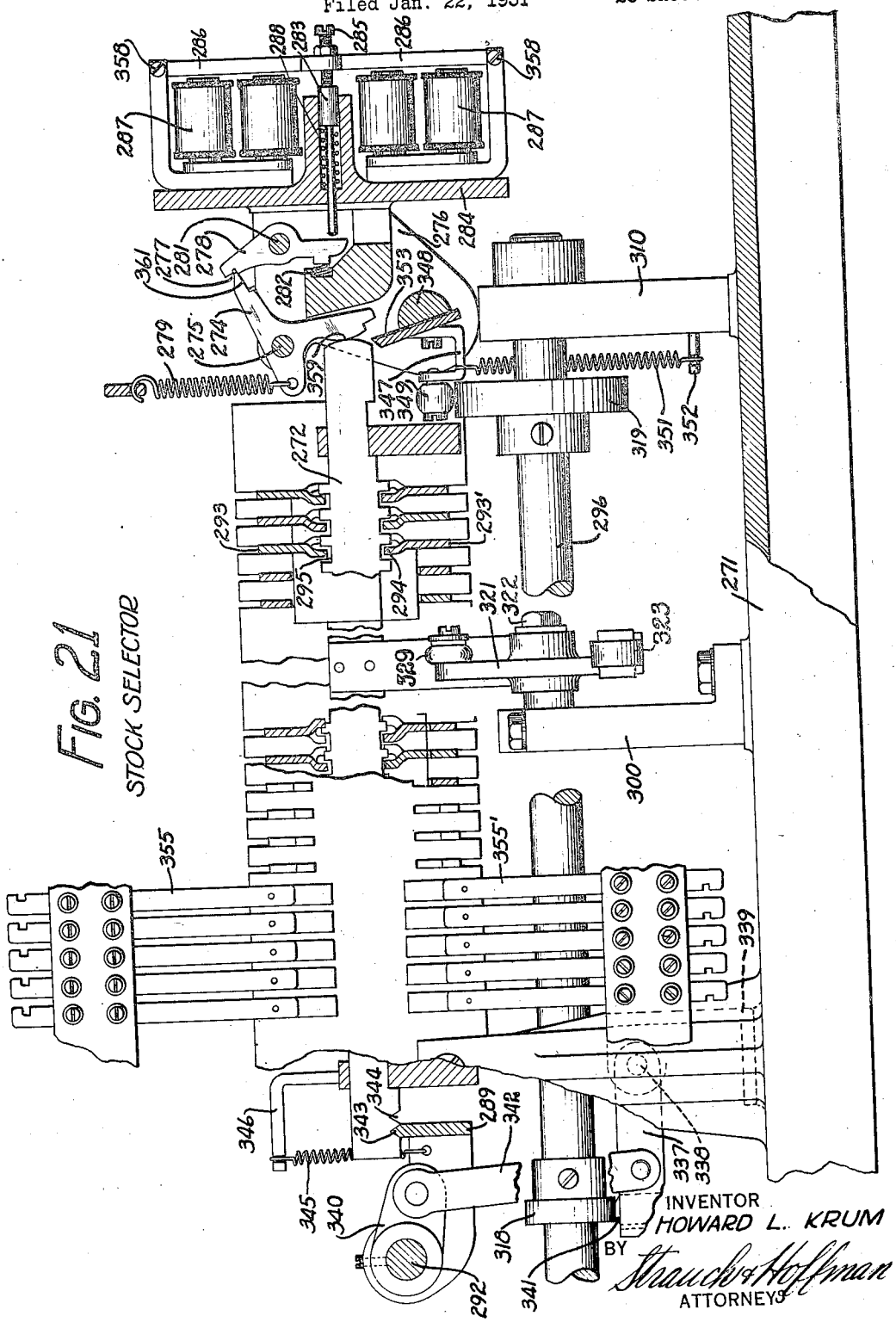

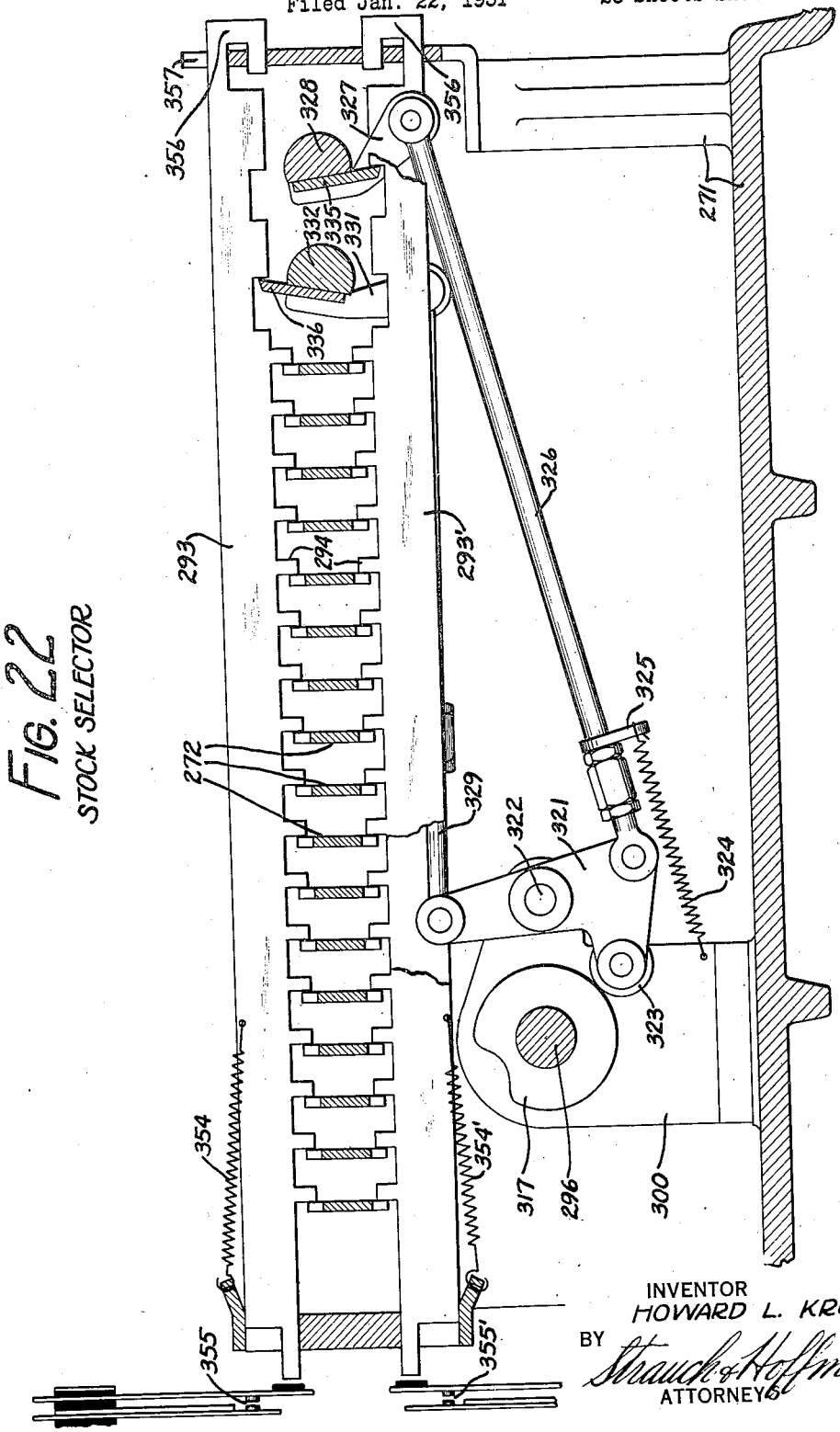

May 4, 1943.  H. L. KRUM  2,317,995
SELECTIVE SIGNALING SYSTEM AND APPARATUS
Filed Jan. 22, 1931  26 Sheets-Sheet 11
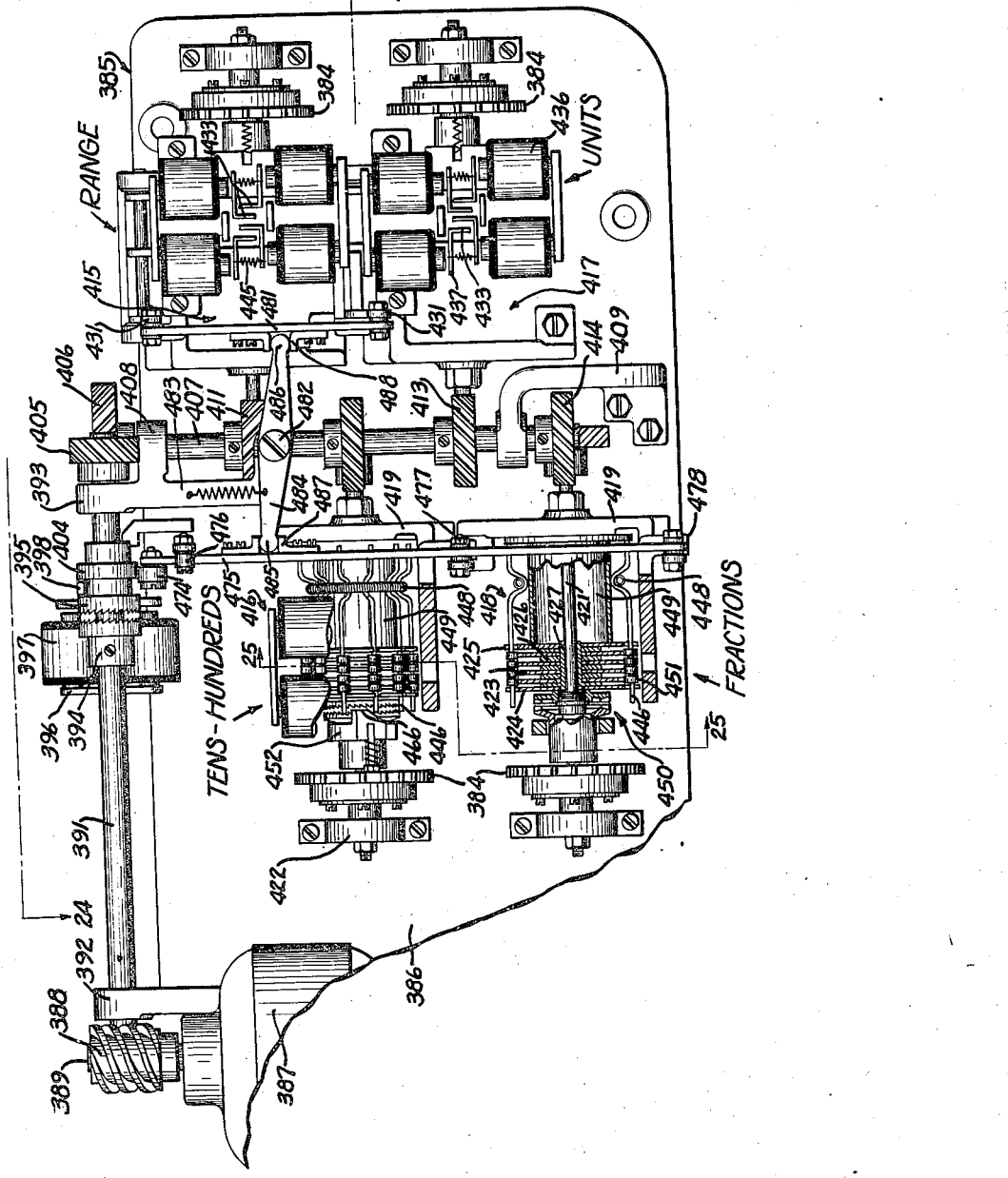
INVENTOR
HOWARD L. KRUM
BY
ATTORNEYS May 4, 1943.  H. L. KRUM  2,317,995
SELECTIVE SIGNALING SYSTEM AND APPARATUS
Filed Jan. 22, 1931   26 Sheets-Sheet 12
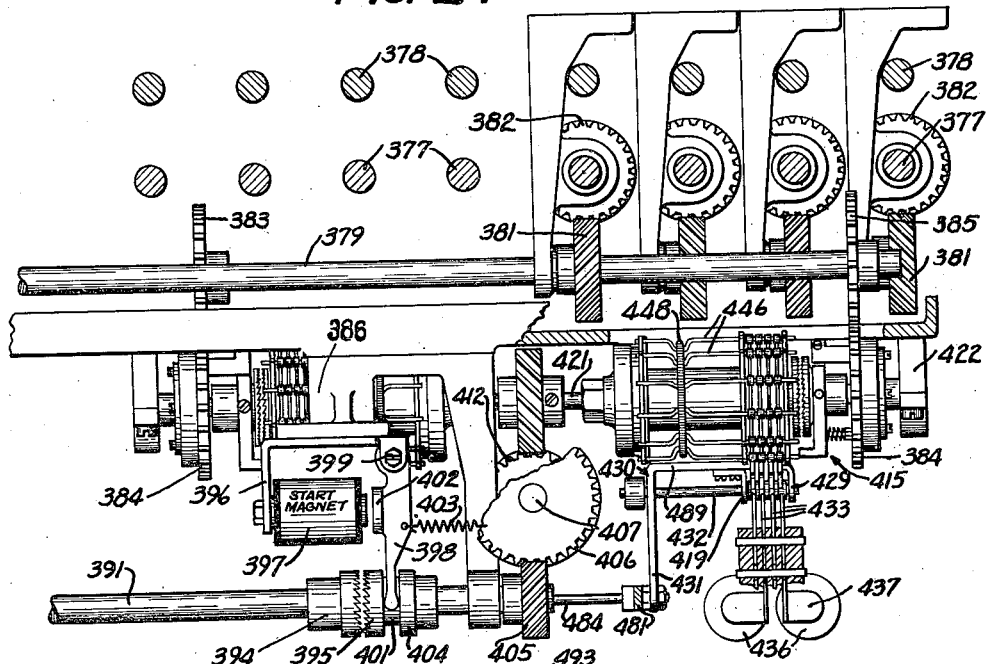
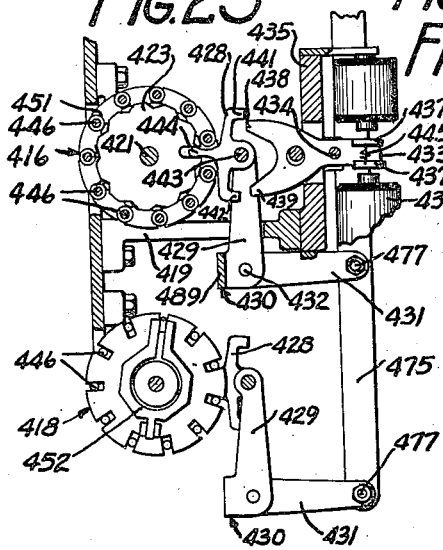
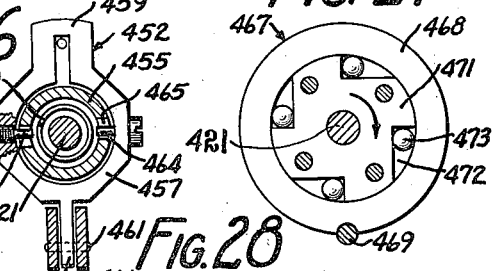
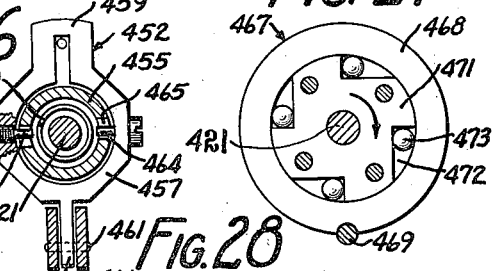
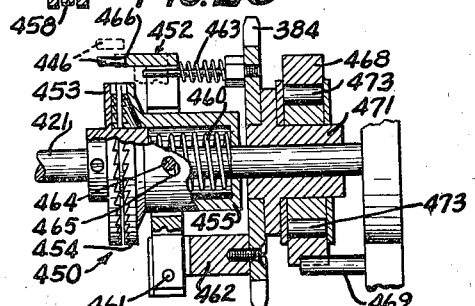
INVENTOR
HOWARD L. KRUM
BY
ATTORNEYS

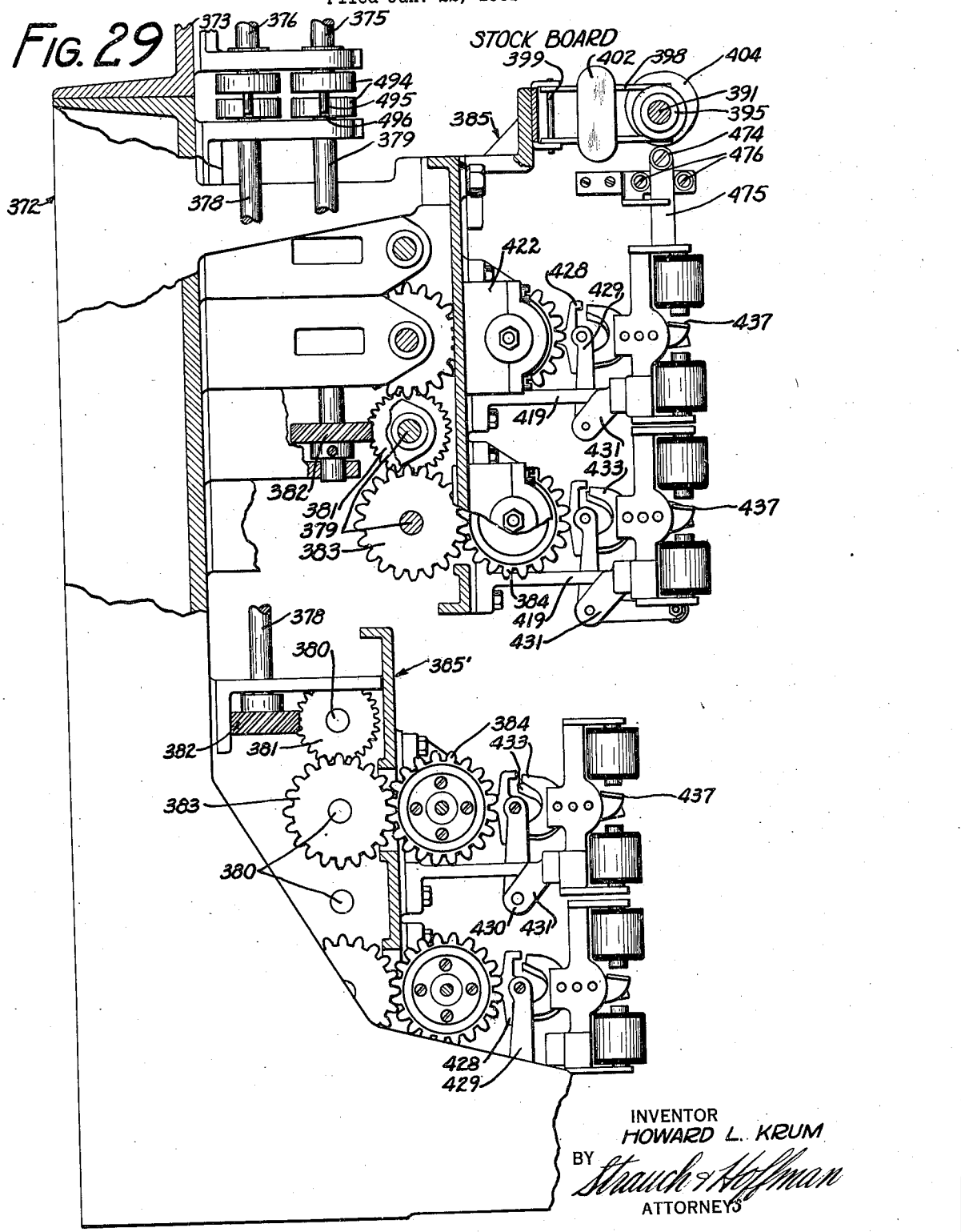

May 4, 1943. H. L. KRUM 2,317,995
SELECTIVE SIGNALING SYSTEM AND APPARATUS
Filed Jan. 22, 1931 26 Sheets-Sheet 14
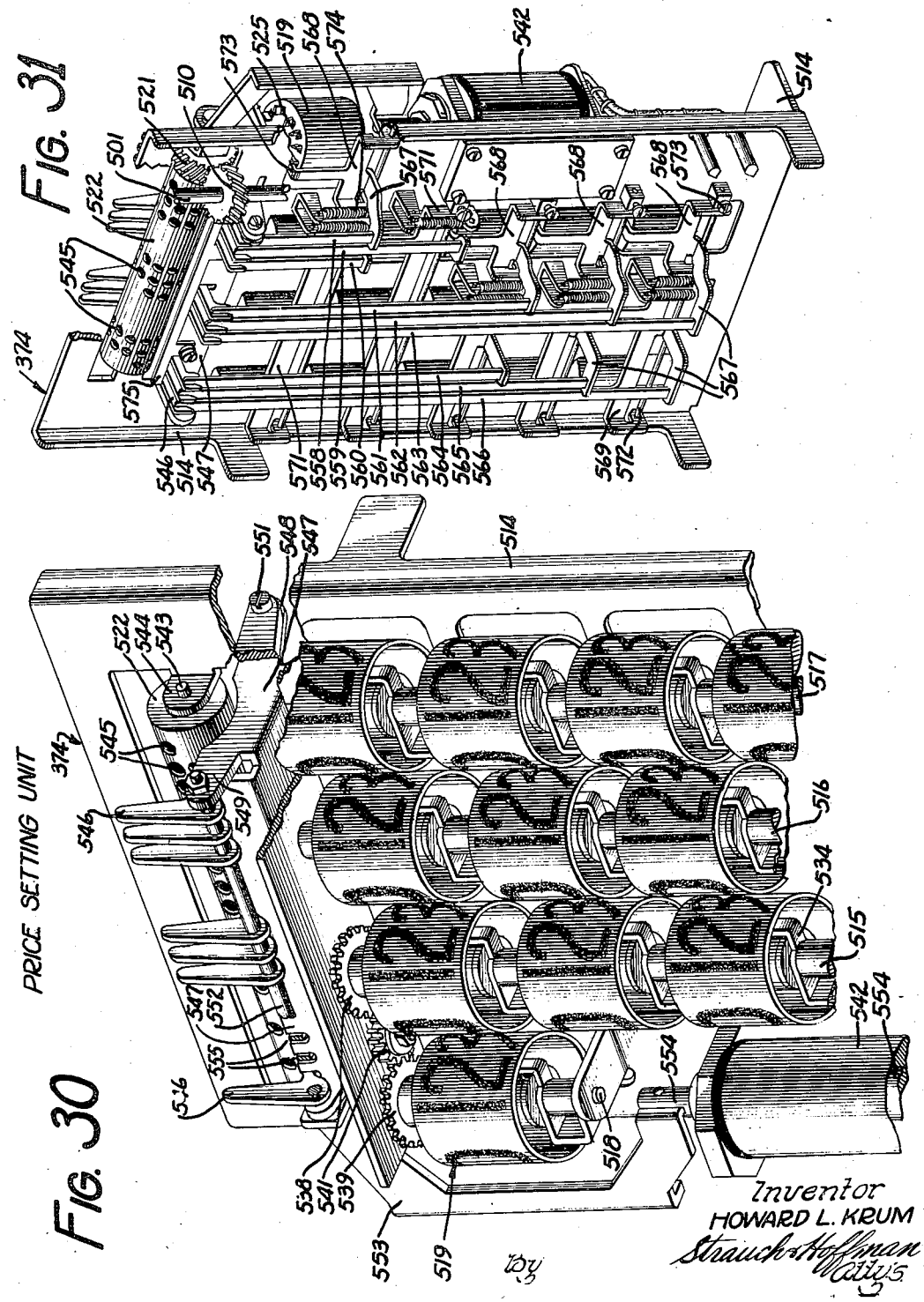
Inventor
HOWARD L. KRUM May 4, 1943. H. L. KRUM 2,317,995
SELECTIVE SIGNALING SYSTEM AND APPARATUS
Filed Jan. 22, 1931 26 Sheets-Sheet 15
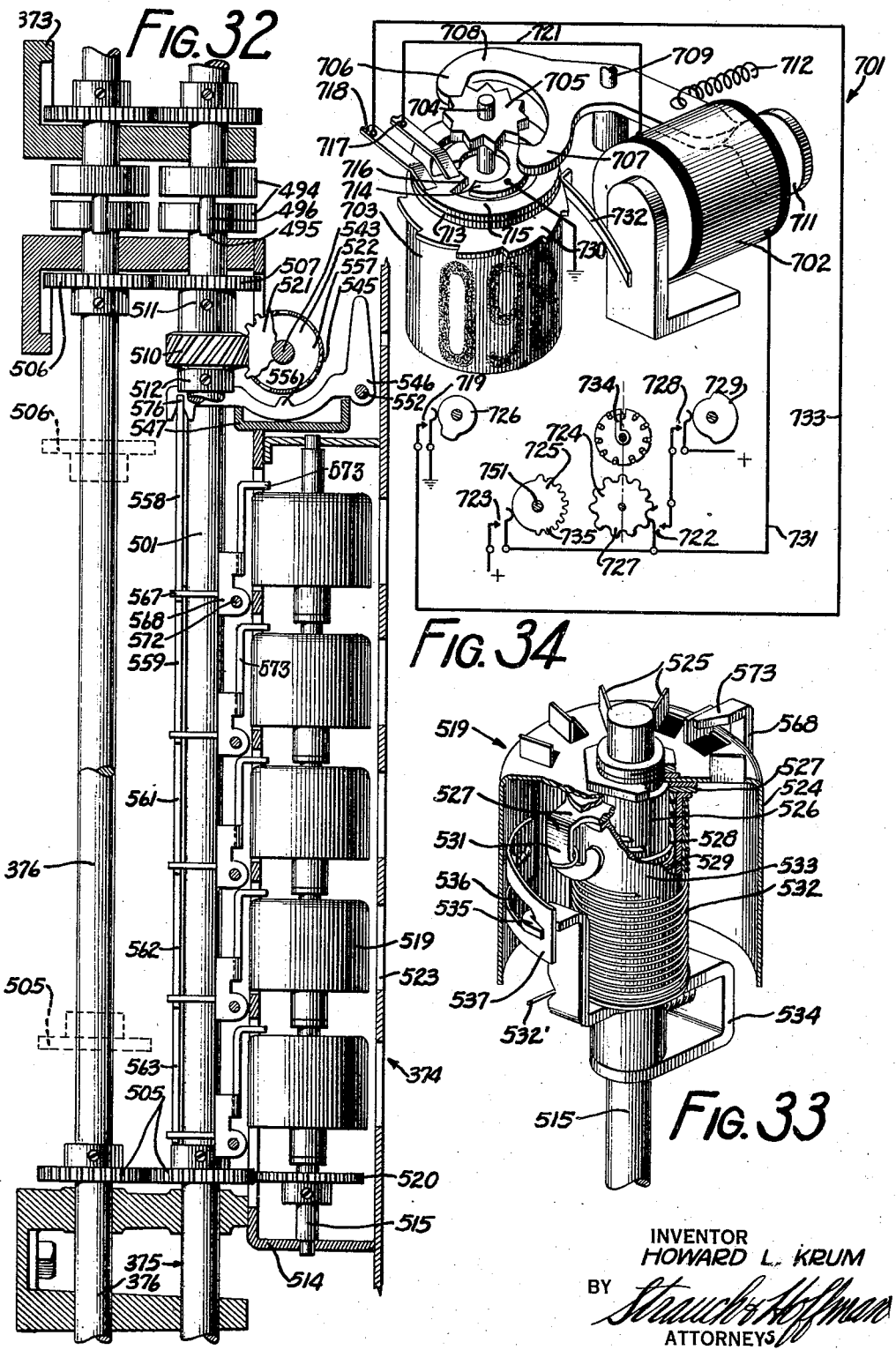
INVENTOR
HOWARD L. KRUM
BY
ATTORNEYS

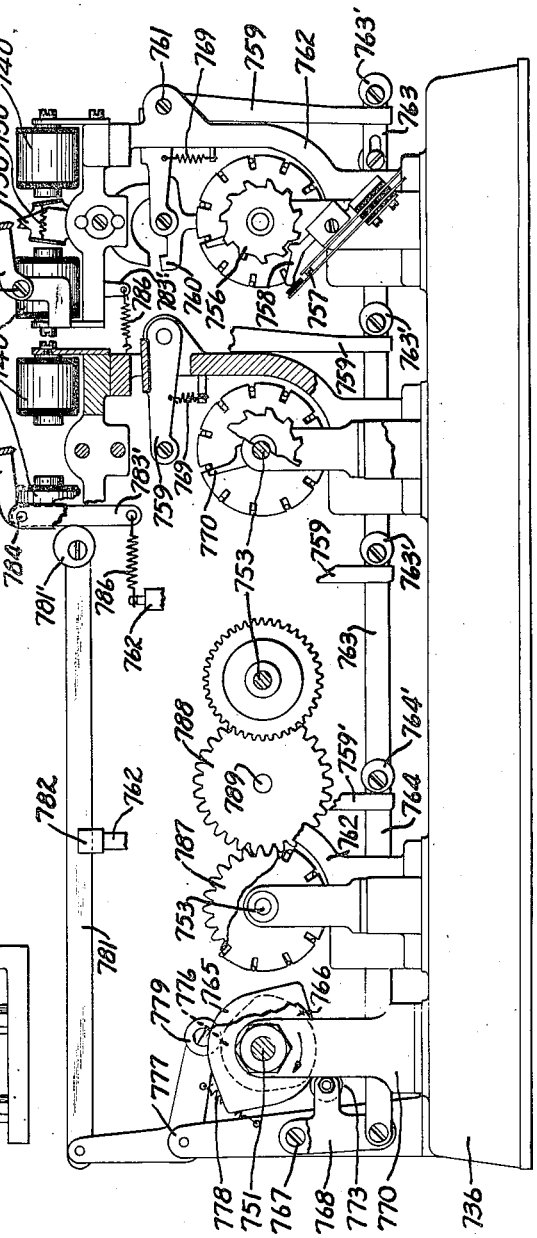
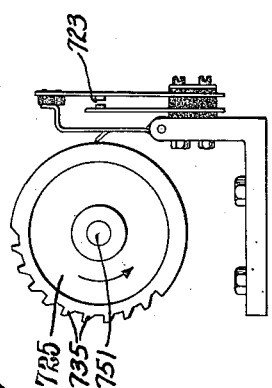

May 4, 1943.    H. L. KRUM    2,317,995
SELECTIVE SIGNALING SYSTEM AND APPARATUS
Filed Jan. 22, 1931    26 Sheets-Sheet 18

RANGE SELECTOR

TRANSLATING UNIT

INVENTOR
HOWARD L. KRUM
BY
Strauch & Hoffman
ATTORNEYS

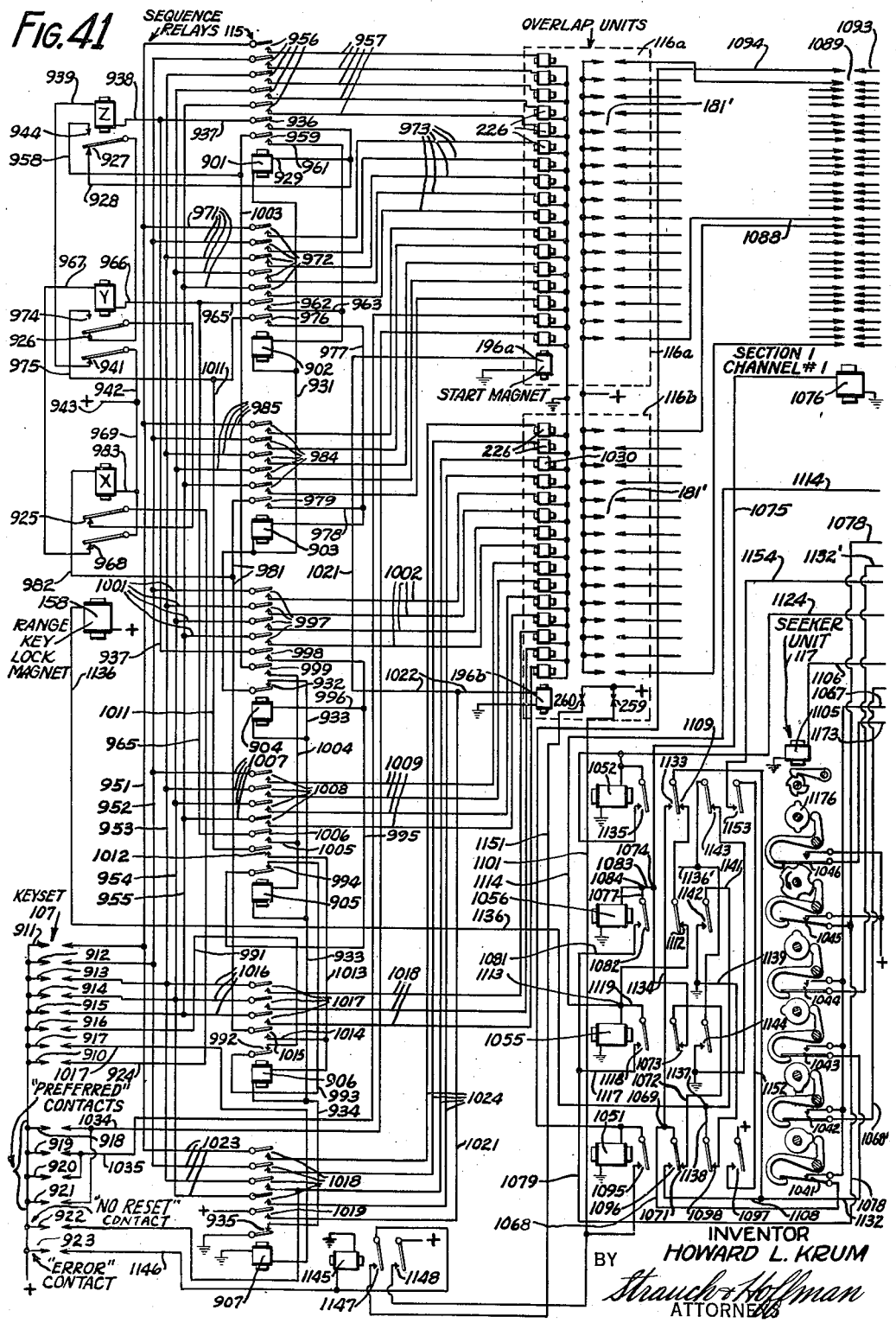

Patented May 4, 1943

2,317,995

UNITED STATES PATENT OFFICE 2,317,995

SELECTIVE SIGNALING SYSTEM AND APPARATUS

Howard L. Krum, Chicago, Ill., assignor to Teletype Corporation, Chicago, Ill., a corporation of Delaware Application January 22, 1931, Serial No. 510,536

76 Claims. (Cl. 178—4)

This invention pertains to signaling systems, and is especially adapted to stock and commodity quotation distribution and similar uses, and may also be adapted to remote metering, recording and like systems.

The usual practice in selective market quotation systems is to transmit the elements of each quotation in a predetermined sequence, as for instance, the remote selection of the item to be quoted is followed with the price quotation of the selected item and then the index or range of the quotation. Heretofore, a great amount of the signal line time available for signaling has been unproductive due to the time intervals required to perform the successive operations incident to the proper functioning of the apparatus associated with the quotation distribution signaling systems. Since the signaling traffic of these systems is very heavy, it is a primary object of this invention to provide means for multiplying the capacity of the apparatus, thereby allotting more line time for signaling and consequently greatly accelerating traffic.

In modern printing telegraphs highly efficient permutation code transmitting systems have been developed, capable of obtaining the maximum signaling capacity on a telegraph circuit. Likewise highly efficient and reliable selecting apparatus, such as used in high speed stock tickers suitable for use with such signals have also been developed. It is a primary object of this invention to utilize such methods and apparatus for the operation of a quotation system.

A stock board is generally of such proportions as to exhibit the price ranges of a large number of stocks. Furthermore, each stock item is provided with a group of character indicators to be operated. To provide each indicator individually with a selecting mechanism such as is used in high speed stock ticker operation would be prohibitive in cost. To meet this situation economically therefore, this invention provides a selecting mechanism adapted to control a plurality of such indicators and to condition for operation all of said indicators simultaneously.

This invention also provides for the apportioning of the volume of quotation signaling traffic to a plurality of channels whereby the quotations from the separate channels at the transmitting station are successively and sequentially propagated over the signal line to the receiving station where they are sorted out and directed to their proper channels to be properly distributed upon the stock or quotation board, thus utilizing the signal line time to the fullest extent for signaling.

A further object is to provide a method of splitting up the signals at receiving brokers' offices into more than one channel, each channel carrying quotations corresponding to only a part of the stocks and operating corresponding indicators so that a board composed of indicators capable of a limited rate of operation can be made to take care of quotations received at a greater rate.

In the large stock exchanges, so many stocks are dealt in and so many sales are made in a given time that it is impossible for one operator to handle more than a small part of the total number of quotations to be transmitted to operate a quotation board, and the demands of different brokers are so varied that substantially all of the listed stocks must be quoted so that each broker can make any choice he desires. Accordingly an important object of the present invention is to provide novel editing and dispatching methods, and means for dividing up the work of transmission between a number of operators so that quotations may be distributed at approximately the speed of price variations of the commodities quoted.

Another object is to provide a system in which a plurality of operators can transmit quotations on a single circuit, so that a high rate of transmission to accommodate a large number of stocks over transmission channels limited in number can be obtained.

A further object is to provide such a method adapted to the use of a single transmitting circuit from the central office to the brokers' offices.

Heretofore it has been the practice at the central dispatching office of quotation distribution systems, to exhibit the transmitted quotation message on a home record stock board to provide a check for the transmitted information. Another object of this invention is to provide monitor printers which record in corresponding printed characters all the signals transmitted on the quotation board control circuit so that a few small telegraph printers take the place of an elaborate and expensive quotation board occupying a very large amount of space and requiring considerable maintenance.

A further object of this invention is the provision of means for converting signals originally suitable for quotation board signaling systems into signals suitable for printing telegraph systems.

Another object of the invention is to provide a keyboard adapted to store a series of signals representing a message, for subsequent transmission in a single cycle of a transmitting distributor.

As is well known the various stocks are generally designated on the stock boards by one, two or three letters. In the prior forms of stock quotation systems, it has been necessary to operate the transmitting and receiving mechanisms in sequence, generating a blank signal if the stock is designated by only two letters and two blank signals if the stock is designated by only one letter. This mode of operation was necessary in order to operate the parts in correct sequence whereby the subsequent signals for the price of the selected stock would operate the proper price indicating mechanism, such as dials. Obviously valuable time is wasted in having to actuate key levers for generating blank signals when a stock is designated by only one or two letters, and the keyboard apparatus is subjected to unnecessary wear.

Another object of this invention therefore is to provide a stock quotation system wherein the price designation of a selected stock may be generated immediately after the letters designating the stock, without having to manually create any blanks when the stock is designated by less than three letters. For example, if a stock is designated by one letter, by the novel system described hereinafter in detail, it is possible to proceed at once with the price quotation of the stock after the single letter has been initiated, thus saving much time in manipulation.

Heretofore, stock boards employing indicators of the electromagnetic or step-by-step type have not proven dependable in operation. Accordingly, this invention provides novel mechanism and circuit arrangements for efficiently operating this type of registering apparatus with a consequent increase in the accuracy of operation of such indicators.

A further object is to provide an efficient device to translate from a permutation code to a step-by-step dialing code by using telegraph permutation devices which have proved themselves highly efficient in actual use, so that step-by-step indicators may be efficiently controlled from remote points by permutation code signals transmitted over existing telegraphic channels.

Another object of this invention is to provide a novel system and apparatus in which it is possible to reset a portion only of the quotation register without sending resetting signals for those sections of a quotation value which are unchanged.

In boards of the dial type it has been the custom to transmit code signals corresponding to each digit of a price to be changed. In such boards the "hundreds" digit changes very seldom, so that many unnecessary signals are transmitted. An object of this invention is to provide a board in which the "hundreds" signals are sent only when there is a "hundreds" quotation change.

A further object is to provide mechanical indicating units in which a large number of dials are operated in varying combinations under the control of a single stock magnet.

A further object is to provide an efficient permutation method of determining the dials in a stock unit to be operated, so that a large range of changes can be made with a minimum use of line time.

A still further object of this invention is to provide a dispatching system or method capable of promptly handling the large volume of business arising out of stock market transactions.

Further objects of the invention are such as may be attained by utilization of the various combinations, sub-combinations and principles hereinafter set forth and defined by the terms of the appended claims, in the various other relations to which they are obviously adaptable.

Referring to the drawings:

Figure 1 is a diagram of the editing and dispatching arrangement at the transmitting station.

Figure 2 is a diagram of two types of receiving stations, comprising the two embodiments of this invention, connected in one circuit.

Figure 3 is a side view of a preferred form of stock board.

Figure 4 is a front elevation of the stock board shown in Figure 3.

Figure 5 is a code chart for letters case characters.

Figure 6 is a rolled impression of the monitor ticker typewheel.

Figure 7 is a code chart for figures case characters.

Figure 8 is an explanatory table concerning the range symbols.

Figure 9 is a legend for Figure 8.

Figure 10 is an illustration of a strip of printed tape from a stock ticker.

Figure 11 is an illustration of a strip of printed tape from a monitor ticker.

Figure 12 is a plan view of the keyset.

Fig. 12a is a diagrammatic illustration of the code perforations in their order and arrangement on the keyboard.

Figure 13 is a transverse section on substantially line 13—13 of Figure 12.

Figure 14 is a view showing the series of contact cams.

Figure 15 is a fragmental section on line 15—15 of Figure 12.

Figure 16 is a cross section of the contact controlling mechanism.

Figure 17 is a cross-sectional view of the overlap unit.

Figure 17a is a fragmental view showing an operated contact in the overlap unit.

Figure 18 is a fragmental view illustrating the use of a double contact in the overlap unit.

Figure 19 is a plan view of the overlap unit with certain parts removed to show other details therein.

Figure 21 is a longitudinal sectional view of the stock selector.

Figure 22 is a cross sectional view of the stock selector.

Figure 23 is a plan view, in partial section, of the price selector.

Figure 24 is a section on line 24—24 of Figure 23.

Figure 25 is a section on line 25—25 of Figure 23.

Figure 26 is a front view of the stop member.

Figure 26a is an alternate form of one arm of the stop member.

Figure 27 is a view of the clutch mechanism for the stop member.

Figure 28 is a sectional view through the stop member clutch mechanism.

Figure 29 is a cross section of the stock board taken on line 29—29 of Figure 4.

Figure 30 is a perspective showing of the front of a price setting unit.

Figure 31 is a perspective showing of the rear of a price setting unit.

Figure 32 is a vertical cross section of the assembly of a price setting unit of the stock board.

Figure 33 is a perspective showing of the indicator drum partially broken away to show the detailed construction thereof.

Figure 34 is a perspective view of the step-by-step indicator and the operating circuit therefor.

Figure 36 is a longitudinal sectional view of the translating unit.

Figure 37 is a fragmentary view of the restoration cam.

Figure 42:
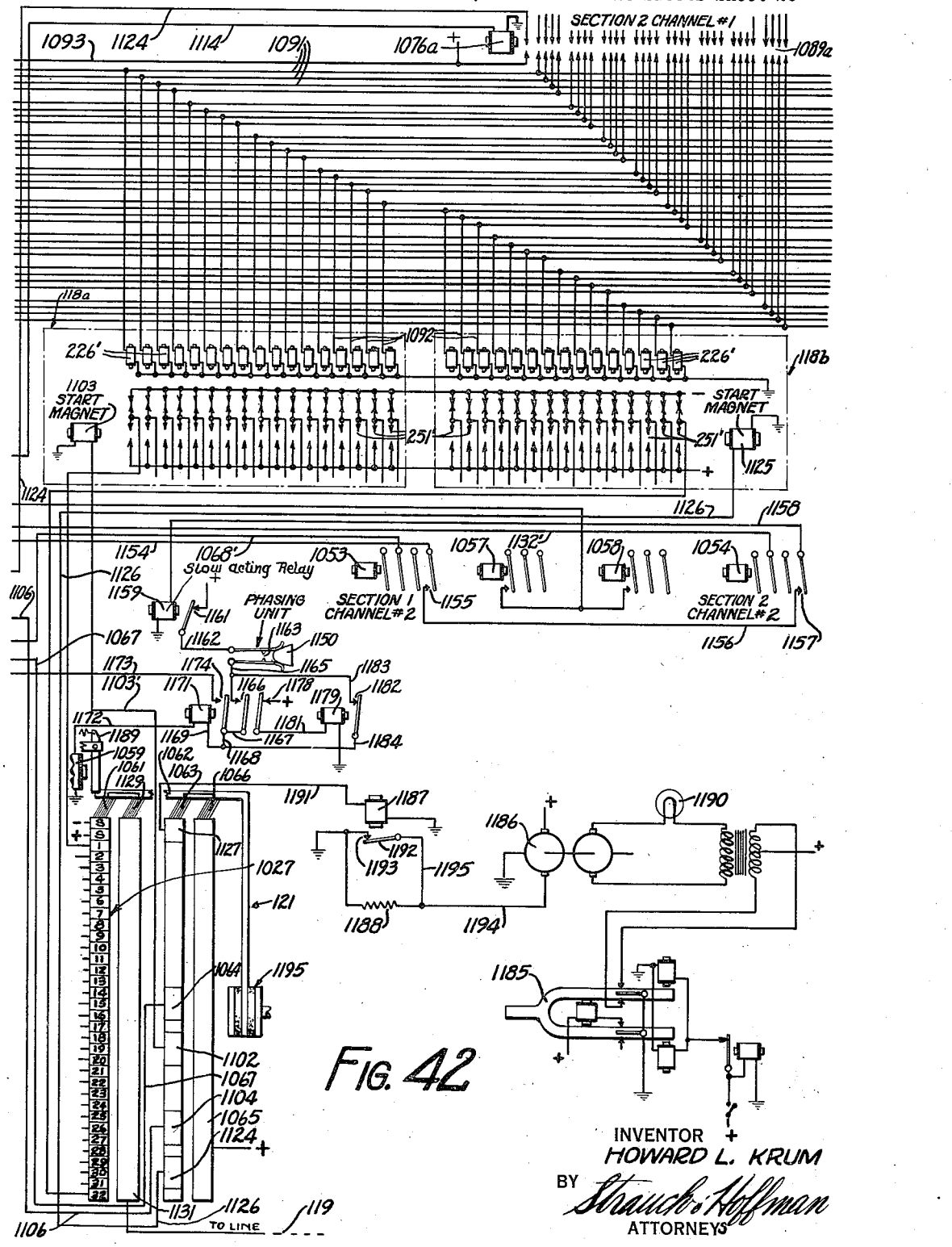

Figure 41 and Figure 42 comprise the electrical circuit for the transmitting station.

Figure 43:
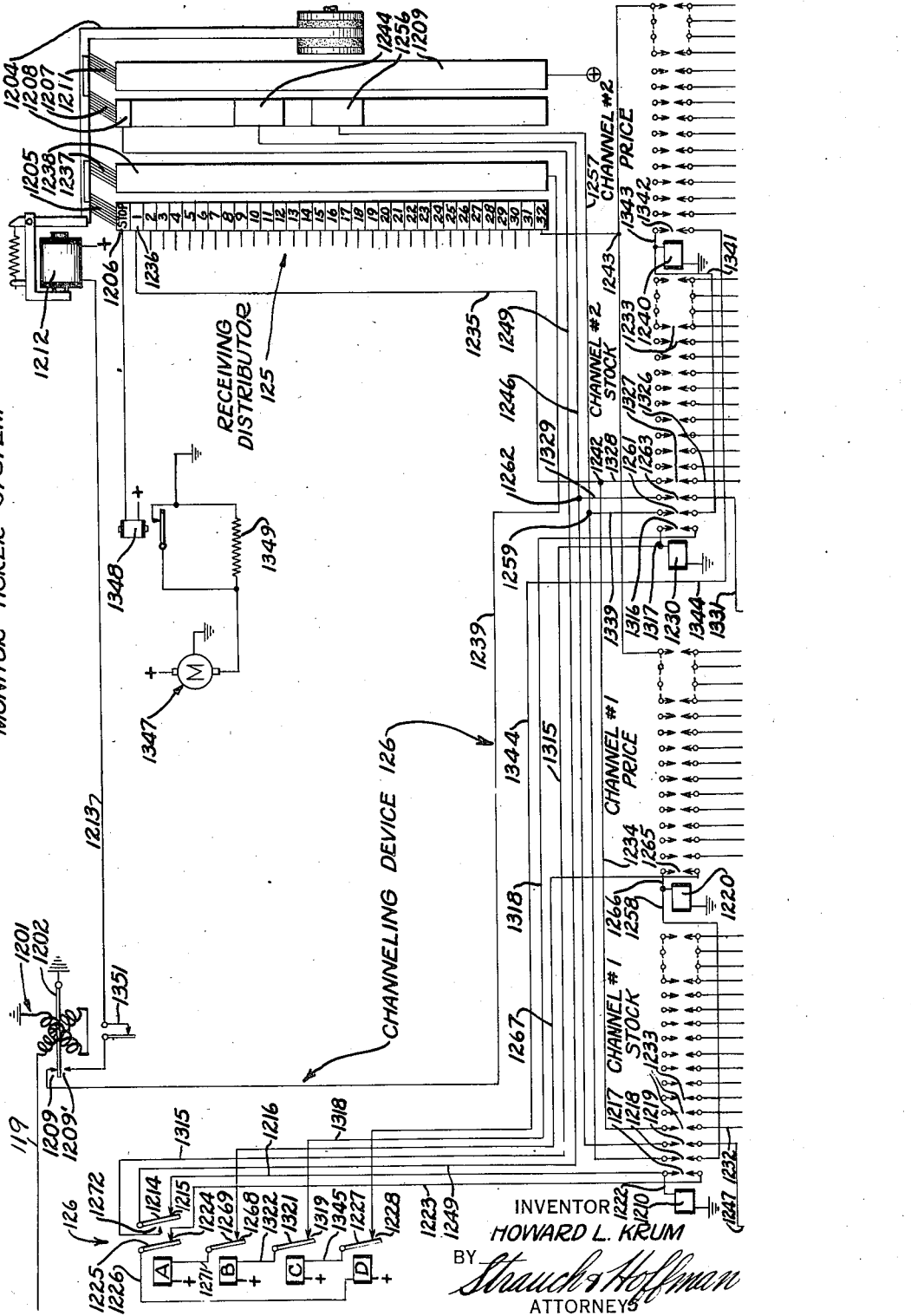
Figure 44:
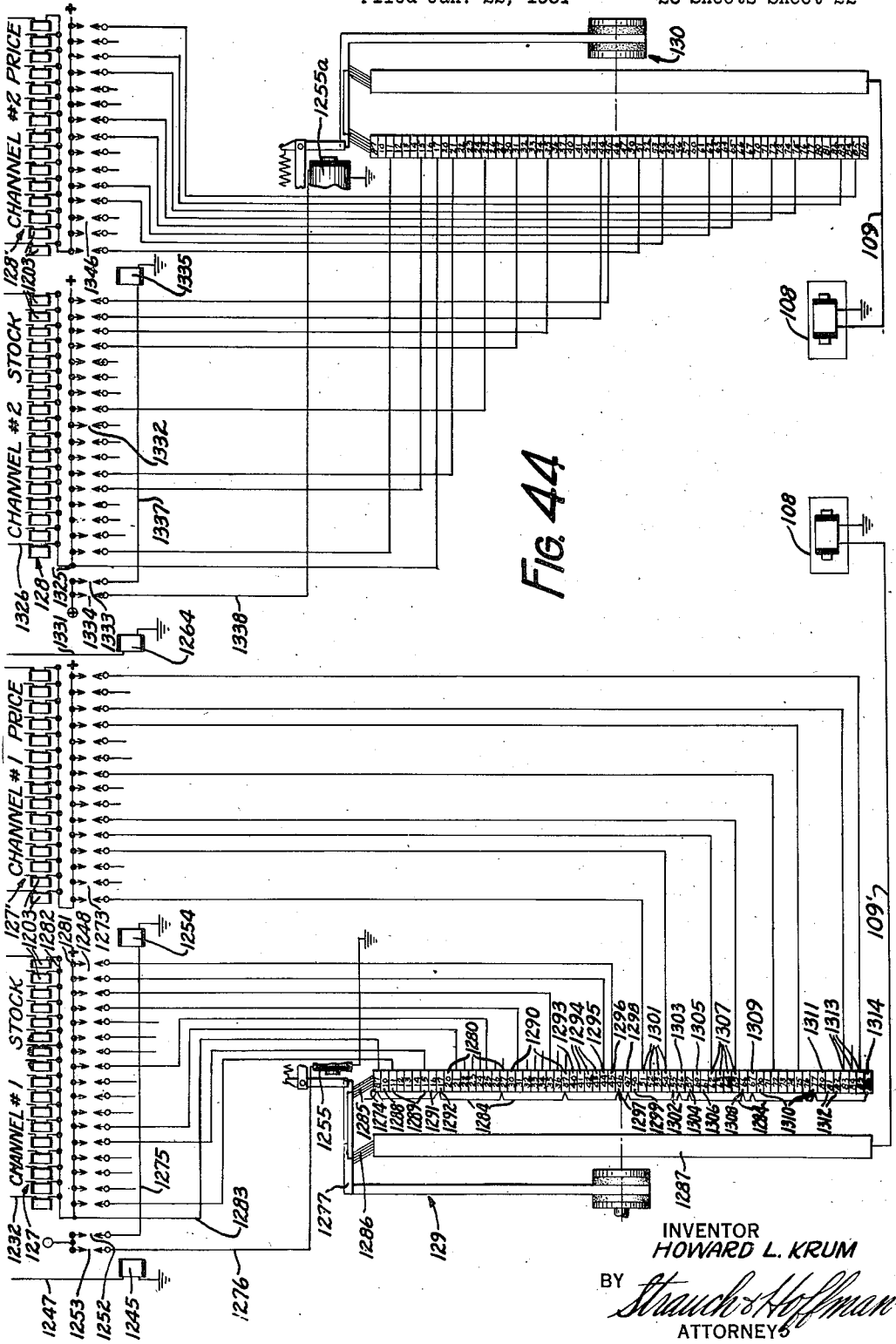

Figure 43 and Figure 44 comprise the electrical circuit for the monitor receiving station.

Figure 45:
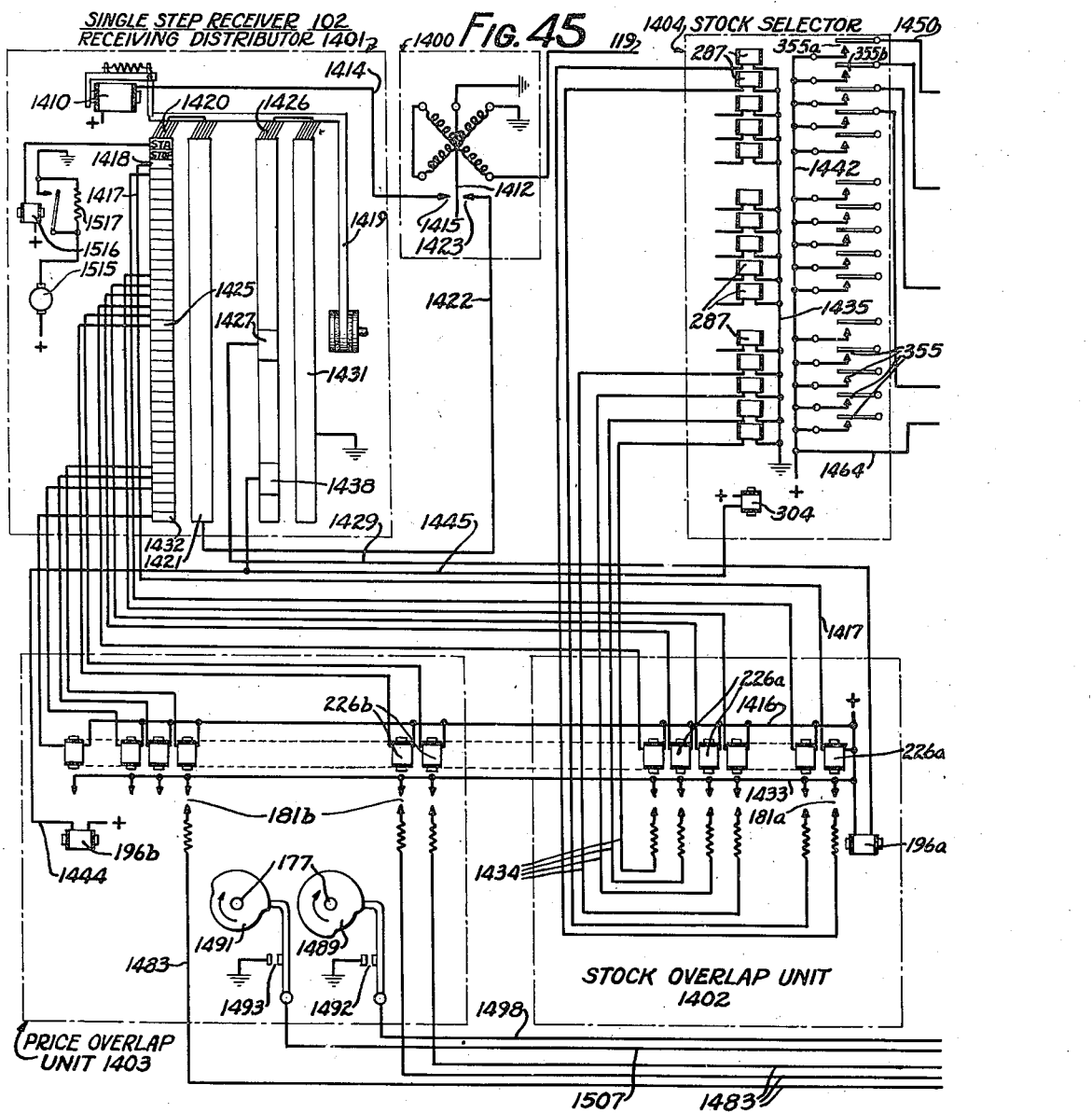
Figure 46:
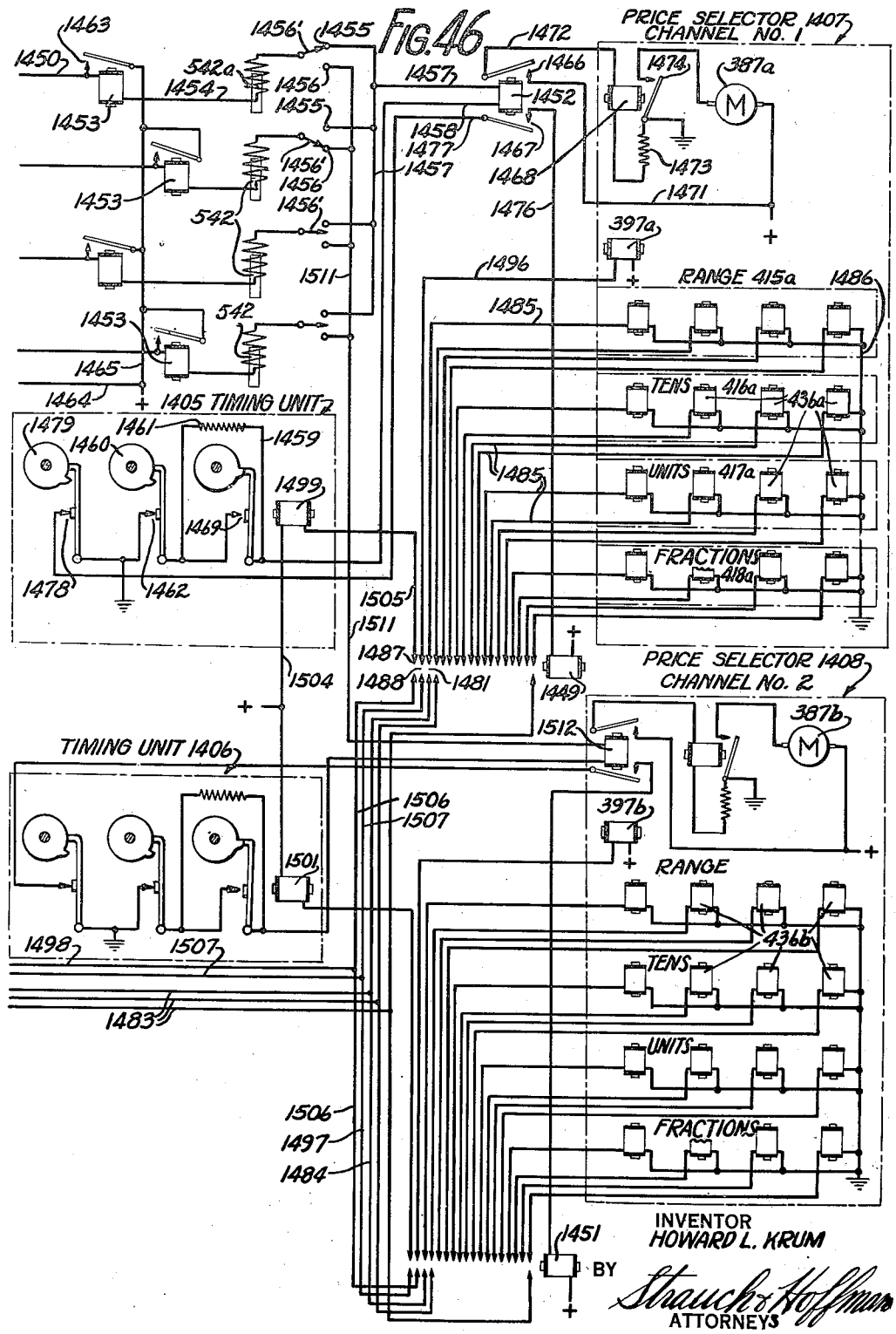

Figure 45 and Figure 46 comprise the electrical circuit for the permutation dial receiving station.

Figure 47:
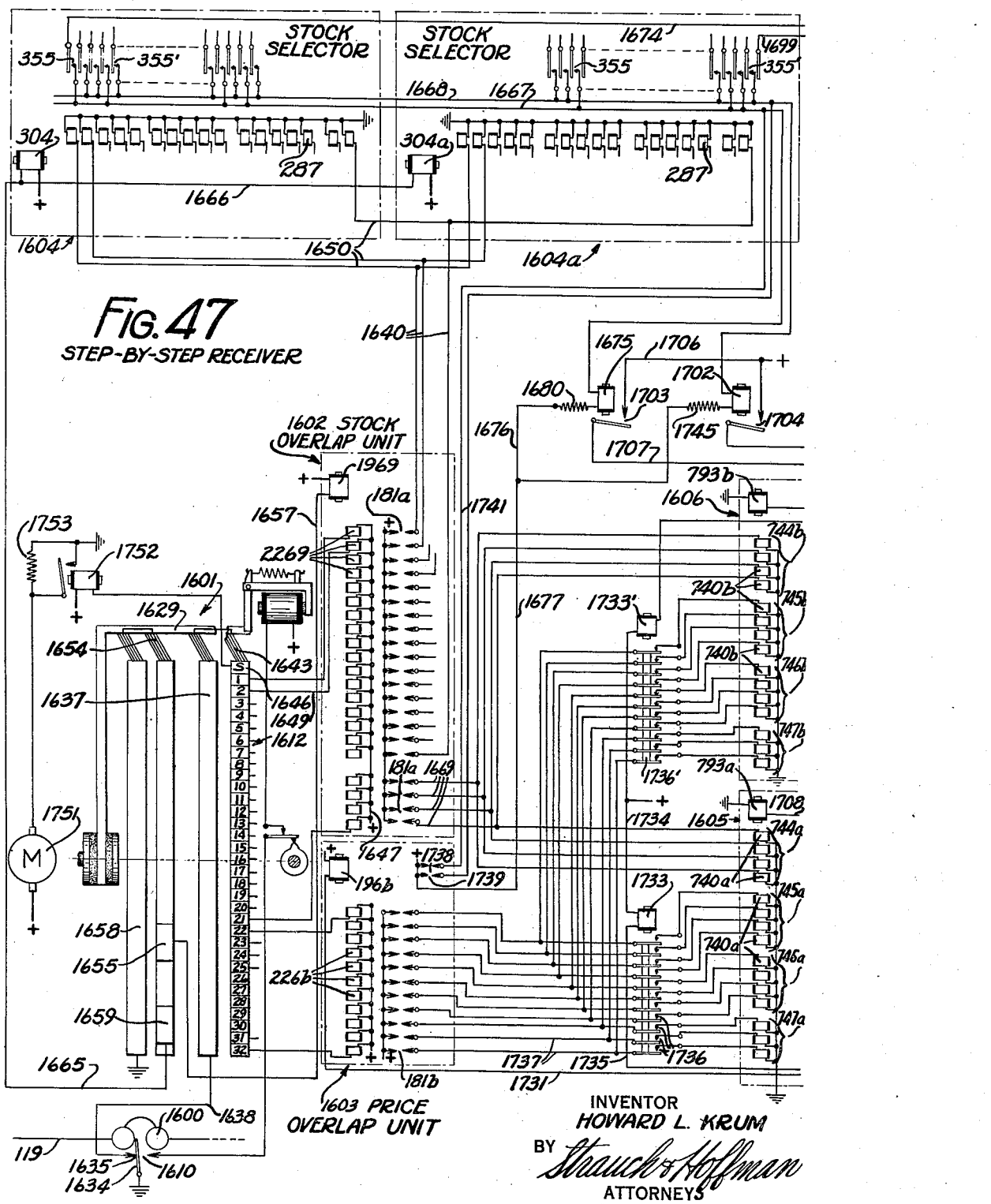
Figure 48:
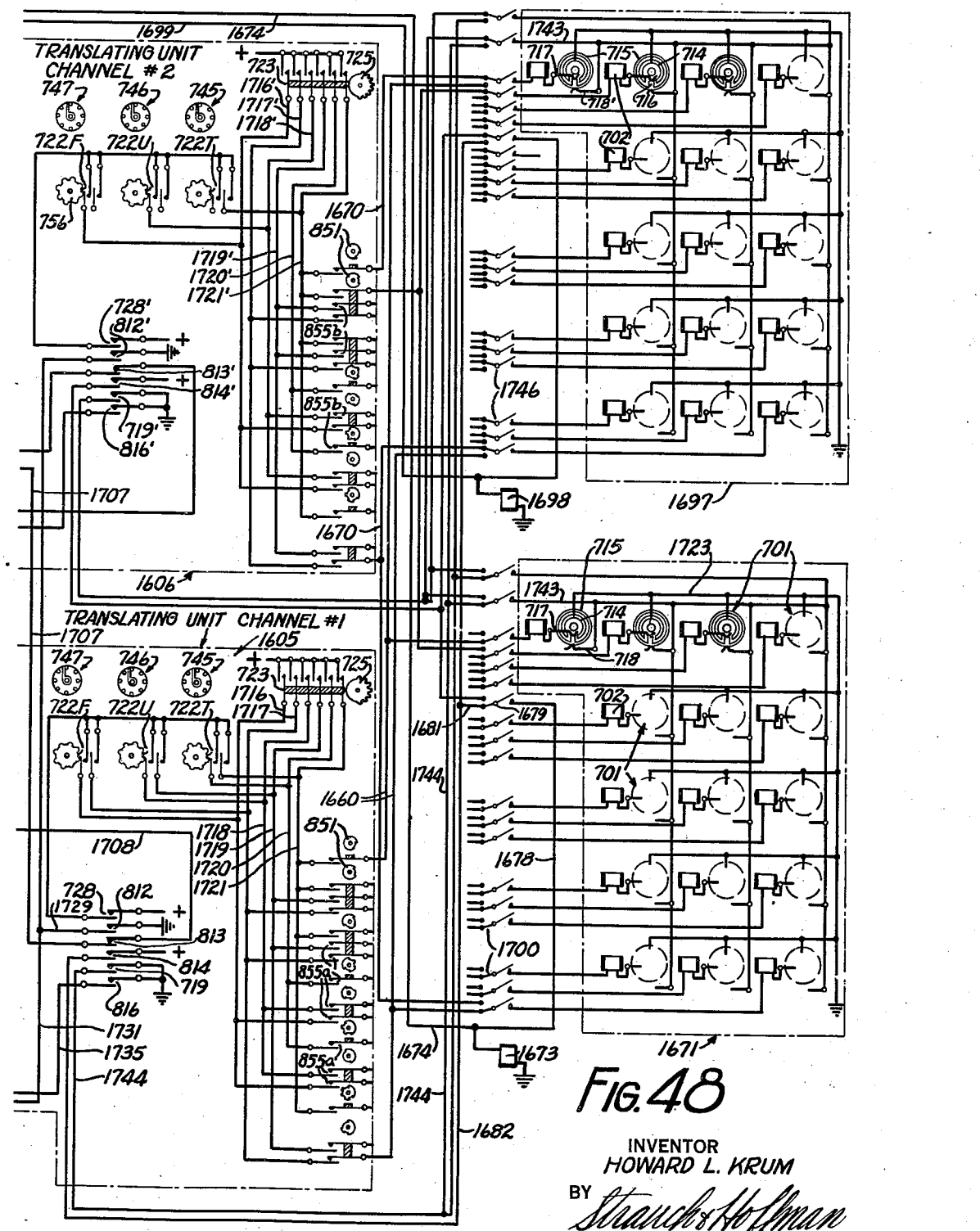

Figure 47 and Figure 48 comprise the electrical circuit for the step-by-step receiving station.

General description of system

As the present invention comprises a system for indicating quotations at a plurality of remote stations under control of a central dispatching station, a preferred arrangement for rendering this quotation service to the remote or subscriber stations is schematically shown in Figures 1 and 2.

The transmitting station is shown at 101 in Figure 1 and alternate adaptations of the receiving stations are shown at 102 and 103, Figure 2. The receiving station indicated at 102 is adapted to a system employing a stock board based upon the use of mechanically propelled permutation dials controlled by a single permutation device, which will hereinafter be disclosed in detail; while the receiving station indicated at 103 is adapted to a system employing a stock board based upon the use of electromagnetically operated step-by-step indicators of the type disclosed in United States Patent #386,189 issued July 17, 1888 to P. B. Delaney. Practically, any number of receiving stations 102 and 103 can be operated simultaneously by transmitting station 101.

Means have been provided at the transmitting station for insuring accuracy of the quotation service by supervision and correction of errors; such means including a monitor receiving station adapted to control a series of monitor tickers. The monitor ticker is similar in all respects to the well known stock ticker, as shown in U. S. Patent No. 1,821,110 to S. Morton et al., except that the code discs for stopping the typewheel are cut differently to correspond with the code in Figures 5 and 7, and the typewheel has different characters as illustrated by the rolled impression, Figure 6, which will be presently described.

At the central dispatching station 101, provision is made for division of the quotation traffic into two channels; for instance, in the case of stock and commodity quotation traffic, one channel hereinafter known as channel #1, is concerned only with those stocks whose indicia or abbreviations begin with letters A to J, and the other channel hereinafter known as channel #2 is concerned with stocks whose abbreviations begin with letters K to Z.

Each receiving station 102 and 103 is provided with a stock board of the general appearance shown in Figure 4, on which are exhibited the various range or index characteristics of a group of stocks, each individual stock being provided with a number of rows of price indicating devices the operation of which is controlled by transmitting station 101.

Editing and dispatching

In the arrangement shown in Figure 1, each channel is provided with two similar groups 105, and including three operatives, namely, an editor, a keyset operator, and a checker, all of whom are seated at a special table on which are carried a stock ticker, a key set and a monitor ticker. Each editor is provided with a stock ticker 106, connected to common line wire 107' (Figure 1), over which the unsorted and general stock quotations are received, each keyset operator is provided with a keyset 107, and each checker is provided with a monitor ticker 108 adapted to receive and record the quotation messages propagated to it over wires 109 or 109', as the case may be, from the monitor station as will hereinafter appear.

The tape issues from stock tickers 106 in the printed form shown in Figure 10, while the tape issues from monitor tickers 108 in the printed form shown in Figure 11. The differences in the tapes shown in Figures 10 and 11 can be more advantageously pointed out when the checking operation is described hereinafter. Tape 111 (Figure 10) as it issues from stock ticker 106 is marked by editor 112 with distinctive marks to indicate to keyset operator 113 the range of the stock quotation, that is to say, whether the quotation is an open, a high, a low, or a last quotation. Each group 105 in each channel #1 or #2 is concerned with a predetermined portion of the stocks in their respective categories.

Located to the rear of groups 105 are the "high and low" editors, so called because their duties consist in detecting the high and low ranges of price of the group of stocks under their supervision, a certain number of stocks in that particular group being allotted to each editor and each editor being provided with a stock ticker 106; and since these editors are connected by telephone over wires 114 or 114' to editors 112 in groups 105 associated with their respective channels, they communicate the information relative to the range of the quotation to their associated editors 112. It is, of course, understood that the same information is appearing simultaneously on all the tapes issuing from stock tickers 106 with which all of the "high and low" editors and editors 112 are supplied, so that as editor 112 receives the information from the "high and low" editor he at once applies a distinctive mark on his tape adjacent to the particular quotation. Of course, if a quotation is of neither of these ranges the tape proceeds to the keyset operator unmarked, who then sends it as a last or current quotation.

The quotation that is intended to appear on the remote stock board thus is sent by the keyset operator through a key set which is similar in principle to that disclosed in United States Patent No. 1,595,472, issued August 10, 1926 to H. L. Krum. The keyboard is substantially as shown in Figures 12 to 16. It differs, however, from that disclosed in the foregoing patent in the arrangement and designation of the keys, in the number of the code bars, timing of the contact cams, and in the introduction of a locking magnet, all of which will be presently set forth.

The keyboard portion of keyset 107, as seen in Figure 12, comprises five rows of characters, of which the first or upper row comprises the range keys, each of which carries a particular range symbol. In the second row are arranged the numerals and fractions keys; and the remaining rows comprise the alphabetical keys. The keys are depressed in the sequence of the reading of the quotation, for example, the quotation ABC 45½ High is sent out by the operator in the manner in which it is read, that is, the alphabetical keys are depressed in the order A, B and C, the numeral keys are depressed in the order 4, 5 and ½, and finally the "Hi" key is depressed.

After the stock quotation message thus is set up upon the keyset, it passes through sequence relays 115, which operate to associate the electrical contacts of the keyset 107 with the proper storage magnets of the overlap units, so that a quotation consisting of a stock abbreviation and its price may be set up in sequence on the keyset and the magnets of the overlap units will be correspondingly energized in a similar sequence. The message then passes to a pair of overlap units 116 where the message is stored until released in its turn by seeker unit 117 and transferred to a second pair of overlap units 118 where the message is stored preparatory to its being propagated to the remote receiving stations 102 and 103 over line 119 by transmitting distributor 121. The signals sent out from transmitting station 101 are of a polar nature, that is, they comprise positive and negative impulses, which are believed to permit greater speed and accuracy of transmission.

Seeker unit 117, described hereinafter in detail, is for the purpose of automatically connecting the transmitting distributor with whichever pair of overlap units 116 that are "ready," that is, which have a message stored for transmission. In this way no time is lost, since if one group of overlap units is not ready, the seeker unit connects up one which is ready.

Signals received at the monitor receiving station pass by way of receiving distributor 125 to a channeling device 126 to separate the stocks quoted in channel #1 from those quoted in channel #2. The signals are then stored in overlap units 127 for channel #1 or overlap units 128 for channel #2 and then pass to separate monitor distributors 129 and 130 which are connected by wires 109' and 109 to the monitor tickers of their respective channels.

As already noted, the signals for each complete stock quotation are sent out successively without any intermediate start-stop impulses, there being only one start and one stop impulse for the entire quotation. To record the quotation on the ticker tape by means of the monitor ticker, the code combination for each constituent letter and figure of the quotation must contain a start and a stop impulse as well as a shift impulse. To accomplish this, there is provided a receiving system whereby the group of code combinations representing an entire stock quotation is separated into its component letters and figures and the individual code combinations therefor are supplied with a start and a stop condition as well as a shift or "case" selection condition before being transferred to the monitor ticker. The manner of accomplishing this will be hereinafter set forth when the electrical circuits for the entire system are described.

It is, therefore, apparent that simultaneously with the propagation of the stock quotation to the remote stations, the same information is recorded on the tape issuing from the monitor ticker. It is also apparent that by the time a quotation recorded on the ticker tape 111 which has just been relayed or sent out by the keyset operator, has advanced on the moving tape to the checker, the same message in a slightly different form will have appeared on the monitor ticker tape 123 and the two messages on the two tapes will then advance in front of the checker substantially simultaneously. The checker therefore is enabled to compare the originally received quotation on the ticker tape which has added thereto the "high and low" range by editor 112, with the information transmitted to the remote receiving stations as reflected by the record on the monitor ticker tape.

Should the checker detect an error in the message as recorded on the monitor ticker tape 123, he tells the keyset operator to repeat the message, which will again appear on the monitor ticker tape for further checking.

As previously mentioned, the stock quotation that appears on the tape issuing from the stock ticker is of the form illustrated in Figure 10. As is well known, the message or quotation is recorded in offset lines on the tape, the upper case characters representing the name or symbol of the stock appearing on the upper line, and the lower case characters representing the price of the stock appearing on the lower line.

The information, as shown for purpose of illustration in Figure 10, that appears on tape 111 is reproduced on monitor ticker tape 123 in a slightly different form. That is, information appearing on tape 123 is a combination of the information appearing on tape 111 and the information supplied by the editors 112, the range of the particular quotation being supplied by one of the high-low editors. The range symbol 124 appearing on the tape 123 is the information supplied by the editor and the last digit 125 represents the fraction part of the quotation, it being given as a digit signifying the number of eighths in the fraction, the denominator not being shown. In case the quotation contains no fraction, an asterisk or any other convenient mark will appear in its place as shown in the right section of tape 123. Usually a stock is designated by three letters. If, however, a stock is designated by only one or two letters, asterisks or other suitable marks are supplied for the blank positions, as shown for stock K, Figure 11.

In Figures 5 and 7, is suggested a six unit start-stop code adapted for use with a monitor ticker type-wheel. A part of the view shown in Figure 6 is again shown in Figure 8 together with an explanation of the various range symbols and their combinations, which will be more clearly understood hereinafter.

A telephone operator 122 (Figure 1) is provided to receive complaints from the receiving stations, should they desire for any reason to question the correctness of any received quotation message as displayed on the stock board. Operator 122 serves also as a means of detecting apparatus trouble at the receiving station; because, should the repeated sending of the same message cause the message to appear incorrectly on the stock board, the presence of mechanical or electrical trouble will be suspected and immediate steps taken to locate and correct the trouble.

*Transmitting keyset*

Having reference to Figure 12, the keyset comprises essentially a frame 131 on which are supported a bank of key levers 132, a series of notched code bars 133, and a contact mechanism 134. Rotative motion is imparted to main shaft 135 from any suitable source to drive the contact operating mechanism. Key levers 132 are pivoted on common pivot shaft 136 and are adapted to control the shifting of code bars 133 in predetermined combinations by camming engagement with the cam surfaces thereof, shown in Figure 16, in a manner similar to that disclosed in the foregoing patent.

Code bars 133 are adapted to in turn affect setting of the locking latches 137, Figure 16, which control the operation of contact levers 138 to effect the closing of contact springs 141 (carrying contacts 910 to 917) in predetermined combinations. Locking loop 139 is adapted to cooperate with pointed heads 140 of locking latches 137 to prevent changing of the setting of the latches while a character signal is being transmitter, member 139 being biased toward locking position by spring 139' and operated by cam 155 on shaft 135.

There is, however, an important difference between the function of the contact operating mechanism in the aforementioned patent and that used in connection with the present invention. In the first place, in the foregoing patent the contact operating mechanism is adapted to control operation of the contacts, similar to contacts 141, in such manner that a series of impulses are impressed on the line wire successively, no two contacts being closed at the same time, the purpose of said impulses being to control a selecting mechanism of the type, for example, shown in United States Patent #1,745,633, issued February 4, 1930 to S. Morton et al.

On the other hand, in the present invention, the contacts 141 are not influenced by any consideration of signaling time intervals, since closing of contact springs 141 does not cause signaling impulses to be impressed directly on the signal line. On the contrary, current impulses created by closing of contacts carried by springs 141 are directed to energization of certain magnets and relays to effect through sequence relays 115 (Figure 1), the storage of a quotation message in the overlap units, as will hereinafter appear.

Rotation of shaft 135 is controlled by a clutch (not shown) of any well known construction, said clutch adapted to be released by the clutch stop arm 151, Figure 13, to permit one complete revolution of shaft 135, rotation of said shaft thereupon being arrested until again released.

Clutch stop arm 151 is pivotally connected to arm 152 of universal bar 153. Bar 153 is pivoted at 154 and is substantially U-shaped in construction and is adapted to span the entire group of keylevers 132 being disposed therebeneath and in cooperative relation therewith. Each keylever, in addition to moving code bars 133, depresses the universal bar 153, the movement of which is communicated to the clutch stop arm 151. Thus clutch stop arm 151, which controls the starting and stopping of cams 142 to 149 mounted on shaft 135, is controlled by the keyboard keys, and it is apparent that every time a key is depressed, shaft 135 and cams 142 to 149 carried thereby complete one revolution.

Referring now to Figure 14 there is shown dismembered, the series of contact controlling cams 142 to 149 in order to show the timing relation thereof. Associated with each cam 142 to 149 is an individual contact lever 138 adapted to control a set of individual contact springs 141. As set forth in Patent No. 1,595,472, each contact lever 138 is provided on the top edge of its horizontal arm with a hump 157 adapted to cooperate with the periphery of the associated cam, unless constrained by a locking latch 137.

It is noted that in the present invention the contacts 910 associated with cam 142 are normally open while the apparatus is at rest.

Contacts 911 to 915 associated with cams 143 to 147 operate simultaneously unless constrained from operation by their associated latches 137. It is observed that contacts 910 to 916 associated with cams 142 to 148 are closed only for a brief interval, while contact 917 associated with cam 149 is closed for almost the entire revolution of the cam.

Now, as to the timing relation of cams 142 to 149, contact 910 associated with universal cam 142 is the first to close. Contact 917 associated with the cam 149 is controlled solely by the previously described range keys and, when operated, will close simultaneously with the universal cam contact 910 but will remain closed for practically the entire revolution of cam 149. However, contact 910 associated with cam 142 will remain closed for only a brief interval. As the cams continue to rotate, contact 910 associated with cam 142 will again open, and immediately thereafter, the contact associated with cam 148 (controlled solely by the previously described "numeral" keys) will close, unless constrained by its associated latch 137. Immediately after the contact associated with cam 148 again opens (or would have opened, had it been operated) the contacts associated with the cams 143 to 147 close simultaneously; that is to say, the contacts associated with cams 143 to 147 are adapted to close simultaneously and will do so unless constrained from operating by their respective latches 137. Immediately after the operated contacts of cams 143 to 147 are again opened, the contact associated with cam 149, if operated, will again open as all the cams are brought to rest.

Figure 12a suggests a code adapted to be used in connection with the keyset herein described, and in view of the foregoing description will be easily understood. The code bars 133, for the purposes of the code, are numbered one to seven and are associated with cams 143 to 149, respectively, it being understood that cam 142 is not provided with a code bar.

Appropriately mounted on keyset frame 131 is the range key locking magnet 158, to whose armature 159 is fixed the range key locking bar 161. The armature 159 is hinged at 162 (Figure 13), and when the magnet 158 is automatically operated by the seeker unit 117 when this unit is transferring a stored message, it will pull up its armature 159, thus swinging the lock bar 161 up against the underside of the key tops of all range keys. The ERR or error key 1038 is also provided with a stop portion 163 adapted to cooperate with lock bar 161. Thus when magnet 158 is energized the range keys and the ERR key are locked against operation. The purpose of thus locking the range keys and "error" key is to prevent the storage of a succeeding quotation message in the overlap units before the preceding message has been transmitted, thus preventing the obliteration of the preceding message.

It will be noted that the keyset is provided with "first preferred," "second preferred," and "third preferred" keys 1031, 1032 and 1033, respectively. The "first preferred" key 1031 has a contact 918 which is closed when this key is operated, the "second preferred" key 1032 has a contact 919 which is closed when this key is operated, and the "third preferred" key 1033 has two contacts 920 and 921 both of which are closed when the said key is operated. These contacts are also shown in the lower left hand side of Figure 41.

The "No reset" key 1037 is adapted to close contact 922 when operated. Furthermore, "No reset" key 1037 has a bar which allows closing of contact 916 by operation of the #6 code bar. See suggested code of Figure 12a. This is for the purpose of having the "tens" indicator remain stationary for the succeeding set-up of the quotation. In some instances, a quotation already displayed containing the "tens," "units" and "fractions" value need have only the "units" and "fractions" changed, since the "tens" value remains the same. In this case, the "No reset" key is operated whereby the "tens" dial or indicator remains stationary, as will be explained more fully in connection with the circuit diagram.

A brief description of the operation of the keyset will now be given, and the complete operation of the same in conjunction with the remaining apparatus will be clear from the further description thereof with the circuits hereinafter. As previously explained, each stock message includes the letter abbreviation for the stock, its preferred range (as the "first preferred," "second preferred" or the like), the price thereof in tens, units and fractions, and the index range thereof (such as high, low, or the like). Therefore, the operator 113 of each keyset 107 will operate the keys thereof in the above order in accordance with the message on the tape 111 passing before him, and in accordance with the high and low index range added to said tape by the editor 112. As each key is depressed, its key bar 132 will selectively set the notched code bars 133 by a camming action thereon. By this longitudinal movement of the code bars, certain of the latch members 137 will be operated to release their contact levers 138.

Furthermore, each time a key is depressed, the clutch trip bar 151 is operated and shaft 135 makes one complete revolution. In making this revolution, cams 142 to 149 mounted on shaft 135 make one revolution to selectively allow closing of the contacts associated therewith. Contact 910 is not controlled by a code bar 133 and a latch 137, and therefore closes for every revolution of shaft 155, for a purpose hereinafter described in detail. Contacts 911 to 915 are selectively closed in accordance with the setting of the code bars.

From an examination of the sample code shown in Fig. 12a it will be seen that each number key when depressed will allow closing of contact 916 and each range key will allow closing of contact 917, for a purpose fully described hereinafter in connection with the circuits.

*Overlap unit*

In the specific embodiment herein disclosed, each overlap unit, Figs. 17 to 19, comprises for the main part a base 171 and side frames 172 and 173. Bridged between frames 172 and 173 are magnet mounting bracket 174, contact mounting bracket 175, and contact lever bracket 176; also spanned between said side frames and suitably journaled therein are drive shaft 177, intermediate shaft 178 and contact bail shaft 179. On bracket 175 are mounted a series of contacts 181, selectively controlled in a manner as will presently appear. Also mounted on said base 171 is a motor 182, having a rotating armature shaft 183 suitably mounted in bearings (not shown) carrying on its end a worm or pinion meshing with worm gear 184 loosely mounted on main shaft 177, which is suitably journaled at 185 and 186 in side frames 172 and 173 respectively. Gear 184 is fixed to flange 187 of clutch driving member 188, also loosely mounted on shaft 177. Gear 184 and clutch member 188 thus united are restrained from longitudinal movement on shaft 177 by collars 189, which are fixed to said shaft 177 (one only being shown). Also, slidably mounted on shaft 177 and adapted to cooperate with driving member 188 is clutch driven member 192, one end of which is provided with teeth to mesh with similar teeth in member 188, the other end being provided with a groove 193 adapted to receive end of clutch throw-out lever 194, hereinafter described, and this end of member 192 is also adapted to have a splined connection with collar 195 fixed to shaft 177. Thus it will be noted that rotation is imparted to shaft 177 by collar 195, by reason of the cooperative relationship between said collar 195 and clutch members 188 and 192, gear 184 and shaft 183.

Suitably mounted on base 171 of the overlap unit and appropriately positioned with respect to clutch driven member 192 is clutch trip magnet 196, the armature 197 of which is fixed to aforementioned clutch throw-out lever 194. Clutch throw-out lever 194 is pivoted at 198 to base 171 of overlap unit, and comprises two arms adapted to fit into peripheral groove 193 and disposed on diametrically opposite sides of clutch member 192. Energization of magnet 196 causes armature 197 to be attracted, which imparts movement toward the right (as viewed in Figure 19) to throw-out lever 194 about its pivot 198, which in turn causes driven member 192 of the clutch to move to the right into engagement with constantly rotating driving member 188. When magnet 196 becomes de-energized, armature 197 is released, and lever 194 is induced to move in the opposite direction by its spring 199 secured to lever 194 and to the frame of the overlap unit.

Fixedly mounted on main shaft 177, and rotatable therewith are contact bail operating cam 201 and selector reset bail cam 202. Cam 201 is adapted to cooperate with bell crank 203 loosely mounted on intermediate shaft 178. Cam 202 is adapted to cooperate with bell crank 204, also loosely mounted on shaft 178. The end of arm 205 of bell crank 203 is provided with follower roller 206, and the end of arm 207 of said bell crank 203 is provided with an adjustable striker screw 208 adapted to co-act with arm 209 of contact bail lever 211. To the end of the other arm 212 of said lever 211 is secured one end of contact bail blade 213, the other end of which is secured to the end of contact bail lever 214 (Figure 19). Contact bail levers 211 and 214 are fixed to contact bail shaft 179, since they must act together with respect to contact bail blade 213. The contact bail constantly tends to rotate in a counterclockwise sense (as viewed in Figure 17) under influence of spring 215, secured to arm 212 of contact bail lever 211, and to the side frame of the overlap unit. Thus, follower roller 206 is constantly in contact with the periphery of cam 201 due to the action of lever 211 upon bell crank 203.

The end of arm 216 of bell crank 204 is provided with follower roller 217 adapted to co-act with cam 202. To the end of the other arm 218 of bell crank 204 is secured one end of adjustable connecting link 219, the other end of which is secured to the end of reset bail arm 221 suitably fixed to reset bail 222. Reset bail 222 comprises, in the present embodiment, a shaft suitably journaled at its ends in selector bracket 223, hereinafter described, and flattened on one side intermediate its ends to receive the selector lever reset bail blade 224 fixed thereto. Bell crank 204 tends to rotate in a clockwise sense (as viewed in Figure 17) under the influence of spring 225 secured to its arm 218 and to the frame which spring 225 also tends to hold follower roller 217 in contact with the periphery of cam 202.

Mounted on magnet mounting bracket 174 are selector magnets 226, armatures 227 of which are pivotally connected at points 228 and adapted to cooperate with plungers 229 individual to each armature 227. It will be noted that selector magnets 226 are mounted above and below the center line of bracket 223 and their armatures 227 extend upwardly and downwardly in an alternate alignment to cooperate with plungers 229. Movement of armatures 227 is adjustable by means of appropriately mounted adjusting screws 231. Likewise, movement of plungers 229 with respect to the armatures is adjustable by means of adjusting screws 232 suitably mounted in each armature 227. Plungers 229 are under the action of compression springs 233 individual thereto and tend to hold armatures 227 in their released or unoperated position against stops 231.

Secured to magnet mounting bracket 174 is selector bracket 223, which is adapted to carry, in addition to reset bail 222, detent levers 234, and selector levers 235, individual to each plunger 229. Detent levers 234 are pivotally mounted on a common fulcrum rod 236 fixed to bracket 223; similarly, selector levers 235 are pivotally mounted on a rod 237. Clockwise rotation is normally imparted to detent levers 234 by individual compression springs 238. Counterclockwise rotation is normally imparted to selector levers 235 by individual springs 239 secured to the heel 241 of each selector lever and to selector lever spring plate 242.

As noted in Figure 17, detent levers 234 and their associated selector levers 235 are provided with cooperating notches, adapted to engage each other when the levers 234 and 235 are in their normally unoperated or unselected position. This normal position is indicated in solid lines in Figure 17.

Pivotally mounted on common fulcrum rod 243 in contact lever bracket 176 are a group of contact levers 244, each lever individual to a selector lever 235. Each contact lever 244 is provided with an arm 245 adapted to co-act with arm 246 of its associated selector lever 235. Each contact lever normally tends to rotate in a counterclockwise sense under the influence of its individual spring 247 secured to arm 245 and to contact lever spring plate 248. That side of each contact lever 244 oppositely disposed to its arm 245 is provided with an undercut notch 249 adapted to receive contact bail blade 213 when said contact lever has been moved to its selected position. Disposed above each contact lever 244 is a set of spring contacts 181, of wellknown construction, appropriately mounted on contact mounting bracket 175. Contacts 181 are normally open. The lower contact spring is extended into cooperative relation with its associated contact lever 244.

In Figure 18 is shown a double spring contact 251, which may be substituted for the single contact shown in Figure 17, if it is desired to use the overlap unit for polar or double-current operation. When the double spring contact is used, upper contact 252 is normally open and lower contact 253 is normally closed. Also, the central contact spring is extended into cooperative relation with its associated contact lever 244.

Mounted on terminal bracket 254, are terminal points to which are connected the ends of the wires leading from the sequence relays, as will hereinafter appear, and also the ends of the selector magnet windings. Now, when any of the selector magnets 226 is energized, it attracts its armature 227 urging its associated plunger 229 to the right (as viewed in Figure 17) against the action of compression spring 233. This movement of an operated plunger 229 imparts counterclockwise rotation to its associated detent lever 234, against action of its individual spring 238, thus causing unlatching of its associated selector lever 235, which will rotate in a counterclockwise sense due to its spring 239. This rotation of selector lever 235 is not prevented by the reset bail 224, because said bail is at this time in its unoperated position as shown in full lines. This counterclockwise rotation of selector lever 235 imparts clockwise rotation to its associated contact lever 244 about common fulcrum 243 against the action of individual spring 247.

The actuated selector levers 235 and contact levers 244 have now assumed the dotted position shown in Figure 17, so that undercut notches 249 of the contact levers 244 are disposed above contact bail blade 213. Bail blade 213 in its upward movement is adapted to engage the undercut notches 249, and carry the selected contact levers 244 with it, thus causing the said contact levers to press against the extended contact spring of its associated contact 181 to effect the closing of said contact 181, as shown in Figure 17A. In the case of the double contact spring 251 shown in Figure 18, the operation of contact lever 244 just described will effect closing of upper contact 252 and opening of lower contact 253. Of course, the unselected contact levers 244 are not affected by bail 213 and thus their associated contacts 181 remain unaffected.

Thus various magnets 226 which are selectively energized by the keyset 107 trip off their selector levers 235 to position certain selected contact levers 244 for operation by bail 213 when start magnet 196 is energized to initiate rotation of cam 201 on shaft 177. The timing arrangement whereby start magnet 196 is energized will be explained hereinafter with the circuits.

Figure 17a shows the normal position of the contact bail 213 and the associated levers after bail 213 has been operated by cam 201. In this position, the stock quotation to be transmitted is stored, that is, the selected contacts have all been simultaneously closed according to the code combinations of the characters in the quotation. This position is maintained until the stored message is transferred from the overlap unit by the seeker unit, hereinafter described, to the signal line through the transmitting distributor. Immediately after the contact bail 213 has assumed the elevated or operated position shown in Figure 17a, reset bail 224 is operated by its cam 202 and oscillates to the dotted position 255 and immediately returns, and in so oscillating rotates these selector levers 235, which were actuated during the previous cycle, in a clockwise sense until they again become engaged with their associated detent levers 234, levers 234 having previously been released by de-energization of magnets 226. While a message is thus stored in the contacts of the overlap unit awaiting to be transmitted over the line, a succeeding message can be set up on the keyset which will affect the selector levers 235 and contact levers 244, as previously set forth. This operation follows from the shape of cams 201 and 202. Cam 201 has a relatively short low portion, and cam 202 has a short high portion, whereby when these cams rotate, the first effect is to allow the previously set contact levers 244 to move to the full line position (Figure 17) by roller 206 entering low portion of its cam 201. Then cam 201 at once resets bail 213 by roller 206 passing back to a high portion of its cam, thus engaging the last selected contact levers 244 with their contacts. Then high portion of cam 202 at once resets the trip levers 235, whereby the next selection thereof may proceed.

The newly selected contact levers 244 thus will bear against contact bail blade 213 preparatory to being raised after the previous message has been transmitted and the contact bail again dropped to its original position shown in Figure 17, in which case those contact levers which were selected for the previous message, but are not selected for the next message, will return to their normal, unselected position under the influence of their respective springs 247. On the other hand, those contact levers which are again selected for the next message will still remain in their selected position to be again raised, as previously described. The time required for this oscillation of the contact bail 213 is of short duration, and when blade 213 is again caused to rise, it will intercept the selected contact levers 244, through engagement of the blade 213, within the undercut notches 249.

The end of clutch driven member 192 opposite the toothed end is provided with a notch 256 (Figure 19), adapted to cooperate with a detent member 257 (Figure 17). The purpose of this detent arrangement is to prevent spinning of driven member 192 on shaft 177 when in the released position. In the latter position spring 199 tends to pull the clutch driven member 192 toward the left (as viewed in Figure 19), through clutch throwout lever 194, and hold said member 192 against the detent 257. Member 192 thus will be permitted to rotate due to frictional relation with shaft 177 only until said notch 256 engages the detent member 257.

Also fixedly mounted on shaft 177, as shown in Figure 19, is timing cam 258 adapted to cooperate with contacts 259 and 260 of well known construction, appropriately mounted on the base of the overlap unit, the purpose of which will be fully described hereinafter.

Overlap units of similar construction, but in which timing of the various cams is varied to suit the conditions, are provided at the receiving station, their functions being described hereinafter.

Stock selector

Figure 20:
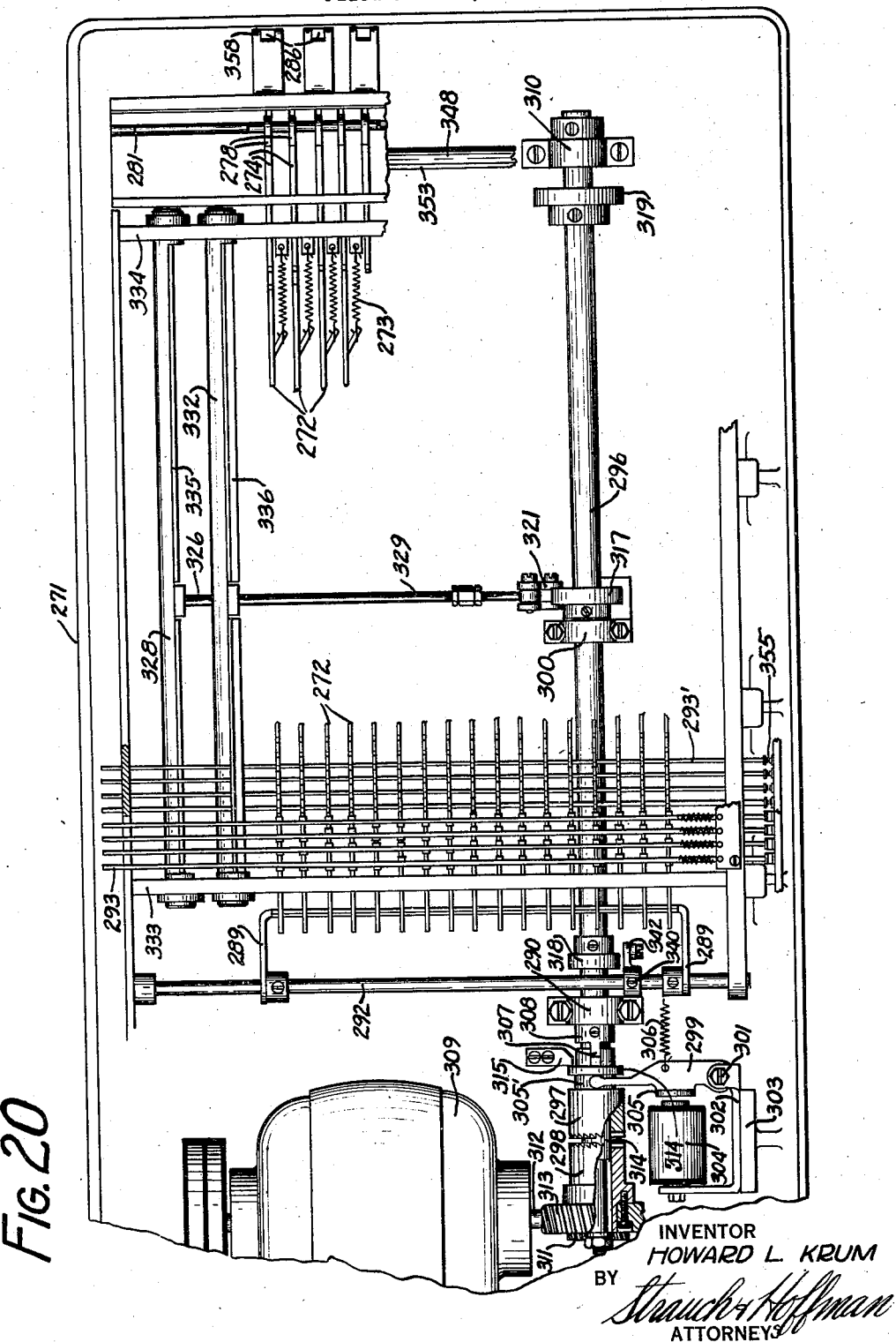
Figure 20 is a plan view of the stock selector with parts removed.

The stock selector, Figures 20, 21 and 22, comprises a frame 271 in which are mounted a series of slidable permutation bars 272. In the present instance, there are seventeen such bars 272, corresponding to the three five-unit code combinations, hereinafter set forth, and the two preferred stock permutation bars. The three five-unit code combinations correspond to a stock designation composed of three letters. Permutation bars 272 are under tension to the right (as viewed in Figure 20), by individual springs 273 each secured to its associated bar 272 and to the framework. At one end of each permutation bar 272 is a spring-pressed selector lever 274 (Figure 21) pivoted at 275 on support 276, levers 274 being normally held in an unoperated position by engagement with a notch 277 in a detent lever 278. Springs 279 bias levers 274 clockwise about pivots 275. Each detent lever 278 pivoted at 281 is urged counterclockwise by compression spring 282. When a lever 274 is held by detent 278 in its unoperated position, its permutation bar 272 is permitted to move to its extreme right hand position under tension of spring 273. Engaging a projection on each lever 278 is a plunger 283, which extends through a guide passage in the selector magnet mounting plate 284, and the outer end of which engages a screw 285 adjustably mounted in the end of individual armature 286. When an individual magnet 287 is unenergized its armature 286 is held outwardly by action of helical spring 288 upon plunger 283 through screw 285 adjustably secured in end of armature 286.

When an individual magnet 287 is energized, its armature 286 is attracted toward it, and through plunger 283 rocks detent lever 278 clockwise against action of its spring 282, releasing selector lever 274 and permitting tension of spring 279 to be transferred to the associated permutation bar 272. This has no effect at this time, however, as bar 272 is locked by a locking bar or loop 289 pivoted at 292, the operation of which will be described immediately hereinafter. Incidentally, operation of selector levers 274 and detent levers 278 in this instance is the same as that previously described in connection with similar levers 235 and 234 in the overlap unit (Figure 17).

Located above and below permutation bars 272 and disposed transversely thereof are two series of selector bars 293 and 293'. Selector bars 293 and 293' each have projections 294 corresponding to each permutation bar 272 and permutation bars 272 have slots 295 corresponding to each selector bar. The slots and projections in both cases are equally spaced on the bars. The projections or lugs 294 on the selector bars 293 and 293' are bent to the right or left depending upon whether the corresponding permutation bar 272 is in its right or left hand position when that particular selector bar 293 or 293' is to be selected. Each selector bar 293, or 293' will have its lugs 294 bent in a different arrangement of right and left hand positions, according to the permutation corresponding to that selector bar. Lugs 294 are bent to the right for operated permutation bars 272 and to the left for unoperated permutation bars. It will be noted then that if the permutation bars 272 are set corresponding to a certain received signal, the selector bar 293 corresponding to this signal and having its lugs 294 bent in a corresponding manner will have each of its lugs 294 aligned with a slot 295 in the corresponding permutation bar 272 and be permitted to operate as presently described.

Selector frame 271 has mounted therein a rotatable shaft 296 suitably journalled in antifriction bearings mounted in bearing brackets 290, 300 and 310 (Figure 20). On shaft 296 and adapted to rotate therewith and slide longitudinally thereon is clutch driven member 297, which is normally held out of engagement with clutch driving member 298 by means of clutch throwout lever 299 pivotally mounted at 301 on support 302. Support 302 is adapted to be secured to bracket 303 integral with frame 271. Suitably mounted on said support 302 and appropriately positioned with respect to clutch driven member 297 is clutch trip magnet 304, the armature 305 of which is fixed to clutch throwout lever 299. Clutch throwout lever 299 comprises two arms adapted to fit into peripheral groove 305' and disposed on diametrically opposite sides of clutch member 299. Energization of magnet 304 causes armature 305 to be attracted, imparting counterclockwise motion (as viewed in Figure 20) to throwout lever 299 about pivot 301, which in turn causes clutch driven member 297 to move to the left into engagement with constantly rotating driving member 298. When magnet 304 becomes de-energized, armature 305 is thereby released, and lever 299 is induced to move in a clockwise sense by its spring 306 secured thereto and to frame 271.

Clutch driven member 297 has a splined connection at 307 with collar 308 fixed to shaft 296 through which rotation is imparted to shaft 296 by clutch driving member 298, which derives its rotative motion from motor 309 through pinion 311, fixed to its shaft 312, and gear 313 fixed to said clutch member 298. Driven clutch member 297 is prevented from rotating, due to its frictional relation with sleeve 314, by the engagement of detent 315 with a notch in member 297.

Secured to shaft 296 are three cams 317, 318 and 319. Cam 317 is in operative relation with bail operating lever 321 (Figure 22) which is pivoted at 322 to journal bearing bracket 300. Lever 321 is provided with follower roller 323 adapted to co-act with cam 317. Lever 321 normally tends to rotate in a clockwise sense (as viewed in Figure 22) under the influence of spring 324 secured to a spring post 325 mounted on link 326 (presently described) and to bearing bracket 300, tending to hold follower roller 323 continually in contact with the periphery of cam 317. Pivotally connected to the end of one arm of lever 321 is connecting link 326, the other end of which is pivotally connected to end of arm 327 of the lower selector bar bail 328. Pivotally connected to the other arm of lever 321 is one end of connecting link 329, the other end of which is pivotally connected to end of arm 331 of the upper selector bar bail 332. Selector bar bails 328 and 332 each comprise, in the present embodiment, a shaft suitably journaled at its end in cross-bars 333 and 334 (Figure 20), and are flattened on one side intermediate the bearings to which side is secured bail blades 335 and 336 respectively, the function of which will hereinafter appear.

Fixedly mounted on shaft 296 and substantially adjacent to the left end of permutation bars 272 is the permutation bar locking loop cam 318 (Figure 21). Associated with said cam 318 and adapted to cooperate therewith is the locking loop lever 337 pivoted at 338 to bracket 339, which is suitably attached to base of stock selector frame 271. Secured to the free end of lever 337 is a follower roller 341 adapted to co-act with cam 318. Also pivotally connected to lever 337 near its free end is one end of connecting link 342, the other end of which is pivotally connected to arm 340 fixed to locking loop fulcrum rod 292, which is journaled at its ends for rotation in frame 271. Also, fixed to fulcrum rod 292 is the permutation bar locking loop 289, which is adapted to engage V-shaped notches 343 and 344 near the ends of permutation bars 272, to lock said bars 272 in either of their two possible positions, as will hereinafter appear. Locking loop 289 constantly tends to rotate in a counterclockwise sense (as viewed in Figure 21) under influence of spring 345 secured to the locking loop and attached to a suitably constructed spring post 346. As is apparent, the action of spring 345 upon locking loop 289 tends to hold follower roller 341 through link 342 and lever 337, always in contact with the periphery of cam 318.

Associated with a cam 319 carried by shaft 296 and adapted to cooperate therewith is the selector lever bail arm 347 fixed to selector lever bail 348, and carrying at its free end a follower roller 349 adapted to co-act with cam 319. Arm 347 normally tends to rotate in a counterclockwise sense (as viewed in Figure 21) due to the tension of spring 351 secured to arm 347 and attached to spring post 352 mounted on bracket 310. Thus it is apparent that follower roller 349 is continually in abutting relation with the periphery of cam 319. Selector lever bail 348 comprises, in the present embodiment, a shaft suitably journaled at its ends in frame 271, and is flattened on one side intermediate of the bearings to which side is secured bail blade 353.

Upper and lower selector bears 293, 293' are spring operated, normally tending to move toward the left (as viewed in Figure 22) under action of individual springs 354 and 354', to close contacts 355 and 355' individual to each selector bar; said contacts 355, 355' being appropriately mounted in the stock selector frame 271. The right hand ends of selector bars 293, 293' have notched ends 356 to be introducible over comb slots 357, and so become locked against any except limited longitudinal motion.

It is understood that each stock selector unit as shown will have selector bars 293, 293' corresponding to only a fraction of the total possible number of permutations of seventeen elements. In any particular case, any number of these units may be used and while all the units will operate for each signal, only one selector bar 293, 293' will operate in one of the units. If a signal is received corresponding to a stock not represented on a particular board, no selector bar will be operated. It will also be noted that by removing one of the selector bars 293, 293', another having a different combination of bent lugs 294 may be substituted and thereby change the stock quoted in that particular position.

Referring to Figure 21, a terminal bracket, not shown in this instance but similar to terminal bracket 254 in Figure 17, is associated with selector magnets 287, and on it are mounted terminal points to which are connected not only the ends of the wires leading from an overlap unit at the receiving station, but also the ends of the selector magnet windings. Now, when any selector magnet 287 is energized, it attracts its armature 286 urging its associated plunger 283 to the left against the action of compression spring 288. This movement of plunger 283 imparts clockwise rotation to its associated detent lever 278, against action of its individual spring 282, thus causing the unlatching of its associated selector lever 274. The releasing of lever 274 will permit the tension of its individual spring 279 to be transferred to the associated permutation bar 272, but as hereinbefore set forth, this transference will have no effect until locking loop 289 is disengaged from notch 343 or 344.

However, there is a slight amount of clearance at point 359 between selector levers 274 and permutation bars 272 just sufficient to permit end 361 of selector lever 274 to be tripped off or become disengaged from notch 277 of detent lever 278. Incidentally, springs 279 (Figure 21) are stronger than springs 273 (Figure 20) associated with permutation bar 272, because in moving a permutation bar 272 to the left, spring 279 must overcome the tension of spring 273. The sole purpose of springs 273 is to move the permutation bars 272 to their right hand positions after being released by locking loop 289.

After the stock selection has been made and the selector levers 274 thus are conditioned to effect, at the proper time, the transference of the selection to permutation bars 272, clutch trip magnet 304 is energized and the consequent attraction of its armature 305 will, through throwout lever 299, effect engagement of clutch members 297 and 298, and thereby initiate rotation of shaft 296.

The next step in the cycle of operation is the disengagement of locking loop 289 from the notches 343 or 344 in the permutation bars 272, which is effected by cam 318, hereinbefore mentioned. An apex of short dwell in cam 318 causes lever 337 to rotate slightly in a counterclockwise sense (as viewed in Figure 21) which in turn, through link 342, causes locking loop 289 to rotate slightly in a clockwise sense. Locking loop 289 thus is held out of operative relation with permutation bars 272 for an interval of time sufficient to allow said bars 272 to adjust themselves to receive a new selection, each under action of its individual spring 273 for movement to the right, or under action of spring 279 for movement to the left. Of course, it is possible that the setting of a permutation bar 272 is the same for successive stock selections, in which case, it is obvious, that no movement will occur.

The change in setting of the permutation bars having taken place, the apex passes by and follower roller 341 again returns to the low part of cam and permits the action of spring 345 to effect engagement of locking loop 289 with notches 343 or 344, as previously set forth.

Immediately following setting of permutation bars 272, selector lever reset bail 348 is oscillated to effect restoration of selector levers 274 to their latched position, as described hereinbefore in connection with levers 235 in Figure 17.

The next step in the cycle of operations of the stock selector is the releasing of the selector bars 293, 293', which is accomplished as follows. Referring to Figure 22, it will be noted that selector bars 293 and 293' are normally held to the right by bail blades 336 and 335 respectively, against the tension of individual springs 354. As previously mentioned, bails 332 and 328 are oscillated by means of cam 317, through lever 321 and links 329 and 326. In the course of the rotation of cam 317, a point is reached after permutation bars 272 have been set when follower roller 323 assumes abutting relation with the low part of said cam, thus permitting lever 321 to rotate slightly in a clockwise sense under the action of spring 324 to effect through links 329 and 326 simultaneous rotations of bails 332 and 328, bail 332 rotating slightly in a counterclockwise sense to release upper selector bars 293 and bail 328 rotating slightly in a clockwise sense to release the lower selector bars 293'. Thus, releasing of selector bars 293 and 293' in this manner will permit one of the selector bars, namely, that which corresponds to the series of aligned notches in the set of permutation bars 272, to move to the left under the action of its spring 354 to effect closing of its individual associated contact 355 or 355'. The effect of closing one contact 355 or 355' to actuate a particular stock unit will now be described. As the contact is allowed to remain closed for a short interval due to the dwell of follower roller 323 on the low part of cam 317, said roller 323 again rises to the apex of cam 317 to effect again the rotation of bails 332 and 328, each in their own directions, in which event the selector bars 293 and 293' are restored to their normal positions, thus completing the cycle of operations.

Stock board

In the present embodiment, the stock board comprises an aggregation of similar vertical sections 371, which may be assembled to suit the space where the stock quotations are to be displayed. With reference to Figures 3 and 4, it will be noted that each section 371 comprises a base unit 372 upon which is mounted one or more tiers of units 373, each of which in the present embodiment, comprises a framework adapted to carry a group of price-setting units 374 arranged in three vertical columns, each column containing four such units 374. Of course, it is obvious that this arrangement of price-setting units can be varied to suit the individual needs of each broker, but an arbitrary condition for purposes of illustration has been assumed.

Suitably journaled in each unit 373 (Figure 3) is a frontwardly disposed vertical row of shafts 375 and a rearwardly disposed vertical row of shafts 376. The shafts 375 in the front row are adapted to control those stocks included in channel #1, hereinbefore mentioned, and shafts 376 are adapted to control those stocks included in channel #2. Said rows of shafts are also adapted to be coupled endwise to corresponding shafts in the vertically adjacent units 373, and also to corresponding shafts in the base unit 372, one such coupling being shown in the broken section of Figure 3.

Base unit 372 (Figures 3 and 4) comprises a frame in which are appropriately journaled a group of vertically and horizontally disposed shafts 377, 378, 379 and 380. Vertical shafts in rows 377 and 378 are adapted to be coupled with corresponding vertical shafts in rows 375 and 376 respectively. Similarly, horizontal shafts 379 and 380 are adapted to be coupled to corresponding horizontal shafts in adjacent base units 372. Suitably mounted on horizontal shafts 379 and 380 for rotation therewith are gears 381 (Figures 24 and 29) adapted to intermesh with corresponding gears 382 fixed to the bottom ends of vertical shafts in rows 375 and 376, there being a horizontal shaft provided for each of said vertical shafts for purposes which will hereinafter appear. Also, suitably secured to horizontal shafts 379 and 380 are gears 383 adapted to mesh with similar gears 384 in the price selecting units 385 (Figure 23), as will be described in the following.

Price selecting unit

Mounted on one of the base units 372 (Figures 1 and 29) are a pair of price selecting units 385, 385', one such unit 385, 385' being provided for each channel, #1 and #2. In the present embodiment of this invention, upper unit 385 (Figures 4 and 29) controls price-setting units 374 pertaining to stocks in channel #1 and lower unit 385' controls price-setting units 374 pertaining to stocks in channel #2. These units are identical for each channel, the lower unit 385' merely being inverted to promote the compactness of the apparatus.

Referring to Figures 23, 24 and 29, it will be noted that price selecting unit 385 comprises base member 386 on which is suitably mounted motor 387 which supplies power through pinion 388 and associated gear 389 to shaft 391 journaled in brackets 392 and 393 fixed to base member 386. Incidentally, the operation of the motor 387 may be continuous or it may be intermittent. In the latter case, the sequence of operations is so timed that the motor is started sufficiently in advance of the setting of the code disks in the selector magnets, hereinafter described, to have attained its speed when the clutch trip magnet, presently described, is energized.

Fixed to shaft 391, and rotatable therewith, is driving member 394 of a toothed clutch, driven member 395 of which is loosely mounted for longitudinal movement on said shaft and is adapted to be moved into and out of engagement with member 394. Appropriately located with respect to clutch members 394 and 395 and mounted on a suitable bracket 396 fixed to base member 386 is clutch trip magnet 397, armature 402 of which is suitably fixed to clutch throwout lever 398. Lever 398 is pivotally connected at 399 to bracket 396 (Figure 24). The free end of lever 398 is adapted to fit in peripheral groove 401 in clutch member 395. Thus energization of magnet 397 attracts armature 402 (integral with lever 398), which causes lever 398 to rotate in a clockwise sense (as viewed in Figure 24) to effect operative engagement of clutch members 394 and 395. De-energization of magnet 397, on the other hand, releases its armature 402, thus permitting clutch member 395 to be moved out of operative relation with clutch member 394, by reason of the tension of spring 403 on lever 398.

Fixed to the end of shaft 391 is a gear 405 adapted to mesh with gear 406 fixed to the end of cross-shaft 407 suitably journaled in brackets 408 and 409. Appropriately located on shaft 407 and fixed thereto are gears 411, 412, 413 and 414, adapted to mesh with gears associated with selector mechanisms 415, 416, 417 and 418, Figure 23, a pair of which is disposed on each side of shaft 407. Each selector mechanism 415 to 418 is appropriately mounted in a suitable individual bracket 419, fixed to base member 386 (Figure 23). Each selector mechanism comprises a shaft 421, one end of which is journaled in individual bracket 419 and the other end journaled in a suitable individual friction bearing 422.

Referring to Figure 23, showing the selector mechanism 418 in detail, it is noted that concentric with shaft 421 is a series of four loosely mounted spaced notched code disks 423 carried between guide plates 424 and 425, and spaced by separators 426 carried on a shaft engaging thimble 427. Each disk 423 is adapted to occupy one or the other of two positions to which it is moved by means of individual transfer levers 428, Figure 25. Transfer levers 428 are pivotally mounted at the end of arm 429 of lever 430 which is pivotally connected at 432 to individual bracket 419. Arm 429 is caused to oscillate, to effect shifting of the code disks, by movement of arm 431 of lever 430, as will hereinafter appear.

Appropriately positioned to co-act with transfer levers 428 are individual selector levers 433, pivotally mounted at 434 in selector magnet bracket 435, which in turn is fixed to bracket 419. Mounted on bracket 435, on the side oppositely d'sposed to transfer levers 428 are individual selector magnets 436, armatures 437 of which are integral with selector levers 433. Transfer levers 428 are adapted to go through two different movements, first a reciprocating movement, imparted by the oscillation of arm 429 and then a rocking movement. Abutments 438 and 439 on selector levers 433 are positioned to the right of arms 441 and 442, of transfer levers 428 (as viewed in Figure 25), and are spaced more closely together than the ends of arms 441 and 442, so that as selector lever 433 vibrates in response to the energization and de-energization of magnets 436, abutments 438 and 439 alternately move into or out of alignment with the ends of arms 441 and 442. Abutments 438 and 439 will cooperate with their associated arms 441 and 442, as transfer levers 428 are reciprocated by lever 430.

Assuming that lower selector magnet 436 of Figure 25 is energized, its associated selector lever 433 is caused to rotate in a clockwise sense, due to the attraction of its armature 437, thus presenting its abutment 438 into cooperative relation with arm 441 of its associated transfer lever 428, so that when transfer lever 428 is carried to the right by oscillation of arm 429, lever 428 will be caused to rotate in a counter-clockwise sense about pivot 443, thus urging its associated code disk 423, through arm 444 of lever 428, to its clockwise position. Conversely, de-energization of this selector magnet 436 will in a similar manner cause rotation of its associated code disk 423 to its counterclockwise position, due to tension of spring 445 which moves the levers to their unoperated position. A spring 445 is connected to each two selector levers 433.

Arranged circumferentially around the notched disks 423 is a series of spring-pressed rods 446 (Figure 23), carried in notches in end guide plates 424 and 425 and guide plate 447, and held in position by pressure of a coiled spring 448 encircling all of rods 446, guide plate 447 being maintained in spaced relation to plate 425 by a tubular member 449. Rods 446 each carry a set of rollers 451 arranged opposite notches in code disks 423. The notches in the disks are so arranged that for every combination of setting of the disks, a notch in each of the disks is in alignment with the notches in all of the other disks and the particular rod 446, which is opposite these aligned notches, will drop therein due to pressure of spring 448. These notches are also fashioned so that when the disks are reoperated in accordance to the new code combination of impulses, the particular rod, which has previously dropped into the notches, is cammed out and held on the outer circumferential edge of the disks. As a result of the new alignment of the disks, the particular rod 446 opposite the new aligned notches drops therein.

Carried on shaft 421 of each selector mechanism, and adapted to cooperate with the ends of rods 446 is a stop member 452, Figure 26, which is rotatable with shaft 421 in the following manner. Fixed to each shaft 421 and adapted to rotate therewith, and adjacent to guide plate 424, is a clutch driving member 453 (Figure 28) of a self-disengaging clutch 450. Slidable longitudinally on shaft 421 is clutch driven member 454 adapted to engage member 453 and comprising a barrel shaped portion 455 integral with the clutch portion 454. Stop member 452 comprises a yoke portion 457, adapted to fit over portion 455 of clutch member 454, and diametrically disposed arms 458 and 459; arm 458 being pivotally connected at 461 to post 462 fixed to gear 384 (Figures 26 and 28). It will be recalled that each gear 384 meshes with a gear 383 secured to horizontal shafts, 379 or 380, and thus rotation of each gear 384 is imparted to its individual horizontal shaft 379 or 380 and thus to individual vertical shafts 377 or 378. Stop member 452 normally tends to rotate about pivot 461 counterclockwise (as viewed in Figure 28), due to the action of compression spring 463 on its arm 459.

Mounted on the yoke portion 457 of stop member 452, and on diametrically opposite sides thereof are studs 464 adapted to cooperate with diagonal slots 465 in barrel portion 455. Surrounding shaft 421 and positioned within barrel portion 455 is a helical spring 460, one end of which bears against the fixed clutch member 453 and the other end against the end wall of barrel portion 455, thus normally urging the driven member 454 of the clutch out of engagement with driving member 453. For a reason that will presently appear spring 463 should be able to overcome the pressure of spring 460.

As stop member 452 rotates, it moves past rods 446 resting on the outer peripheries of the code disks, and just outside the path of member 452. When, however, an alignment of notches occurs and one rod 446 drops into the aligned notches, its end shown in Figures 23 and 28 moves into the path of the stop member 452 thereat arresting the latter. It is noted in Figures 23 and 26A that the arm 459 of stop member 452 is provided with an inclined edge 466, which is adapted to co-act with the ends of rods 446 so that, since the rods 446 are immovable endwise, arm 459, due to the action of said inclined edge 466 on the end of a selected rod 446, will be urged away from the end of rod 446 until disengagement of clutch members 453 and 454 is effected. In the present preferred embodiment, the parts are so adjusted that disengagement of members 453 and 454 is completed at the time the end of the selected rod 446 reaches the middle of the inclined edge 466.

Now, referring to Figure 28, when a rod 446 of the selector mechanism is cammed out of cooperative relation with arm 459 of stop member 452 by a new setting of discs 423, member 452 will be oscillated counterclockwise, due to the action of spring 463 (this position being indicated in dotted lines in Figure 28). Due to the fact that spring 463 is stronger than spring 460, driven clutch member 454 will be carried by studs 464 into operative engagement with driving member 453. Stop member 452 thus will be driven with shaft 421, until it engages another selected rod 446, at which time it will be oscillated, due to the action of inclined surface 466 on the end of rod 446, to its right hand position against the action of spring 463. When member 452 is stopped by rod 446 the slots 465 by their wedging action on studs 464 assist the rods 446 in biasing the member 452 to the right. Simultaneously, however, spring 460 is continually urging the portion 455 to the right to keep the studs 464 bottomed in their individual slots 465 and thus tends to carry member 454 out of mesh with member 453. Thus the angularity of slots 465 operate to disengage the teeth of clutch 450.

To prevent back-slipping of stop member 452, due to the pressure of rod 446 on inclined surface 466, there is provided a friction roller clutch 467, Figure 27. Clutch 467 comprises a ring portion 468 which is rigidly held from rotation by pin 469, one end of which fits an aperture or notch in said ring 468, and the other end is fixed to journal bracket 422. Within said ring portion 468 is a movable portion 471 secured to gear 384 to be rotatable therewith. Cut on the periphery of portion 471 are four V-shaped notches 472 in which reside rollers 473. Through this clutch motion of shaft 421 is possible in a clockwise sense (as viewed in Figure 27) but impossible in a counterclockwise sense.

In Figure 26a is shown an alternate form of arm 459 of stop member 452 in which said arm 459 is provided with a positive stop portion 493, a flattened portion 497 being provided beside stop 493, to prevent any back-slip of arm 452 after it has stopped, since pin 446 is engaging flattened portion 497. This stop portion 493 enables the stop member 452 to be stopped always in the exact position. When this form is employed, a friction clutch may be substituted for clutch 450, and the clutch 467 eliminated. Where only a moderate degree of exactness is required the use of clutch 450, together with a stop member 452 which is provided with an incline 466, may be preferred due to its freedom from wearing parts.

In this manner, angular rotation of stop member 452 is selectively determined in accordance with the operation of code disks 423 which in turn are selectively operated by the associated selector magnets 436 which, as described above, are in turn energized selectively in accordance with the received code combinations of impulses for indicating the price and range of the quotation. Incidentally, selector mechanism 415, in the present embodiment, determines the range characteristic of the quotation; selector 416 determines the tens value, and as will hereinafter appear, also the hundreds value of the quotation; selector 417 determines the units value and selector 418 determines the fractions value of the quotation. Although a preferred form of selector mechanism is here shown, any other well known type may, if preferred, be used.

In order to engage transfer levers 428 with selector levers 433, oscillatory motion is imparted to aforementioned lever 431 in the following manner. Associated with a cam 404 on driven shaft 391 (see Figure 23) and adapted to cooperate therewith is follower roller 474, mounted on the end of connecting bar 475. Bar 475 is guided near its upper end by a pair of rollers 476, suitably mounted adjacent to the follower roller 474. Pivotally connected to bar 475 at points 477 (Figure 25) are the ends of arms 431 of levers 430 associated with selector mechanisms 416 and 418, it being understood that there is one such lever 430 associated with each selector mechanism.

Similarly, referring to Figure 23, pivotally connected to the ends of arms 431 of the lever 430 associated with selector mechanisms 415 and 417 is connecting bar 481. Pivotally connected at 482 to bracket 483, and substantially midway between connecting bars 475 and 481 is lever 484, the opposite ends 485 and 486 of which are pivotally articulated to bars 475 and 481 at 487 and 488 respectively. Referring to Figure 24, it is noted that lever 430 comprises an intermediate portion 489 between arms 429 and 431, which arms are disposed substantially at right angles to each other. Lever 430, as previously described, is pivotally mounted on pivot shaft 432, suitably carried in bracket 419. Interposed between arms 429 and 431 is a third arm 491 (Figure 24). Arms 429 and 491 support shaft 443 of transfer levers 428. As previously mentioned, arm 431 is pivotally connected at 477 to connecting bars 475 or 481 as the case may be. Lever 484 normally tends to rotate in a clockwise sense (as viewed in Figure 23) about pivot 482, due to a spring secured thereto, thus tending to hold follower roller 474 in abutting relation with the periphery of cam 404. Thus oscillatory motion is imparted to levers 430 through connecting bars 475 and 481 by rotation of cam 404.

As hereinbefore mentioned, there are mounted on shafts 379 and 380 in base unit 372, gears 383 (Figures 24 and 29), which are adapted to mesh with like gears 384, loosely mounted on shafts 421 individual to each of the selector mechanisms 415, 416, 417 and 418. Since the angular rotation of arm 452 is selectively determined as previously described, like rotation is imparted to gear 384 to which arm 452 is secured and rotation is imparted to the shaft 379 or 380 associated therewith and, similarly, like rotation is imparted to the associated vertical shafts 377 and 378, through gears 381 on shafts 379 and 380 and corresponding gears 382 on shafts 377 and 378. Thus the shaft and gear arrangement in the base unit 372 serves to transfer the selectively determined angular rotation of individual arms 452 to the corresponding vertical shafts 375 and 376 in units 373.

Vertical shafts 377 and 378 in base unit 372 as previously described are adapted to be coupled to the corresponding vertical shafts 375 and 376 in the vertically adjacent units 373. In the present embodiment, the coupled ends of the shafts are provided with disks 494 (Figure 29) fixed thereto, the disks of one of the coupled members being provided with spaced plug members 495 adapted to fit into correspondingly spaced apertures 496 in the other coupled member.

Thus it is observed that each price selector 385 controls the angularity of rotation of its individual vertical shaft 375 or 376 in channels #1 and #2 respectively, in accordance with the received signaling impulses comprising a quotation message in the following manner.

It has been mentioned that a stock quotation message is transmitted in the order in which it is read, namely, "ABC 45½ High"; and that the stock abbreviation part of the message, for example, "ABC" is directed to the stock selector, hereinbefore described. Now, that portion of the quotation message pertaining to the price, namely, "45½"; and range, namely, "High" are directed to the price selector 385, Figure 23.

It has likewise been disclosed that rotation is imparted to the individual shafts 421 of the selector mechanisms 415, 416, 417 and 418, by the motor 387 through suitable driving connections; and that on the end of each shaft 421 is mounted for rotation a stop member 452 adapted to cooperate with the ends of a series of index rods 446. Also, as the stop member 452 rotates, it may move freely past the rods 446 held on the outer edge of the code disks 423, out of the notches. When, however, an alignment of notches occurs and one of the rods 446 drops therein, its end shown in Figure 28 moves into the path of arm 452 and brings this arm to a stop thereat.

In this manner, the angular rotation of the individual stop arms 452 is selectively determined in accordance with the operation of code disks 423 which in turn are selectively operated by the associated selector magnets 436 which, as previously described, are in turn energized selectively in accordance with the received code combinations of impulses.

Referring again to Figure 23, selector 415 is under the control of the four signaling impulses (one for each selector magnet 436) representing the range of the quotation, and the remaining three selectors 416, 417 and 418 are under the control of the eleven succeeding impulses representing the amount or price. It is noted that the "fractions" selector mechanism is provided with only three code disks and consequently three selector magnets 436, instead of four as in the case of the other selectors in the group, thus accounting for the eleven impulses controlling the price and range of the quotation.

As previously pointed out, one selector, namely, selector 416 is adapted to control both the "tens" and "hundreds" quotations of a stock, thus simplifying the stock board mechanically and electrically. From Figure 4, it will be seen that the "hundreds" quotation appears only once for each stock, as shown in the upper horizontal row designated "Close." Due to the fact that the "hundreds" quotation is seldom changed, and due also to the fact that a reader of the stock board will at once understand the "hundreds" quotation shown in the upper row also applies to the other rows, this "hundreds" quotation is controlled by the same selecting unit which controls the "tens" quotation, as explained more fully in connection with the general operation of the stock board.

Assuming now that a quotation is received for the stock "A. B. C." The selection of the stock designated by the letters ABC will actuate the stock selecting unit hereinbefore described and shown in Figures 20, 21 and 22. The remainder of the quotation will then actuate the price selecting units as follows.

The received code signals operate the contacts of the overlap units (Figures 17 to 19) to selectively energize magnets 436 of all of the selecting units, namely, 415, 416, 417 and 418. The armatures 433 are therefore selectively positioned. Upon the reception of a start signal which follows immediately after setting of the magnets, start magnet 397 is energized and clutch 394, 395 is closed to drive cross shaft 407. Connecting gears 411 to 414 on each shaft 421 of the selecting units cause these shafts 421 to be rotated. Cam 404 next causes bar 475 to move downwardly as viewed in Figures 23 and 29 due to the high portion of the cam moving under roller 474. This movement of bar 475 causes levers 430 to oscillate clockwise about their pivots 432 (Figure 25) whereby the ends of transfer levers 428 are engaged with the ends 438 and 439 of selector levers 433. Each transfer lever 428 is thus positioned in accordance with the position of its particular magnet armature, and discs 423 are thereby rotated to a new position due to the engagement of rounded end 444 of each lever 428 in its disc, said levers 428 rotating about their pivots 443. The bar 475 at once returns to normal position after the high portion of cam 404 leaves the roller 474.

When discs 423 of each selector unit are thus rotated to a new position, the spring pressed rod 446 which was previously in an aligned series of notches in said discs is cammed outwardly and a new rod 446 allowed to drop into the newly aligned notches of said discs. Referring now to Figure 28, movement of rod 446 from the full line to dotted line position disengages the same from its prior engagement with stop arm 452. Spring 463 then pivots stop arm 452 counter-clockwise about its pivot 461 causing engagement of clutch 450. Since clutch member 453 is secured to rotating shaft 421, driven clutch member 454 starts rotating. Due to the pins 464 and slots 465, stop arm 452 is rotated, carrying with it the gear 384. When the newly selected rod 446 is reached by the end of stop arm 452, angular surface 466 rides up on the end of rod 446 to pivot the stop arm 452 clockwise against tension of spring 463. Due to the slots 465 and pins 464 carried by stop arm 452, the barrel 455 is moved rearwardly to the position shown in Figure 28, the angular slots 465 causing a positive disengagement of the teeth of clutch 450.

In the present embodiment of the invention the disengagement of clutch 450 occurs approximately at the time when selected pin 446 reaches the center of the angular surface 466 on stop arm 452. During this forward movement of the stop arm and its gear 384, clutch 467 has allowed free rotation in the direction of the arrow, in Figure 27, since the rollers 475 slip freely in their sockets. However, if pressure of the end of rod 446 on the sloping surface 466 is sufficient to cause any break-slip of the selector mechanism, clutch 467 at once locks. the central portion 471 locking against the stationary outer rink 478 to prevent back-slip.

In the modification shown in Figure 26A the end of rod 446 positively engages shoulder 493 at which time the clutch 450 becomes disengaged. In this form of the invention the end of rod 446 engages the flat portion 497 to avoid the possibility of backslip, and clutch 467 may be eliminated. Furthermore, in view of the positive stop 493 a friction clutch may be substituted for positive clutch 450, since shoulder 493 will prevent any forward movement of the stop arm beyond its set position.

By the above described operation each stop arm 452 of the four selector units is selectively rotated to a set position in accordance with the selective energization of magnets 436. This rotation of each stop arm and corresponding rotation of the gears 384 causes rotation of gears 383 secured to cross shafts 379 and 380. Thus these shafts which drive the indicating mechanisms are selectively rotated to new positions. As previously explained, selector unit 415 controls the range of the stock, unit 416 controls the "tens" and "hundreds" quotation, unit 417 controls the "units," and unit 418 controls the "fractions." The effect of rotating the horizontal and vertical shafts of the stock board as above described, will be explained in detail in connection with the stock board itself.

Stock board

Reference being had to Figure 32, it will be noted that for purposes of illustration, there is shown that part of unit 373 associated with a price-setting unit 374. In Figure 4 are shown a group of shafts 501 to 504 identified with a single price setting unit 374. The left hand vertical shaft 501 controls the range characteristics of the stock quotation; shaft 502 controls the "tens" and "hundreds" value of the quotation; shaft 503 controls the "units" value of the quotation; and shaft 504 controls the "fractions" value of the quotation.

Referring to Figure 32, gears 505 are mounted, adjacent the bottom of price-setting unit 374, on those shafts in rows 375 and 376 which control the "tens," "units" and "fractions" values, previously mentioned. Gears 506 and 507 are mounted adjacent the top of unit 374 on those shafts which, as previously mentioned, control the range characteristic of the stock quotation. When a particular price-setting unit 374 is one in the category of stocks included in channel #1, the gears 505 associated with their respective shafts 502, 503 and 504 in row 376 (which controls stocks in channel #2) are raised to the dotted position as shown in Figure 32 out of mesh with the corresponding gears 505 on shafts in row 375. Also, the gears 506 associated with the range controlling shafts 501 in row 376 are lowered to the dotted position out of mesh with gear 507 on corresponding shafts in row 375. Thus, the particular price-setting unit 374 is prepared to be controlled by the channel #1 row of shafts 375. It is noted here that the gear 507 and spiral gear 510 are integral with a common hub 511 and thus are adapted to rotate simultaneously.

On the other hand, if the particular price-setting unit 374 is one in channel #2, the gears 505 and 506 in row 376 are restored to meshed relation with their companion gears in row 375, but in this case the latter gears are permitted to rotate loosely on their respective shafts by loosening their set screws, in which event the latter gears act as idlers to impart rotation to the corresponding shafts in the price-setting units 374, presently described, in a direction similar to gears in row 376. It is observed that when the set screw in hub 511 is loosened, to enable the associated gear 507 to function as an intermediate gear to transfer rotation of gear 506 to gear 510, said hub 511 with its integral gears 507 and 510 is prevented from dropping along its shaft by a collar 512 fixed to shaft 375.

Price-setting unit

Appropriately mounted on the front of section 373 (Figure 32) is the price-setting unit 374 (Figures 30, 31, 32 and 33), which comprises a base plate 514 on which are suitably mounted vertical shafts 515, 516 and 517 positioned in parallel alignment with corresponding shafts 502, 503 and 504 in rows 375 and 376 in unit 373. Shaft 518, Figure 30, corresponding to the left hand or range controlling shaft 501 in unit 373, previously mentioned, is adapted to support only one character-carrying device or indicator drum 519, for reasons which will presently appear. Mounted on each shaft 512, 513 and 514 are a series of character-carrying devices or indicator drums 519, the construction of which will be hereinafter described.

Referring to Figures 31 and 32, it is noted that shaft 501 carries spiral gear 510, previously mentioned, in mesh with spiral gear 521 fixedly connected to the permutation member or index barrel 522, about which further details will follow. There is one such pair of gears 510 and 521 individual to each price-setting unit 374.

The remaining three shafts 502, 503 and 504 carry gears 505 in mesh with gears 520 on short shafts 515, 516 and 517 rotatably carried in the price-setting unit frame 514.

As previously pointed out, the left-hand shaft 518 in the top row of indicators is adapted to support only one indicator drum 519. The reason for this is that the "hundreds" value of the stock, which this indicator drum represents, need be shown only for the quotation in the top row, namely, "Yesterday's close." It is left to the observer to correlate the remaining quotations with the "Close" and mentally supply the omitted "hundreds" digit in order to complete the full four figure quotation.

It will be noted that opposite each of the indicators 519 (Figure 32), there is provided an opening 523 through which the numbers on the indicator are visible, each indicator being provided with a complete set of the ten digits from 0 to 9. It will be noted that five such indicators are carried on each shaft 515 to 517, one for each of the five indexes; namely, reading from top to bottom; "Close," "Open," "High," "Low" and "Last" or "Current." A similar set of indicators controlled by a similar arrangement is provided for each digit in a quotation, and accordingly there are three such sets as shown in Figure 4. The fourth or left-hand indicator in the top row (Figures 4 and 30) is controlled by the shaft of the adjacent right hand indicator, as will hereinafter appear.

Character-carrying devices or indicators 519 comprise a cylindrical drum portion 524, Figure 33, open at the lower end, the upper or closed end being provided with a series of pressed-out portions to form projections 525 adapted to cooperate with latches, as will hereinafter appear, to control the rotation of said drums. Indicator drums 519 are not rigidly attached to vertical shafts 515 to 518, but have a tendency to rotate therewith due to the torque action of a helical spring.

Drum portion 524 is fixedly mounted on a sleeve portion 526 which is rotatably mounted on a shaft. Disposed immediately below the upper end of drum 524 and adapted to fit around sleeve portion 526 is a disk 527, which is spring-pressed against the end of drum 524, by a helical compression spring 528 surrounding sleeve portion 526, one end of which bears against a peripheral flange 529, integral with sleeve portion 526. Disk 527 is provided with an integral depending hook 531 adapted to cooperate with a second helical spring 532, as will presently appear.

Adapted to fit over sleeve 526 is a flanged tubular member 533 rotatable thereon, upon which helical spring 532 is wound. Fixedly mounted in any suitable manner on shafts 515 to 518, as the case may be, and individual to each indicator drum 519, is an arm 534 provided with a hook end 535 normally extending in a slot 536 of a spring member 537 affixed to the drum portion 524. Arm 534 thus properly positioned on shaft 515 to 518 and secured thereto by a set screw or other suitable means serves as a support for its associated indicator drum 519.

Surrounding tubular member 533 is the helical spring 532, previously alluded to, composed preferably of many turns of light wire, one end of which engages the previously mentioned depending hook 531, the other end 532' engaging the hook 535 of arm 534. Thus, it is noted that when arm 534 is caused to rotate in a clockwise sense, it tends to wind up helical spring 532 thereby tensioning same, since one end of spring 532 is secured to frictionally held disk 527. After a predetermined number of turns have been imparted to spring 532, its stored kinetic energy overcomes the frictional resistance of disc 527 after which the latter will slip with respect to its shaft and drum 524.

As previously set forth, shaft 518 (Figure 30), is adapted to support or carry only one indicator drum 519. Rotary motion is imparted to said shaft 518, and its individual arm 534 by its geared relation to adjacent shaft 515. Fixedly mounted on shafts 515 and 518 are similar gears 538 and 539 respectively, and interposed in meshing relation therewith is idler gear 541. Thus gears 538 and 539 are adapted to rotate in like sense. The purpose of this arrangement, as will hereinafter appear, is to effect rotation of indicator drum 519 on shaft 518, which represents the "hundreds" value of the stock, by rotation of "tens" shaft 515 to the selectively determined position.

Suitably mounted on frame 514 (Figure 30), and vertically positioned below indicator drum shaft 518 is solenoid 542, of well known construction. Appropriately positioned above indicator drums 519 and horizontally disposed is the hollow cylindrical index barrel or permutation member 522 adapted to rotate on a shaft 543 suitably journalled in brackets 544 integral with frame 514. Fixed to index barrel 522 and rotatable therewith is aforementioned gear 521. Thus index barrel 522 is adapted to be rotated to any position selectively determined by selector mechanism 415 in the price selector 385, and transferred through shafts 501 to said cam barrel 522, as previously described.

Index barrel 522 is provided with a plurality of apertures or perforations 545 adapted to cooperate with a series of nine testing levers 546. Perforations 545 are arranged in parallel peripheral rows and equally spaced axial rows, perforations being omitted in certain locations, so as to result in coded combinations of perforations being presented to the testing levers 546 in any selectively determined position of barrel 522.

Appropriately positioned below index barrel 522, Figures 30 and 32, is a rotatable bail member comprising a shallow box portion or tray 547 provided with two pairs of ears 548 and 549, said ears 548 being pivotally connected at 551 to brackets or supports integral with frame 514. Carried by ears 549 is a rod 552 to the left end of which (viewed in Figure 30) is pivotally connected one end of a connecting link 553 disposed between tray 547 and solenoid 542. Link 553 is of substantially U-shaped construction to avoid obstructing the indicator drum 519 positioned above solenoid 542. Solenoid 542 is shown in Figures 30 and 31 in its de-energized condition, and is so constructed that when it becomes energized, its core or plunger 554 will be caused to move upwardly, thus imparting clockwise rotation, as viewed in Figure 30, to tray 547 about pivotal points 551.

Pivotally mounted on the fulcrum rod 552 is a series of testing levers 546, previously mentioned, each of said levers 546 comprising a vertically disposed arm and a substantially horizontal arm (Figure 32). Appropriately positioned on the horizontal arm of each testing lever with respect to the index barrel 522 and presented thereto is a fulcrum detector 556 adapted to cooperate with the apertures 545, to detect the presence or absence of fulcrum arcs 557 (Figure 32), as will appear in the description of operation of the apparatus. Slots 555 (Figure 30) in the flanged edges of tray 547 position testing levers 546 and maintain their alignment.

The ends of the horizontal arms of levers 546 are articulated to individual connecting links 558 to 566, which links are adapted to be disposed between said horizontal arms and arms 567 of unlatching levers 568, 569 and 571, pivotally mounted on shafts 572 carried on frame 514 and fixed against rotation by screws 573. In each instance, that end of link 558, etc., which is associated with the arm 567 is provided with a tongue which is adapted to engage an aperture in the end of said arm 567.

Each unlatching lever 568 comprises also a vertical arm which is provided with a laterally disposed end 573 adapted to intercept projection 525 on indicator drums 519 to prevent the rotation of said indicator drums, when the previously mentioned helical spring 532 is wound up, until said drums are released for rotation by the withdrawal of said laterally disposed end 573.

Each unlatching lever 569 is provided with two vertical arms having laterally disposed ends 573, and each lever 571 is provided with three such vertical arms. Thus it is obvious that each lever 568 governs the rotation of one indicator drum 519, each lever 569 governs the rotation of two indicator drums, and each lever 571 governs the rotation of three drums. It is observed in Figures 30 and 31 that the frame 514 is cut out at points adjacent to indicator drums 519 to permit the cooperation of levers 568, 569 and 571 with their associated indicator drums. Levers 568, 569 and 571 normally tend to assume latching engagement with projections 525 due to the retractile action of individual springs 574, Figure 31. Simultaneously, springs 574 tend, through individual links 558, etc., to hold individual levers 546 against stop member 515, Figure 31, which stop 575 is provided to limit in one direction the rotation of levers 546, whose rotation in the opposite direction is limited by the side walls of tray 547.

Referring to Figures 31 and 32, it is observed that coincident with each lever 546 and its associated link 558, etc., is one of the previously mentioned circumferentially arranged rows of apertures 545 in the index barrel 522. Having reference to Figure 32, it is noted that when an aperture 545 is disposed above fulcrum detector 556 of a testing lever 546, the detector 556 will enter therein when counterclockwise rotation is imparted to bail 547, in which event lever 546 will rotate in a like sense about point 576 as a fulcrum, the link 558, etc., associated therewith, in this instance, remaining stationary.

However, when a solid portion or fulcrum arc 557, Figure 32, of index barrel 522 is positioned above the detector 556 of a lever 546, the upward movement of said detector 556 is limited thereby, thus causing the lever 546 to continue its counterclockwise motion about detector 556 as a fulcrum instead of point 576, as before. Downward motion thus is imparted to the associated link 558, etc., which in turn imparts clockwise motion to unlatching lever 568, 569 or 571 connected thereto, against the action of individual spring 574.

Lever 568, 569 or 571, as the case may be, thus is rotated sufficiently to withdraw the previously mentioned laterally disposed end 573 from its engagement with projections 525, thus permitting the indicator drum 519 associated therewith, to rotate due to the torque action of its individual helical spring 532 to a selectively determined position as will clearly appear in the following description of operation.

Levers 568, 569 and 571 are made to release the various horizontal rows of indicators 519 in desired combinations by rotating barrel 522 until a longitudinal alignment of solid portions 557 register opposite the detector points 556 of those levers 546 which are to be released while holes 545 register opposite those which are not to be released. For example, it is sometimes desirable to change the indicators of the "units" and "fractions" only of a quotation. In this instance, lever 569 of the "Last" horizontal row of indicators is operated by its lever 566 whereby only two indicator dials are released, namely the "units" and "fractions" dials of this row of indicators. Furthermore, it is sometimes necessary to simultaneously change the "units" and "fractions" quotations of the last row of dials and also the "units" and "fractions" of the "Low" or "High" row. This may be accomplished by a simultaneous operation or release of two of the levers 569, namely, that for the "Last" row, and that for the "Low" or "High" row, as the case may be. If the entire quotation is to be changed for example, from an "Open" quotation of 39½ to a quotation of 41½, the lever 571 is operated to release all three dials of the "Open" row. If it is desired to change all three dials of a row of indicators having a lever 568 which releases one indicator and lever 569 which releases two indicators, obviously it is only necessary to set the index barrel 522 in such position that both levers 568 and 569 of the desired row are released.

It will be understood therefore that the levers 568, 569 and 571 in combination with index barrel 522 provide a release mechanism in which various combinations of dials may be operated in accordance with the setting of the index barrel.

General operation of stock board

Having described in detail the construction of the various parts of the stock board, its general operation will now be described. Referring to Figure 4, it will be noted that the top row in each of the stock or price-setting units 374 comprises four openings 523 through which the digits on the indicator drums 519 are visible, which digits represent from left to right the "hundreds," "tens," "units" and "fractions" value of the stock. The remaining rows, however, do not exhibit the "hundreds" value, because the values displayed in these remaining rows are imputed from the value shown in the top row. For example, should the value in the top row be 200½, the showing of 01½ in the second row would imply that it is meant to be 201½. Similarly, should the showing in the next row be 99½, it is obvious that 199½ is meant and not 299½.

Referring to Figure 23, magnets 436 associated with code disk selector units 415, 416, 417 and 418 are each electrically connected to respective contacts 181 in the overlap unit shown in Figure 17, as will hereinafter appear in connection with the electrical circuits, and control the settings of the code disks of said code selector units in accordance with the received code impulses. It will be assumed, for purpose of illustration, that the price 284½ is to be displayed as the closing quotation for stock ATT. In the present embodiment, selectors 415, 416, 417 and 418 control respectively, the "range," "tens," "units" and "fractions" characteristics of the stock quotation.

Now, since the stock price, which as has been assumed, contains a "hundreds" digit, and since the indicator displaying or exhibiting this digit is controlled by the shaft 515, Figure 30, which also controls the "tens" value, as previously described, it is at first necessary to send the "hundreds" value of the stock through the medium of the "tens" selecting unit 416. This is initiated by depressing the "CLS—H" key on the keyset shown in Figure 12. This will cause the "hundreds" indicator shaft 518 to be rotated to the same position as the "tens" indicator shaft, but since only the "hundreds" unlatching lever 568 (Figure 31) is operated, the "hundreds" digit, in this instance "2," will be displayed. A second quotation is then sent which contains the "tens," "units" and "fractions" value, and in which the "CLS—TUF" key is depressed, which will not affect at this time the "hundreds" value previously recorded, but will cause the unlatching lever 571 associated with the top row of drums to operate.

The display of the stock quotation, therefore, is accomplished in the following manner. Magnets 436 associated with the selector unit 415 (Figure 23) are energized in accordance with the received code representing the range of the stock, which in the assumed case is the "Close" characteristic of the stock. Simultaneously, selector unit 416 is similarly affected to effect the selection of the proper "hundreds" digit of the stock. Of course, it was noted that selector unit 416 selectively determines the "tens" value of the stock, but as will presently appear, it is also used to determine the "hundreds" value.

Following instantly upon the energization of the magnets 436 is the energization of the start magnet 397 (Figure 23) which, as previously described, initiates the rotation of cam 404 to effect the setting of the code disks of selectors 415 to 418, to selectively determine the angular rotation of stop members 452, which angular rotation is transferred to individual shafts 501 to 504, as previously described. Thus it is perceived, that when a particular selector unit 415 to 418 is operated, the corresponding vertical shafts 501 and 504 (Figure 4) are also actuated, thus imparting rotation to shafts 515 to 518 in all the price-setting units 374 in a vertical column. It is obvious that by appropriate gearing and intermediate horizontal cross shafts 379 and 380 (Figure 4) any number of corresponding vertical shafts may be simultaneously operated and controlled by each selector unit 415 to 418.

In the present instance, shafts 515 to 518 in the price-setting units 374 are rotated through the selectively determined angle, thus positioning individual arms 534 (Figures 30 and 33) and tensioning individual helical springs 532 to properly effect selection of the proper digit. Although all of the shafts 515 to 518 individual to the vertical rows of indicators are thus rotated, the indicators themselves, as previously noted, are latched against rotation by individual arms 573 (Figures 31 and 33) in engagement with projections 525 on indicators 519, so that these indicators normally do not rotate.

As previously described, the rotation of stop arm 452 individual to selector mechanism 415 controls, through shaft 501 (Figure 31) and its associated gears, the rotation of index barrel 522. Thus, the angularity of rotation of index barrel 522 being selectively determined, its position to effect the selection of the "hundreds" digit is such that apertures 545 are positioned over all the fulcrum points 556 of levers 546 except that one controlling link 558 individual to the "hundreds" indicator unlatching lever 568. Therefore, when solenoid 542 for the selected stock, in the present example stock ATT, (which is selectively determined by the stock selector shown in Figures 20 to 22, and previously described) is energized to effect the oscillation of bail 547, the lever 546 associated with link 558 will cause rotation of the associated unlatching lever 568 to effect the release of individual indicator drum 519, which will rotate, due to the recoil or torque action of its spring 532 until the individual spring member 537 (Figure 33) engages hook 535 of individual arm 534. The selected "hundreds" digit thus is presented toward the opening 523 individual to said indicator, all of the other indicators, however, being locked at this time from rotation.

The next step is to actuate the remaining indicator drums in the top row to complete the stock quotation.

In this case a second quotation message, as ATT 84½ CLOSE is sent. As previously mentioned, the "CLS—TUF" key is depressed, which index or range signal causes the index barrel 522 to be repositioned to effect the unlatching of the "tens," "units" and "fractions" drums, instead of the "hundreds" drum as previously. These remaining drums are actuated simultaneously. The proper digit for each indicator is selectively determined in a manner similar to that previously described and the index barrel 522 is repositioned so that apertures 545 are positioned over every lever 546 except that one controlling link 560 (Figure 31), which when actuated due to the energization of the solenoid 542, will cause the rotation of the associated unlatching lever 571 to effect the release of the "tens," "units" and "fractions" indicator drums 519 of the "Close" row, which will rotate to the position selectively determined by individual arms 534.

It is often necessary to change various of the quotations exhibited in the price-setting units 374, so this invention provides novel means for so doing. It is apparent that the quotations displayed in the top row and second row, namely, "Yesterday's close" and "Today's open" need be changed only once each day. However, the quotations exhibited in the remaining rows, viz., "High," "Low" and "Last" are continually changing, so this invention provides means for changing them singly or in various combinations.

Inasmuch as the row exhibiting the "Last" or current quotation is the most active, that is to say, is changed most frequently, its characteristics will now be described. In the present embodiment, the "Last" quotation is represented by the bottom row in each stock unit 374. When it is desired to change all three digits in this row, the index barrel 522 is so rotated as to position apertures 545 over all the levers 546 except those controlling links 563 and 566 (Figure 31). Thus, when solenoid 542 is energized, links 563 and 566 are actuated, as previously set forth, to effect rotation of levers 568 and 569 of the "Last" row, to unlatch the associated indicator drums.

But it is often desirable to change only the units and fractions digits in the particular quotation, in which event the "No reset" key on the keyset (Figure 12) is depressed instead of the "tens" digit; and the index barrel 522 thus is selectively positioned, so as to present apertures 545 over all levers 546 except that one individual to link 566 which will effect the unlatching of the units and fractions indicator drums of the particular quotation.

In like manner, unlatching of the indicator drums in the other rows is similarly effected through their individual links 561, 562, 564 and 565.

It is also frequently desirable to simultaneously change two or more of the rows of quotations, either in whole or in part. For instance, if the "Last" quotation should be also a new "High," this invention provides the above described means whereby the new quotation can be simultaneously recorded in the third and last rows. In this event, index barrel 522 is rotated so as to position apertures 545 over all levers 546, except those individual to links 561, 563, 564 and 566, the unlatching of the associated indicator drums being effected, as previously set forth. Should it be desired to change only the units and fractions in these last mentioned rows, links 564 and 566 only are actuated, a new position of the index barrel 522 being effected therefor. Rows four and five, representing the "Low" and "Last" quotations respectively, of the stock are adapted to be affected similarly.

Usually, both the numerator and the denominator of a fraction are shown on the "fractions" indicator drums. To enhance the visibility of the figures on the "fractions" indicator, it is desirable to show the fractions of a larger size. To accomplish this, the numerator only is shown, which may then be of a size equal to the other digits. In this event, the denominator of the fraction would be denoted by a distinguishing color.

The construction of the stock board disclosed herein, enhances its flexibility, because it renders possible the rapid and easy removal of a single price-setting unit 374, should one prove defective, and its replacement with another without disturbing the remaining units. Also, this form of board, in its provision for two-channel operation, permits the arranging of the price-setting units 374 for the particular stocks in any manner to suit the desires of the particular stock broker.

Referring to Figure 4, it is noted that each stock board is provided with a designation or index panel 581 adapted to be placed adjacent to a vertical column of sections 373. These panels 581 are preferably located at each end of the stock board; but should the stock board be of unusual width, these panels may be interposed between any two vertical columns of sections 373 to facilitate the reading of the quotations. These panels 581, as is apparent from the illustration, are adapted to carry information relative to the particular designation applicable to the horizontal row in which it appears.

*Step-by-step indicating unit*

As hereinbefore mentioned, this invention is also adaptable to a system employing a stock board based upon the use of electromagnetically operated step-by-step indicators of the type disclosed in the previously mentioned U. S. Patent No. 386,189. This modification of the present invention requires the translation of the permutation signals to stepping impulses.

In this adaptation, the receiving stock boards used are similar in external appearance to that shown in Figure 4. However, indicator units 701 are of a different construction, being substantially as shown in Figure 34, and are adapted to be positioned behind the apertures 523 (Figure 4) to exhibit its characters or digits therethrough.

Briefly, indicator unit 701, Figure 34, comprises essentially an electromagnet 702, and indicator drum 703. Each indicator drum 703 is adapted to rotate on individual shaft 704 in a step-by-step manner by a double-pawl ratchet-drive means comprising a star ratchet wheel 705, and a pair of pawls 706, 707, mounted integrally on lever 708, pivoted at 709.

Lever 708 is provided with an armature arm 711 adapted to co-act with electromagnet 702 to effect the rotation of indicator drum 703. When magnet 702 is energized, in a manner as will hereinafter appear, it will attract its armature 711 to impart rotation in a clockwise sense to lever 708 against the action of spring 712 thus causing pawl 707 to force ratchet 705 to rotate in a counterclockwise direction (as viewed in Figure 34). Upon de-energization of magnet 702, lever 708 is caused to rotate in a counterclockwise sense due to the pull of spring 712, thus causing pawl 706 to advance ratchet 705 in like manner. Thus each complete oscillation of lever 708 advances or rotates indicator drum one complete step to exhibit the succeeding digit.

Fixedly mounted on shaft 704 is the contact disk portion 713. Disposed on said disk 713 are contact rings 714 and 715, ring 715 being continuous and provided with an extension 716 adapted to fit freely into a gap in ring 714. Ring 714 is connected to ground. Associated with contact rings 714 and 715 are contactors 717 and 718 respectively. Contactor 718 is connected by conductor 733 through a cam operated contact 719 to ground. Contactor 717 is connected by conductor 721 to one end of the winding of magnet 702, the other end of said winding being connected by conductor 731 in parallel through contacts 722 and 723 to a positive source of current.

A toothed detent wheel 730 is secured to drum 703 and engaged by spring detent 732 to thus maintain the drum in set position and prevent reverse movement thereof.

The translating unit hereinafter to be described in detail is essentially an apparatus for pulsing and range selecting to control the setting of the step-by-step indicating devices. By pulsing is meant the transmission of a succession of electric current impulses to intermittently energize the individual indicator unit magnets 702 to impart in turn a step-by-step rotation to indicator drum 703, as previously described.

In Figure 34 there is shown in simple diagrammatic form the pulsing circuit for operating indicator unit 701 which will be described generally before the detailed description is given of the mechanism of the translating unit which effects pulsing. The pulsing circuit is that which is successively completed to effect the step-by-step rotation of indicator drum 703. It has been noted that each time magnet 702 is energized, indicator drum 703 is rotated one step. Thus the digit to be exhibited through its associated aperture in the stock board is selectively determined by the number of pulses transmitted to the particular indicator unit 701, as will presently appear.

Pulsing cam 724 is controlled by the stop arm 734 of its individual selector unit and driven by any suitable drive such as connecting gears in a manner that will more fully hereinafter appear.

Further in connection with Figure 34, pulsing cam 724 operates the contact 722, restoration pulse cam 725 operates contact 723, and actuating ground cam 726 operates contact 719. Cams 724 and 725 co-act with their respective contacts 722 and 723 for generating actuation pulses required for the operation of the indicator units 701. Cam 726 co-acts with its contact 719 to supply at a predetermined instant, ground to complete a pulsing circuit for actuating unit 701.

There are three distinct energizing circuits for magnet 702 required to operate indicating unit 701, each of which will now be described and the reason therefor given. Referring to Figure 34, rings 714 and 715 are shown in the "blank" position, that is to say, in this position no digit is being exhibited, through the opening or aperture 523 in the stock board (Figure 4). In this position contact 719 associated with cam 726 is normally open, as shown.

It is observed that ring 714 is broken and that lateral projection 716 on ring 715 is disposed therein. Also, it is noted that contactor 718 is constantly in contact with ring 715, and that contactor 717 is alternately in contact with projection 716 and broken ring 714. When contactor 717 is in contact with projection 716, indicator dial or drum 703 is in the "blank" position, as previously mentioned.

It should be understood at this point, that the indicator dial 703 is always restored to its blank position before being again rotated in response to a succeeding selection. Each dial 703 is provided on its circumferential face with ten number characters, namely, 0 to 9, inclusive, and one blank space, comprising eleven selectable positions. Now, the pulsing cam 724 is also provided with eleven cam projections 727 corresponding to the eleven selectable positions of the indicator dial. Further the angle of rotation of pulsing cam 724 is variable and is controlled, as will hereinafter appear, by its individual selector mechanism. Thus cam 724 is adapted to rotate through eleven angular positions, the number of positions through which it rotates being selectively determined by the selector mechanism.

Assuming that it is desired to exhibit the numeral or digit 5 on dial 703, it is necessary that pulsing cam 724 be rotated through five angular positions, thus causing its cam projections 727 to effect the closing of contact 722 five successive times. However, before cam 724 is permitted to rotate, the pulsing circuit is at first prepared by closing of contact 728 associated with its timing cam 729, and closing of contact 719 by the actuating ground cam 726. Now, when contact 722 is closed by the first cam projection 727, an energizing circuit for magnet 702 is completed from positive battery through contacts 728 and 722, over conductor 731, through winding of magnet 702, over conductor 721, through contactor 717, extension 716, ring 715, contactor 718, over conductor 733, through contact 719 (now closed) to ground. This circuit just traced is the first of the three energizing circuits for magnet 702, previously alluded to, and is referred to in this disclosure as the actuating ground circuit. The dial 703 thus is rotated one step.

After this initial step, extension 716 is no longer in contact with contactor 717, it having been rotated with the dial 703 one step, which is sufficient to move it out of contact therewith. Instead contactor 717 is in contact with the broken ring 714. Contact 719 has now served its purpose in preparing the actuating ground circuit and is again opened. Contact 728, however, still remains closed. When contact 722 is now closed in succession by the next four cam projections 727, energizing circuits for magnet 702 are successively completed from positive battery, through contacts 728 and 722 over conductor 731, through winding of magnet 702, over conductor 721, through contactor 717, and broken ring 714 to ground. This circuit is the second of the three energizing circuits for magnet 702. Dial 703 thus is rotated four more steps to exhibit the "5" digit. Contact 728, at this time, is caused to open, to permit cam 724 and stop arm 734 of the selector to rotate to the blank or initial position without causing the transmission of any pulsing currents, because, as will hereinafter appear, stop arm 734 of the selector mechanism associated with the pulsing cam is always rotated to the blank or initial position after it has been rotated to a selectively determined position, and of course, since cam 724 and arm 734 are rotated in unison, cam 724 would cause pulsing currents to be impressed on conductor 731, if the circuit is not broken at contact 728.

Now, in order to rotate indicator dial 703 to a new position, say to exhibit the digit "3," it first becomes necessary to restore the dial to its blank position, thence to advance it three steps to exhibit the desired digit. To accomplish this, use is made of restoration cam 725, which is provided with a series of cam projections 735 (ten in the present embodiment) adapted to successively close contact 723 to transmit a succession of restoration pulses.

The first step then in making a new selection is to initiate rotation of cam 725 (cams 726 and 729 are at rest during the rotation of cam 725, thus their contacts 719 and 728 are open) which causes a succession of impulses to be transmitted from positive battery, through contact 723 (as it is intermittently operated) over conductor 731, through winding of magnet 702, over conductor 721, through contactor 717 and ring 714 to ground. This circuit constitutes the third energizing circuit for magnet 702. Dial 703 thus is rotated until contactor 717 again comes into contact with extension 716, at which time the third energizing circuit, just described, is broken, since contact 719 as has been noted, is open. Cam 725 nevertheless continues to rotate one complete revolution, regardless of the number of impulses required to restore the dial to blank position. Ten cam projections 735 are provided in the present embodiment to insure the restoration of the dial to the blank position, should the dial have previously exhibited the digit "1."

Finally to rotate the dial to its newly selected position, in this case to exhibit digit "3," cam 725 is stopped, and cams 726 and 729 are again rotated to close their respective contacts 719 and 728, thus preparing the previously described first and second energizing circuits for magnet 702. The cycle of operations is then the same as previously set forth.

*Translating unit for step-by-step indicator board*

Having fully described the pulsing operation, a better understanding will now be had of the following description of the construction and operation of the translating unit shown in Figures 35 to 38, which effects the pulsing in accordance with the received code signals to set the indicating units to display the received quotations.

The translating unit comprises essentially a base 736, on which is suitably mounted motor 737 having a rotating armature shaft 738 suitably mounted in bearings and carrying on its end worm gear 39 meshing with gear 741 which is carried on and rotates cross shaft 742. Cross shaft 742 carries an individual gear 743 for each of the four code disk selectors 744 to 747, and also a gear 748 adapted to mesh with gear 749 which is carried on and rotates cam shaft 751 transversely disposed to shaft 742. Each gear 743 meshes with a gear 752 frictionally mounted on the corresponding code disk selector shaft. Each gear 752 is adapted to drive its shaft 753 through the medium of a friction clutch comprising a pair of plates 754, and a pair of disks 755 of friction material. One of said plates 754 is fixed to the shaft 753, the other plate 754 and disks 755 being urged against the gear 752 by the slit annular spring 755' in standard fashion. Cam shaft 751 is adapted to be journaled in antifriction bearings suitably carried in upright brackets 780 and 790 mounted on base 736.

Code disk selectors 744 to 747 are generally similar in construction to selectors 415 to 418, Figures 23 and 25, but differ therefrom as follows.

In the selectors previously described, the shafts 421 are continuously driven after initial start of the selecting mechanism and release of the stop arms 452 allows a clutch to engage the stop arm with the driven shaft, the stop arm then moving to a new position. In the present embodiment the shafts 753 remain stationary and friction clutches 754, 755 slip, stop arms 770 being stopped by rods 446. When a new selection occurs and one stop rod 446 is moved out and a new one drops in place, each shaft 453 may rotate to a new position since each stop arm 770 is fixedly mounted on its shaft 453.

Figure 35:
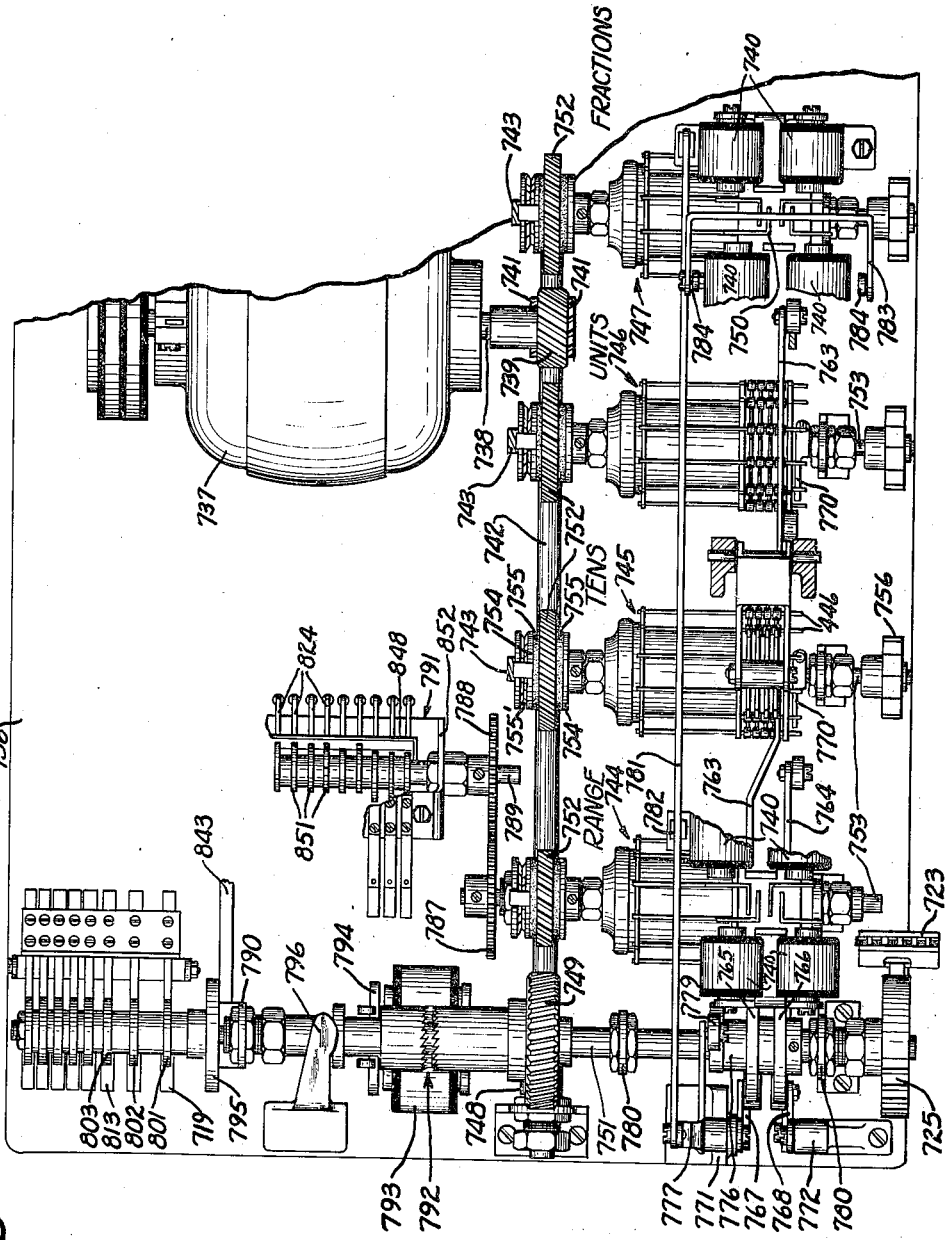
Figure 35 is a plan view of the translating unit.

The setting of the code disks of each of these units 744 to 747 is controlled by four magnets 740 mounted above each selector. Referring to Figure 35, the code disc selector 744 selectively determines or controls the range characteristic of the particular stocks. The selectors 745, 746 and 747 control the "tens," "units" and "fractions" value of the stock respectively. The last three mentioned selectors have provided on the ends of their respective shafts 753 opposite to gears 752 a pulsing cam 756 adapted to co-act with a make contact 757 (Figure 36) through lever 758 for generating the actuation impulses required for operation of the indicator units 701 in the stock board, as previously described.

Associated with each of the four selector magnetts 740 of each of the selector units 744 to 747 are selector levers 750 and transfer levers 760 which are of the same design and perform the same functions as levers 433 and 428, Figure 25, previously described. Selector levers 750 are normally biased to a blank or initial position by springs 750' associated therewith, each spring being connected to two selector levers (Figure 36). Transfer levers 760 in this instance are carried on transfer lever bail 759 individual to each code disc selector 744 to 747. Bails 759 are pivoted at points 761 on selector unit brackets 762. Bails 759 associated with the "tens," "units" and "fractions" selectors, previously mentioned, are adapted to cooperate with bail operating link 763, and bail 759' associated with the range code disc selector 744 is adapted to cooperate with link 764, Figures 35 and 36. Each bail 759 and 759' tends to rotate counterclockwise (Figure 36) due to individual springs 769.

Link 763 carries eccentrically mounted stops 763' for engagement with the lower ends of bails 759, springs 769 maintaining each bail 759 in engagement with its stop 763'. Link 764 is similarly provided with eccentric stop 764', the eccentric mounting of these stops providing a simple adjustment for bails 759.

Links 763 and 764 are adapted to reciprocate in a horizontal direction by the action of cams 765 and 766, respectively, upon individual levers 767 and 768, thus imparting with the assistance of individual springs 769, oscillatory motion to bails 759 and 759'. Thus, this oscillatory motion of bails 759 and 759' engages transfer levers 760 with the ends of selector levers 750 to determine the setting of the code disks in a manner previously disclosed. Levers 767 and 768 are substantially T-shaped, one arm of each of which is pivotally connected to suitable brackets 771 and 772. To the stems of levers 767 and 768 are secured individual follower rollers 773 adapted to co-act with the previously mentioned cams 765 and 766, and to the other arms of said levers are pivotally secured the ends of links 763 and 764. Cams 765 and 766 are mounted on cam shaft 751.

Figure 38:
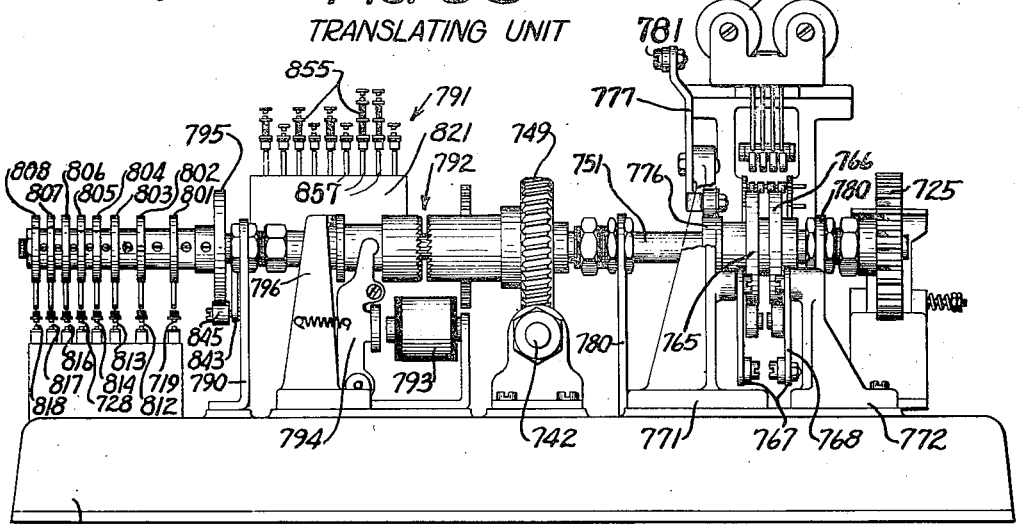
Figure 38 is an end view of the translating unit.

Adjacent to cam 765 is locking bail cam 776 fixedly mounted on cam shaft 751 and adapted to cooperate with locking bail lever 777 (Figures 35, 36 and 38). Clockwise rotation (as viewed in Figure 36) is normally imparted to lever 777 due to the action of spring 778 thus holding follower roller 779, secured to the end of one arm of lever 777, in abutting relation with cam 776. To the end of the other arm of lever 777 is pivotally secured one end of locking bail link 781, which is suitably supported at points 782 throughout its length by brackets 762, and carries eccentrically mounted stops 781' for engagement with each locking bail 783, now described.

Approximately mounted above code disk selector magnets 740 are locking bails 783 individual to each of the code disk selectors except the left hand or range code disk selector 744. Bails 783 are substantially U-shaped and pivotally connected at points 784 (Figure 35), so that knife edge 785 may be reciprocated into and out of engagement with the pointed ends of the selector levers 750 (Figure 36) to lock them in either of their two operable positions. One of the arms of each bail 783 is provided with an extension 783' to the end of which is secured one end of a spring 786 the other end of which is secured to bracket 762. Each bail 783, thus, normally tends to rotate in a clockwise sense (as viewed in Figure 36), due to action of its spring 786, into engagement with the ends of its selector levers 750, previously described. However, prior to a change in the selection and consequent rearrangement of selector levers 750, link 781 is urged to the right, due to the action of spring 778 upon lever 777 and cam 776, which movement imparts counterclockwise rotation to bails 783 to effect unlocking of selector levers 750 to permit them to reset in accordance with the received code combination, after which the link is again moved to the left allowing the selector levers again to become locked. A locking bail 783 is not required for locking the settings of the range code disk selector 744, because the range setting in made before the settings of the other selector units and is locked in the range selecting unit 791 (Figure 39), as will hereinafter appear.

Mounted on the end of shaft 753 individual to the range code disk selector 744 and on that side of gear 743 opppostely disposed to the selector mechanism is a gear 787 (Figure 35) adapted to mesh with a like gear 788 fixedly mounted for rotation on shaft 789 of the range selecting unit 791, presently to be described. Fixedly mounted on the cam shaft 751 and positioned near the right end thereof (viewed in Figure 38) is restoration cam 725, previously mentioned, which is adapted to cooperate with a plurality of suitably mounted make contacts 723 for restoration of the "tens," "units," and "fractions" indicator units 701 to blank, as hereinbefore described. The restoration cam 725 (Figure 37), comprises a disk portion on the periphery of which is provided a uniform series of ten apexes 735, contact 723 engaging each time the cooperating spring passes into a low part between apexes 735. The teeth 735 are contained within one half of the circumference of cam 725, whereby the restoration of the indicator units 701 to the blank position is accomplished before a new selection is set up in the code disk selectors controlling the "tens," "units" and "fractions" value of the stock.

Mounted on cam shaft 751 adjacent to gear 749 is the clutch assembly 792 of similar construction to that shown in Figure 20, and hereinbefore described as part of the stock selector, and similarly controlled by suitably mounted magnet 793 and throwout lever 794, whereby cam shaft 751 may be driven by shaft 742, gears 748 and 749. Also, fixedly mounted on cam shaft 751 adjacent to bracket 790 is the range selector transfer bail cam 795. Fixed to shaft 751 between the cam 795 and the end of the shaft, and rotatable therewith are a plurality of cams 801 to 808 adapted to co-act with individual contacts 719, 728, 812 to 814 and 816 to 818 for controlling sundry circuits, as will be hereinafter set forth.

Figure 39:
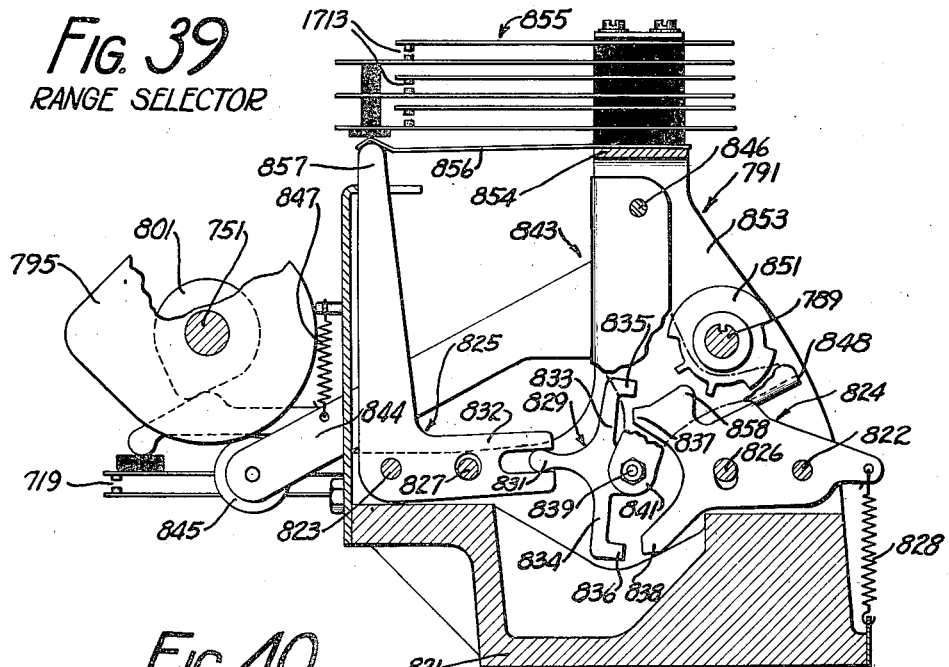
Figure 39 is a cross sectional view of the range selector.

The range selecting unit 791, Figures 35, 38 and 39, comprises a base portion 821 adapted to pivotally support at 822 and 823 a plurality of selector levers 824 and a plurality of contact levers 825, respectively. Limiting stops are provided at 826 and 827 to limit the motion of levers 825 and 824. Each lever 824 normally tends to rotate in a clockwise sense under the action of individual spring 828. The position of contact levers 825 in either their clockwise or counterclockwise position is determined by the position of their associated transfer levers 829. Transfer levers 829 are substantially T-shaped, stems 831 of which are pivotally articulated with arms 832 of their associated contact levers 825. Arms 833 and 834 of transfer levers 829 are provided at their ends with abutments 835 and 836, which are adapted to co-act with corresponding abutting portions 837 and 838 on selector levers 824. Transfer levers 829 are pivotally mounted on a common fulcrum 839 suitably positioned between arms 841 and 842 of transfer bail 843. Secured to transfer bail 843 is transfer bail arm 844, to the free end of which is pivotally secured follower roller 845 adapted to co-act with transfer bail cam 795. Transfer bail 843 normally tends to rotate about its pivot 846 in a clockwise sense under the influence of spring 847, which thus holds follower roller 845 in abutting relation with cam 795.

Figure 40:
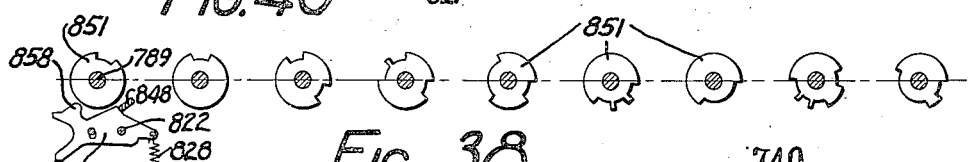
Figure 40 is a view showing the series of range selecting cams.

Mounted on transfer bail 843 and adapted to span the group of selector levers 824 is releasing bail 848 adapted to hold levers 824 out of engagement with their associated cams 851 while said cams are being rotated to their reset position, as will presently appear. Appropriately positioned above selector levers 824 and suitably journaled in side frames 852 and 853 is the aforementioned cam shaft 789, on which is fixedly mounted a series of range selecting cams 851, previously alluded to, corresponding in number to the number of selector levers 824, and varying in contour, as shown in Figure 40, to suit the variant combinations of settings of said selector levers, as will hereinafter appear.

Bridged between the side of frames 852 and 853 and positioned above transfer bail 843 is contact mounting plate 854, on which are suitably mounted a series of contact assemblies 855 corresponding to the number of selector levers 824, and adapted to be cooperatively related to contact levers 825. Each contact assembly 855 is provided with a spring member 856 adapted to co-act through its V-shaped end with end of arm 857 of its associated contact lever 825. All of the contacts 855 are normally open.

As noted in Figure 35, range selecting unit 791 is located to the right of cam shaft 751 and to the rear of cross shaft 742. The angular rotation of shaft 789 of the range selecting unit is selectively determined by the range code disk selector 744 and transferred through gears 787 and 788 to shaft 789. Thus the angular rotation of cams 851 is also selectively determined by selector 744. Now, when the rotation of cam shaft 751 is initiated, like rotation is imparted to cam 795, so that the transfer bail 843 is caused to rotate in a counterclockwise sense (as viewed in Figure 39); and in so doing, the releasing bail 848 associated therewith, is withdrawn from the selector levers 824 which are then free to rotate clockwise under the influence of their individual springs 828. But the amount of rotation of selector levers 824 is determined by their individual cams 851 in the following manner. Should a low part of the cam 851 be presented toward the feeler 858 of a selector lever 824, the lever 824 will be permitted to rotate so that its abutment 837 will register opposite abutment 835 of its associated transfer lever 829. On the other hand, should a high part of cam 851 be presented toward the feeler 858, rotation of selector lever 824 will be limited, and its abutment 838 will register opposite abutment 836 of its associated transfer lever 829. Now, with selector levers 824 so set, continued counterclockwise rotation of the transfer bail 843 will carry the floating transfer levers 829 toward the selector levers 824, and in so doing the co-acting abutments will serve as pivotal points for their respective transfer levers, thus causing some of the levers 829 to rotate in a clockwise sense and some in an opposite sense, thereby imparting correspondingly opposite rotations to their associated contact levers 825. Those levers 825 which are caused to rotate in a clockwise sense (as viewed in Figure 39), will force their associated spring members 856 upwardly, thus closing their respective contacts 855, and those levers 825 which assume the counterclockwise position will not effect the closing of their associated contacts.

In this manner, sundry circuits are prepared by the closing of contacts 855, to be completed in a manner hereinafter described.

*Operation of translating unit*

It will be recalled that the translating unit of Figures 35 to 38 operates the pulsing mechanism to selectively control a stock board having the dials operated by a pulsing magnet as shown in Figure 34.

The particular stock to be quoted having been selected by the stock selector previously described or by any other suitable selecting mechanism, and the circuits for said selected stock having been energized in a manner hereinafter described in detail, the price selecting or translating unit of Figures 35 to 38 is then operated. The motor 737 may be continuously operated or intermittently operated. In any event, friction clutch 754, 755 for each selecting unit slips, since the shaft 753 of the unit is prevented from rotation by engagement of its stop arm 770 with the previously selected rod 446 of the individual unit. Start magnet 793 for cam shaft 751 being de-energized, this shaft is stationary.

Contact assemblies 855 (Figure 39) are so arranged that various combinations of ranges of the stock to be quoted may be obtained. For example, as previously described, it is sometimes desirable to change the quotations for the "high" range and the "last" range of a stock, either changing the "tens," "units" and "fractions" thereof, or in some cases changing only the "units" and "fractions." The selective closing of contact assemblies 855 allow various ranges of the stock to be selected, either singly or in combination.

The first operation is energization of start magnet 793 causing engagement of clutch 792 to drive cam shaft 751. The selecting magnets 740 of range selecting unit 744 are now energized. Next cam 766 operates the lever 768 to pull link 764 to the left of Figure 36. This movement causes eccentric stop 764' to oscillate lever 759' of the range selector 744, carrying transfer levers 760 thereof into engagement with the previously set selector armature levers 750 for re-positioning said transfer levers 760 and the discs of this selecting unit associated therewith. It is noted at this time that armature levers 750 of selecting unit 744 are not locked in position and therefore the disks of this unit are at once re-positioned in accordance with the settings of the magnets. This selection causes the previously set rod 446 to be moved outwardly and a new rod to be dropped in position, thus allowing stop arm 770 of this unit to rotate to a new position.

Rotation of shaft 753 of unit 744 drives shaft 789 of the range selector unit 791. Thus the angular rotation of cams 851 is selectively determined by the rotation of selector unit 744.

Next, the apex of cam 795 on shaft 751 encounters roller 845 of transfer bail 843, causing counterclockwise rotation thereof as viewed in Figure 39. The first effect of this movement is to move releasing bail 848 away from selecting levers 824 which then move clockwise about their pivots 822 into engagement with their individual cams 851 which have been previously set. Should a low portion of a cam 851 be presented to feeler 858 of a selector lever 824, said lever will be permitted to rotate so that its abutment 837 will register opposite abutment 835 of its associated transfer lever 829. Should a high part of cam 851 be presented towards feeler 858, rotation of selector lever 824 will be limited and its abutment 835 will register opposite abutment 836 of its associated transfer lever. Now further counterclockwise movement of bail 843 carries the floating transfer levers 829 into engagement with the abutting ends of the set selector levers 824, and in so doing the co-acting abutments serve as pivot points for their respective transfer levers. In this manner the various contact levers 825 will be moved to a newly selected position, thus changing various of the contacts 855 to select the range of the stock to be quoted. Thus the particular dials to be changed are selected over circuits controlled by contacts 855.

Next the selected dials must be set back to blank position to prepare them for a new quotation. This is accomplished by the pulsing mechanism 725 mounted on the end of cam shaft 751, this pulsing mechanism engaging contacts 723 to rotate the selected dials back to blank in the manner hereinbefore described in detail. (See Figure 34.) The selected dials thus return to the position shown in Figure 34 ready for the new quotation.

The cam operated switches 728 and 719 are next closed to prepare the circuits of the selected dials for the pulsing operation to set the same to their new positions. Incidentally cams 726 and 729 of Figure 34 are preferably mounted on cam shaft 751 and find their counterpart in two of cams 801 to 808 of Figure 38. The other cam operated contacts in this group are for the purpose of making the operation of the mechanism completely automatic and will be apparent in connection with the description of the circuit arrangement hereinafter described.

It will be recalled that armature levers 750 have springs 750' associated therewith for returning the same to blank positions. Locking levers 783 are therefore provided to maintain armature levers 750 in their newly selected positions, even though the selecting magnets thereof have been de-energized. By thus locking the armature levers in position, a complete overlap of operations is provided whereby the selecting magnets for the selector units may be re-energized for a subsequent selection while the mechanical operations of the translating device are proceeding, with the armature levers locked in their previously selected position.

Next by a properly timed contact, preferably one of contacts 811 to 818, the circuits for the selector magnets of the selector units 745, 746 and 747 are now closed whereby the armatures 750 assume their newly selected positions, since they are not yet locked. Cam 776 now rotates until the apex thereof is beneath roller 779, moving lever 777 counterclockwise, and moving link 781 to the left of Figure 36 and allowing locking levers 783 to engage the newly set armature levers 750 to lock the same in position. The first high portion of cam 765 now engages its cam lever 767, moving link 763 to the left of Figure 36, thus oscillating levers 759 to cause engagement of transfer levers 760 with locked armature levers 750. Thus a new selection is made for selector units 745, 746 and 747 for the "tens," "units" and "fractions" of the selected stock.

Rotation of these units to their new positions by release of stop arms 770, causes each pulsing cam 756 to operate its contact 757 in accordance with the setting of the armature levers. Thus if the "tens" dial is to be set to the digit 8, the pulsing contact 757 will be closed eight successive times to thus step the dial from blank to indicate the digit 8.

The next operation is a release of lever 777 by the roller 779 again returning to the low portion of its cam 776 thus moving link 781 to the right of Figure 36 to disengage locking levers 783 from armature levers 750. Since the selecting magnets of selectors 745, 746 and 747 are now de-energized by breaking the circuits thereof, preferably by one of cam operated contacts 811 to 818, these armature levers return to blank position. Since the operation of the embodiment of the present invention depends upon stepping each selected indicator from blank to a new position, it is obviously necessary that each selector unit be returned to its blank position after the above-described selection has taken place. Therefore, the next operation is to engage the transfer levers 160 with the armature lever 750 to return the selector units 745, 746, 747 to blank or initial position.

This step occurs by oscillation of lever 767, by the second high portion of cam 765, thus moving link 763 to the left of Figure 36 causing bails 759 to rotate clockwise, carrying transfer levers 760 into engagement with armature levers 750 which are now in their blank positions. Thus selector units 745, 746 and 747 return to blank.

This movement of the selector levers to blank position does not pulse the selected dials, since cam 729 (Figure 34) has now opened its contact 728.

Cam shaft 751 will now have made one complete revolution and is brought to rest since the magnet 793 will be de-energized at this time and latch 796 (Figures 35 and 38) will engage to stop rotation of shaft 751. The parts will thus be returned to the initial position shown in the drawings, preparatory to a subsequent quotation. In the meantime cam 795 will have returned to the position of Figure 39, disengaging selector levers 824 from cams 851 by way of release bail 848. Contact levers 825 will remain in set position to close the selected circuits, and the next selection may be initiated.

If desirable, the range circuits closed by contact assemblies 855 may be self-locking and a subsequent range selection may proceed, thus providing an overlap whereby a succeeding quotation may be started while the mechanical operations of a preceding one are being completed.

The mechanical apparatus associated with the present invention having been described, the following disclosure will relate to the electrical circuits employed in carrying out this invention.

*Transmitting station circuit*

The electrical circuit for the transmitting station is shown in Figures 41 and 42. Referring to Figure 12, it has been noted that the quotation message is set up on the keyset and transmitted through contact mechanism 134 to sequence relays 115, Figure 1. As shown in Figure 1, the embodiment disclosed comprises two channels, each channel being provided with two sections, each section having a transmitting keyboard 107 provided with an individual sequence unit 115, and an individual pair of overlap units 116a and 116b, these overlap units 116a and 116b of each channel being alternately associated with overlap units 118 and the transmitting distributor 121 by operation of seeker unit 117. The electrical circuits for each keyset and its associated sequence relay 115, units 116, and connection to seeker unit 117, are alike, one of which is shown in detail in Figure 41, and the others being indicated in Figure 42.

Having reference to Figure 41, each sequence relay assembly 115 comprises a series of seven relays 901 to 907 with which are associated three auxiliary relays X, Y and Z, the function of which will be presently set forth. The keyboard contacts are indicated diagrammatically in Figure 41, at 910 to 923 inclusive, and reference may be had to Figures 12 to 16 for a structural showing thereof.

The overlap units are shown at 116a and 116b. In unit 116a is stored that part of the stock quotation message pertaining to the stock abbreviation or indicia, and its "Preferred" nature; that is to say, as previously described, the stock quoted may be a "1st preferred," "2nd preferred" or a "3rd preferred" stock. In unit 116b is stored that part of the quotation pertaining to the range and price of the stock.

For purposes of illustration, a stock quotation, for example, ABC 45½ High, will be assumed arbitrarily, and the circuits utilized in its transmission will be traced.

Sequence relays 901 to 907 in combination with relays X, Y and Z are for the purpose of connecting the keyboard contacts 911 to 915 with the proper relays in the overlap units 116a and 116b.

It has been noted that the contact 910, Figures 12, 14 and 41, closes every revolution of the cam drum or contact operating mechanism 134, and effects the energization of the sequence relays, except as will hereinafter appear.

Normally sequence relays 901 to 907 are de-energized and the contacts associated therewith are as shown in Figure 41. Now, when the "A" key on the keyset is depressed, it initiates rotation of cam drum 134, as previously described, and consequently closes contacts 911 to 917 corresponding to the code combination of the selected letter, which cade may be of the nature of the suggested code shown in connection with Figure 12a. Contact 910 is the first contact to close and therefore completes a circuit from positive battery through contact 910, wire 924, through contacts 925, 926 and 927, over wires 928 and 929, through winding of relay 901, wire 931, contact 932, wires 933 and 934, through contact 935 to ground. Relay 901 thus becomes energized, and all the contacts associated therewith are thereby closed. Relay 901 continues to be energized by means of a locking circuit over aforementioned path from ground through contact 935 to relay 901, wire 929, through contact 936 (which is now closed), wires 937 and 938, winding of relay Z, wire 939, contact 941, wires 942 and 943 to positive battery. Relay Z thus becomes energized and locked in series with relay 901. Contact 927 associated with relay Z is opened and its contact 944 is closed.

Relay 901, thus being locked, completes circuits from such of the keyboard contacts 911 to 915 as are closed by the first stock designation key, namely the "A" key in the example given. Circuits are thus completed to overlap unit 116a over wires 951 to 955, contacts 956, wires 957, to energize their respective selector magnets 226 in overlap unit 116a and store the first letter of the stock abbreviation until the complete abbreviation or symbol has been stored and held in readiness for transmission to the line, as will later be described.

It will be noted that relay 901 controls the circuits for the first five magnets 226 for overlap unit 116a, relay 902 controls the second five of such magnets, and relay 903 controls the third five magnets. After the completion of one rotation of shaft 135 of keyset 107 (Figure 12) the various contacts 910 to 917 are opened and transmission may continue by operation of the second key.

Now, when the key of the second letter of the stock abbreviation is depressed, key "B" in the present example, a circuit is completed as follows: from positive battery through contact 910, wire 924, contacts 925, 926 and 944 (which is now closed), wire 958, contact 959 (now closed), wire 961, winding of relay 902, wire 931, contact 932, wires 933 and 934, through contact 935 to ground. Relay 902 thus is energized and all of the contacts associated therewith are thereby closed. Closing of contact 962, associated with relay 902, completes a locking circuit for relays 902 and Y from ground through contact 935, wires 934 and 933, contact 932, wire 931, winding of relay 902, thence over wire 963, contact 962 (which is now closed), wires 965 and 966, winding of relay Y, wire 967, contact 968, wires 969 and 943 to positive battery. Relay Y thus becomes energized and locked, and relay 902, previously energized, now becomes locked. Relays 901 and Z, which previously had been energized, are now de-energized because the energization of relay Y has caused the contacts 926 and 941, associated therewith, to open, thus breaking the beforementioned locking circuit for relays 901 and Z.

By closing of relays 902 and Y the keyboard contacts 911 to 915 are connected to the proper selector magnets 226 in overlap unit 116a. As the keyboard contacts now become closed in accordance with the code combination of the transmitted second letter, in this case the letter B, impulses are impressed on some of the wires 951 to 955 in accordance with the code combination of the letter, and respective wires 971 through contacts 972 and wires 973 to the second group of five selector magnets 226 in overlap unit 116a. Incidentally, the closing of keyboard contacts 911 to 915 are so timed that their closing will not occur until after the relay 901 has become de-energized, thereby breaking its contacts 956.

The sequence relay is now prepared to transfer the selection of the third letter of the stock abbreviation from the keyset to overlap unit 116a. In this connection, it will be understood that in some cases the stock index is represented by only one and sometimes two letters, in which case the counting chain operates somewhat differently, and such operation will be described later. However, in the present case, it is assumed that the stock is represented by three letters. When the third, or last letter key of the aforementioned stock abbreviation is depressed, the key for letter "C" in the example, a circuit is completed from positive battery, through keyboard contact 910, wire 924, through contacts 925 and 974 (now closed), over wire 975, through contact 976 (now closed, since relay 902 is still energized), wire 977, winding of relay 903, wire 931, contact 932, wires 933 and 934, contact 935, to ground. Relay 903 thus is energized, and all of the contacts associated therewith become closed. Therefore, retracing the circuit just described from ground through contact 935 to relay 903 and thence over wire 978, contact 979, (now closed), wires 981 and 982, winding of relay X, wires 983, 969 and 943 to positive battery, a locking circuit is thereby completed, which at once energizes relay X, and locks both relays X and 903. Contacts 925 and 968 associated with relay X are now broken, which causes de-energization of relays Y and 902, which up to this time have continued to remain energized.

Since contacts 984 associated with relay 903 are now closed, the sequence relay thus is prepared to transfer the signal impulses comprising the code combination of the third letter, in this case the letter C, from the keyset contacts 911 to 915, over wires 951 to 955, wires 985 through contacts 984, over wires 986 to the corresponding third group of five selector magnets 226 in overlap unit 116a.

Thus various of the magnets 226 in overlap unit 116a will be energized to trip their selector levers 235. However, the start magnet 196a of this unit is not yet energized and therefore the various contacts 181 are not closed at this time.

The circuits employed in the selection of the stock quotation or price will now be described. Referring to Figure 30, it is noted that the top row of each price setting unit comprises four indicators and as hereinbefore described the extreme left hand indicator represents the "hundreds" value of the stock. In this connection it will be noted that the indicator for the "hundreds" value is not shown in any other row, except the top row because, as is generally the practice among stock brokers, the "hundreds" value of the stock is shown only in the top row and the quotations shown in the other rows are always such that their "hundreds" value may be inferred from the quotation given in the top row. It will be noted from Figure 12 that the keyset is provided with two keys bearing the symbol CLS, hereinbefore mentioned, with the difference that one such key bears the subscript H, meaning "hundreds", and the other key bears the subscript TUF, signifying "tens," "units", and "fractions," the purpose of which will hereinafter appear.

As previously explained in connection with the stock board of Figures 30 to 32, the "hundreds" dial is operated through the agency of the "tens" dial. Therefore if a "hundreds" dial is to be changed a separate "hundreds" quotation is sent, for example ABC—200 CLOSE. Then a subsequent quotation is sent to change the "tens, units, fractions" dial, such as ABC—45½. In the example now being given, the quotation does not involve a change in the "hundred" dial.

The sequence relays are now prepared to transfer or relay the "tens" value of the stock to the overlap unit 116b. In this connection, referring to Figure 12 and the charts of Figures 6 and 7, it is also noted that the code combinations of all the numerals and fractions include the sixth impulse or in other words, the depression of a number or fractions key affects the number six code bar. The purpose of contact 916 of the series of keyset contacts, which contact is affected by the number six code bar only, is to make possible the proper functioning of the sequence relay, since it will be noted that the relay X is still energized, and consequently contacts 925 and 968 are broken, therefore a circuit cannot be completed from positive battery through keyset contact 910, as was the case with each letter, hereinbefore described. Thus, the function of contact 916 is to provide a means for completing a circuit to effect the energization of relay 904, and consequently the deenergization of relay X.

Assuming, therefore, that the numeral key for the "tens" value ("4" in this instance) has been depressed, a circuit will be completed from positive battery, through contact 916, wire 991, contact 992 (associated with relay 906), wire 993, contact 994, wires 995 and 996, winding of relay 904, wires 933, 934, contact 935 to ground. Relay 904 thus becomes energized and its associated contacts 997, 998 and 999 are, therefore, closed while its contact 932 is opened. A locking circuit is completed from ground, through contact 935, wires 934, 933, winding of relay 904, wire 996, contact 998 (associated with relay 904), wires 937 and 938, winding of relay Z, wire 939, contact 941, wires 942 and 943 to positive battery. It is obvious that the opening of contact 932 breaks the aforementioned locking circuit for relays X and 903 to effect their deenergization.

Relay Z thus is energized and relays Z and 904 are now locked. Contact 927 associated with relay Z is now broken and contact 944 is closed. The sequence relay is now prepared to transfer the selection just made, namely, the "tens" value of the stock, from the keyset to the overlap unit 116b. Referring to Figure 14, the purpose of having cam 148 so positioned as to close its contact 916 before contacts 911 to 915 operate is now apparent. By this timing, relay 904 may operate and prepare the sequence relay before the keyset contacts 911 to 915 operate. When keyset contacts are closed in accordance with the code combination of the selected figure, circuits are completed over wires 952 to 955, and wires 1001, contacts 997, wires 1002, through the chosen selector magnets of the "tens" group in the overlap unit 116b to ground.

The sequence relay is now prepared to relay the next or "units" figure of the quotation (in this case the "5" key). This time the energizing current for relay 905 will be completed from positive battery through keyset contact 910, wire 924, contacts 925, 926 and 944 (now closed), wires 958 and 1003, contact 999 (now closed), wire 1004, winding of relay 905, wires 933, 934, contact 935 to ground. When relay 905 thus is energized, its associated contacts are closed, and contact 994 also associated therewith, having been closed, is now opened, thereby breaking the energizing circuit for relays 904 and Z, which thus become de-energized. A locking circuit for relays 905 and Y is simultaneously completed from ground, through contact 935, wires 933, 934, winding of relay 905, wire 1005, through its associated contact 1006, wires 965 and 966, winding of relay Y, wire 967, contact 968, wires 969 and 943 to positive battery. Energization of relay Y causes contacts 926 and 941 to open and contact 974 to close.

A path thus is provided to transfer the selected code signal of the "units" value of the quotation from the keyset to the overlap unit 116b, through the keyset contacts 912 to 915, over respective wires 952 to 955, wires 1007, contacts 1008, wires 1009, through the windings of the chosen selector magnets 226 in the overlap unit 116b to ground.

The sequence relay is now ready to relay the "fractions" value of the stock quotation to the overlap unit 116b, which is done in the following manner. When the "fractions" key (in this case the "½" key), is depressed, a circuit is completed from positive battery, through keyset contact 910, wire 924, contacts 925 and 974 (now closed), wires 975 and 1011, contact 1012 (which is now closed), wires 1013, winding of relay 906, wire 934, contact 935, to ground. When relay 906 thus is energized, its associated contacts are closed, and contact 992 also associated therewith (which has been closed), is now opened, thereby breaking the energizing circuit for relays 905 and Y, which thus become de-energized. A locking circuit for relays 906 and Z then is completed from ground, through contact 935, wire 934, winding of relay 906, wire 1014, thence through its associated contact 1015 (now closed), wires 981 and 982, winding of relay X, wires 983, 969 and 943 to positive battery. Energization of relay X, opens its contacts 925 and 968. Opening of contact 968 breaks the previously described locking circuit for relays Y and 905, which, therefore, become de-energized. A path is now completed for the transference of the selected "fractions" code signal from the keyset contacts 913 to 915 to the overlap unit 116b, circuits being completed from positive battery, through selected keyset contacts 913 to 915, respective wires 953 to 955, wires 1016, contacts 1017, wires 1018, through the chosen selector magnets 226 in the overlap unit 116b, to ground.

The sequence relay is now prepared to relay the range indication or characteristic of the transmitted stock quotation, which is done in the following manner. In this connection, however, and referring to Figure 12a, it is noted that the code combinations of all the range possibilities or symbols include a seventh position impulse and do not include a sixth position impulse. The purpose of contact 917 of the series of keyset contacts is similar to that of contact 916, hereinbefore described, which is to make possible the proper functioning of the sequence relay, since it will be noted that relay X still is energized and consequently contacts 925 and 968 are still open; therefore a circuit cannot be completed from positive battery through keyset contact 910, as was the case with the "letters," "tens," "units" and "fractions" selections previously described. Thus, the function of the contact 917 is to provide a means for completing a circuit to effect the energization of relay 907, and consequently de-energize relay X, to again place the sequence relay in readiness to transmit the succeeding stock quotation.

As thus far described the abbreviation or designation of the selected stock, in this case stock ABC, and its price, namely 45½, have been stored in overlap units 116a and 116b, respectively. That is, certain overlap unit magnets have tripped their selector levers but the contacts controlled thereby have not closed, since the start magnets 196a and 196b have not operated.

Now, when a range key, in this case the "Hi" (High) key, is depressed a circuit will be completed from positive battery through contact 917, wire 1017, winding of relay 907, to ground. Relay 907 thus is energized and its associated contacts 1018 and 1019 are closed, and contact 935, also associated therewith is opened. Opening of contact 935 breaks the previously described locking circuit for relays X and 906 and renders the sequence relay operative for ensuing stock selections. In addition, the function of relay 907 is to make a contact that completes a circuit to initiate operation of overlap units 116a and 116b. To accomplish this a circuit is completed from positive battery, through contact 1019 (now closed), wires 1021 and 1022, clutch trip magnets 196a and 196b of overlap units 116a and 116b to ground. Clutch trip magnets 196a and 196b, when thus energized, attract their respective armatures 197 (Figure 19), which in turn release the respective clutches for rotation, thus initiating operation of overlap units 116a and 116b which operate as previously described.

The primary function of relay 907 is to close contacts 1018 to complete a path through the sequence relay for the transference of the range code signal from the keyset to the overlap unit 116b. This path is provided by closing of contacts 1018 thus completing circuits successively from positive battery through keyset contacts 911 to 914, corresponding to the code signal transmitted, over respective wires 951 to 954, wires 1023, through contacts 1018, over wires 1024, through windings of the chosen range selector magnets 226 of the overlap unit 116b to ground.

From Figures 17 to 19 it will be recalled that each overlap unit 116a and 116b operates to simultaneously close the contacts of the selected levers 244. Obviously, therefore, the mechanism must be so timed that the last group of selector magnets 226, namely, the range group of the unit 116b, have time to operate and trip off the selector levers 235 and position contact levers 244 before bail 211 engages these levers to close the selected contacts. This timing of the units may be accomplished in several ways, and is preferably carried out by having the speed of rotation of contact cam shaft 135 in the keyset unit approximately 60% faster than shaft 177 in the overlap unit. In this manner the selected range contacts are closed by the selected ones of contacts 911 to 915 and the corresponding magnets 226 in overlap unit 116b are operated before bail 211 of this unit has time to complete its cycle. For the sake of clearness, contact bail 211 of Figure 17 has been shown disengaged from the contact levers 244 with the roller 206 in the low portion of cam 201. However, the position of rest for this unit is normally slightly displaced with respect to Figure 17, roller 206 being normally on the high portion of cam 201. Therefore, when start magnet 196 of this unit is energized the cams 201 and 202 start rotating, and roller 206 then engages the low portion of its cam to release the previously engaged contact levers 244 and then rides back on a high portion of its cam to re-engage the newly selected levers. Thus the range selector magnets 226 have sufficient time to trip their levers 234 and 235 before bail 211 operates.

It is noted that the complete stock quotation, in this case ABC 45½ HIGH, is now stored in overlap units 116a and 116b, the construction and operation of which have been hereinbefore set forth.

Inasmuch as stock quotations comprising seven signals or characters has been described, such as three signals for the stock abbreviation, three signals for the price and one signal for the range; it is apparent that a stock quotation may consist of less than seven signals or characters. For instance, each stock is represented by an abbreviation or symbol which may consist of one, two or three letters. Also the price may be represented only by a "fraction," "units" and "fractions," or only "units," the transmission of each of which conditions is different, and which will now be disclosed.

Assuming that the stock to be quoted is represented symbolically by only one letter, as for instance the letter B for the Blank Corporation, and supposing that the price is given in "tens," "units and fractions," the sequence relay takes care of this situation in the following manner. The letter B is stored in overlap unit 116a, Figure 41, through the contacts 956 associated with relay 901, in a manner as previously set forth. Now, the next signal or character to be stored is the "tens" value of the stock. The corresponding number key, therefore, is depressed and relay 904 is thereby energized in the manner, as has been hereinbefore described. Relays X, Y, Z, and 901, 902 and 903 have thereby become de-energized. The purpose of the number 6 code bar and keyset contact 916 is now readily apparent, since without it the jump could not be made from relay 901 to relay 904 and none other than three letter abbreviations or symbols could, if such were the case, be employed. Thus it is clear that the energization of relay 904 in this manner is instrumental in de-energizing all the relays above relay 904 (as viewed in Figure 41) by breaking its associated contact 932, since all the locking circuits of magnets above 904 include contact 932.

In case the quotation contains "units" and "fractions" and no "tens," the keys indicating the stock abbreviation will at first be depressed in the usual manner, then since the quotation contains no "tens" value, the "BL" or "blank" key (Figure 12) will be depressed instead. It is noted that the BL-key affects only the #6 code bar and, therefore, has the effect of energizing relay 904 and opening contact 932, which causes the de-energization of relays X, Y, Z, 901, 902 and 903, and since none of the keyset contacts 911 to 915 are actuated, no current will flow through contacts 997 to the overlap unit 116b, therefore, no "tens" value will be stored in said overlap unit. The procedure in setting up the "units" and "fractions" and "range" is similar to the manner hereinbefore described.

When it is desired to set up a quotation containing only the "fractions" value, the BL-key is depressed twice, that is, instead of both the "tens" and "units" value.

It is sometimes desired, in case a quotation is already displayed containing the "tens", "units", and "fractions" value, to change only the "units" and "fractions" value, in the event the "tens" value does not change; this is accomplished by depressing the "No reset" key (Figure 12). When this key is depressed, the "tens" value indicator displays the same value as for the preceding quotation of the selected stock, and will not be affected by the succeeding set up.

In the table of Figure 8, the following code signals constitute pairs in which the action of the second member of each pair differs from the first member by omission of the act of resetting the "tens" dial; and in which the code signal of the second member of each pair differs from that of the first member by change of the nature of the third impulse; that is, the third code impulse of the first member of each pair is a spacing condition (S), whereas the third impulse of the second member of each pair is a marking condition (M), as follows:

High (TUF) SMSM and High (UF) SMMM; Low (TUF) MSSS and Low (UF) MSMS; Last (TUF) MSSM and Last (UF) MSMM; High-Last (TUF) MMSS and High-Last (UF) MMMS; Low-Last (TUF) MMSM and Low-Last (UF) MMMM. In this paragraph M indicates marking current and S indicates spacing current.

Instead of providing ten keys for these ten code signals, the "No reset" key is provided. When a "tens," "units," "fractions" (TUF) quotation is to be made, one of the range keys for the first code signals of a pair is operated. The second code signal of each pair is produced by operating the two necessary keys, that is, one of these five range keys and the "No reset" key. Should the ticker tape record only information pertaining to UF, then the operator may avoid having to find and repeat the T value by using the "No reset" key.

Referring to Figure 41, it is noted that the closing of the contact 922 by means of the "No reset" key completes an energizing circuit for selector magnet 1030 in overlap unit 116b, which extends from positive battery, through contact 922, over one of the wires 1024, through winding of magnet 1030 to ground. It is noted that contact 922 is connected directly to magnet 1030. Since the "No reset" key will be depressed in lieu of a "tens" key and the "range" key is depressed after the "units" and "fractions" keys, it will be clear that magnet 1030 will be energized before the depression of a "range" key and resultant closing of range contacts 1018. Having reference to Figure 12, it is observed that the depression of the "No reset" key also effects the operation of the #6 code bar to close the contact 916. Thus it is apparent that the operation of the "No reset" key takes the place of the operation of a "figure" key in the "tens" position of a quotation, to step the sequence relays forward for a "units" quotation, the "tens" selector magnets being unaffected.

Incidentally, the energization of relay 907, similarly causes the de-energization of relay X, Y, Z and 901 to 906 by opening its contact 935, as has been noted.

As is well known, the grades of stocks are generally divided into common and preferred stocks, and in some cases the preferred stocks are further divided into "first," "second" and "third" preferred stocks, as the case may be. The same stock may be displayed on the stock board in more than one place, for instance, in one place its common stock quotation may be displayed or exhibited, and in other places some or all of its preferred stock quotations may be exhibited. Now, referring to Figure 12, it is noted that three keys, 1031, 1032 and 1033, are provided, bearing the following symbols or designations; IPF, 2PF and 3PF, and which signify "1st," "2nd" and "3rd" preferred stocks, respectively. So, when the stock quotation to be transmitted represents the "1st" preferred stock, the corresponding key 1031 is depressed, thus closing contact 918 (Figure 41) to complete a circuit from positive battery, contact 918, wire 1034, winding of its corresponding magnet in overlap unit 116a, to ground. When the quotation to be transmitted represents the "2nd" preferred stock, the corresponding key 1032 is depressed to close its associated contact 919, thus completing a circuit from positive battery, through contact 919, wire 1035, through winding of its corresponding magnet in overlap unit 116a, to ground. When the quotation to be transmitted represents the "3rd" preferred stock, key 1033 is depressed, thereby closing its associated contacts 920 and 921, which are connected in parallel with contacts 918 and 919 respectively, thus completing circuits simultaneously over wires 1034 and 1035, as previously described, thereby energizing both the previously mentioned magnets in the overlap unit 116a. It will be understood that the preferred keys will be operated after operation of the stock keys and before operation of the price keys. Since contacts 918 to 921 are connected directly to the last two magnets 226 in unit 116a, their operation will have no effect on the sequence relays.

*Seeker unit*

Having set forth in detail the manner in which a quotation message is stored in the overlap units 116a and 116b, which is the same for each channel section, the function of the seeker unit 117 (Figures 1 and 41) in transferring the stored message in sequence from each channel section to the polar overlap units 118 and thence through the transmitting distributor 121 to line 119 will now be described. By polar overlap unit is meant that overlap unit, as previously described, which is provided with double spring contacts 251, Figure 18, instead of single contacts 181 (Figure 17), and designed to transmit polar or double currents.

The seeker unit 117 comprises a series of cam controlled contacts 1041 to 1046 of the type shown in Figure 41, and a bank of relays 1051 to 1058, the relays individual to the sections of channel #1 being shown in Figure 41, and the relays individual to the sections of channel #2 being indicated in Figure 42. Relay banks 1051 to 1058 control sundry circuits, as will appear in the following disclosure.

Start magnet 1059 of the transmitting distributor 121, Figure 42, is shown as de-energized, and the transmitting distributor thus is shown in its stop position. When the transmitting distributor is in this position, it is prepared upon restarting to transmit a channel #1 message. This is accomplished by a phasing means, hereinafter described. In its stop position transmitting brush 1061 on distributor arm 1062 is in contact with the stop segment, thus impressing negative current on the signal line.

Relays 1051 to 1054 are hereinafter called the seeker relays, one being individual to each channel section, and are shown in Figures 41 and 42 in their released or de-energized condition, which is their condition when a message is stored in each individual overlap unit 116a and 116b. In this condition each section of channels #1 and #2 is said to be "ready" or prepared to send a quotation message. Relays 1055 to 1058 (Figures 41 and 42) are hereinafter called the auxiliary relays, and are adapted to cooperate with the seeker relays 1051 to 1054 as described in the following.

Following upon the storage of a quotation message in the individual overlap units 116a and 116b, rotation of distributor arm 1062 is initiated upon energization of start magnet 1059, due to the completion of an energizing circuit to be later described in connection with the full disclosure of the phasing means, previously alluded to.

During the first revolution of the distributor arm 1062, brush 1063 will wipe over segment 1064 to complete a circuit from positive battery through ring 1065, brush 1066, distributor arm 1062, brush 1063, segment 1064, wire 1067, contact 1041 (now closed) in the seeker unit 117, wire 1068 to the point 1069 where the circuit is divided; thence through contact 1071, wire 1072, contact 1073 to point 1074 where the circuit is again divided, from which point the present circuit is effectively completed, first over wire 1075, through winding of transfer relay 1076 to ground; secondly, the circuit is effectively completed from point 1074, over wire 1083, through winding of relay 1056 to ground. Thus it is apparent that relays 1076 and 1056 become energized and affect their associated contacts. It will be clear that each section of each channel will be provided with an individual set of contacts similar to 1089, with an individual transfer relay similar to relay 1076, similar contacts and transfer relay for section two of channel #1 being indicated by reference characters 1089a and 1076a respectively. It will be understood that each set of transfer contacts 1089, 1089a etc. for each section of each channel are multipled to common overlap units 118a and 118b.

In the present example, relays 1076 and 1056 remain energized due to their respective locking circuits which are established from positive battery through locking contact 1045 in the seeker unit 117, wires 1078, 1079 and 1081, contact 1082, (now closed) wire 1077 to point of division 1084, thence through winding of relay 1056 to ground; also from point 1084, over wires 1083 and 1075 through winding of relay 1076 to ground. It is obvious that it is impossible to lock relay 1076 without also locking relay 1056.

All of the contacts 1089 of relay 1076 thus are closed simultaneously, permitting the message stored in the overlap units 116a and 116b of the first section of channel #1 to be transferred to polar overlap units 118a and 118b. Energizing circuits for selected magnets 226' in overlap units 118a and 118b being completed from positive battery, through contacts 181' in overlap units 116a and 116b that are closed in accordance with the code signal combinations of the transmitted message, wires 1088, contacts 1089, wires 1091 and 1092, windings of magnets 226' in the polar overlap units 118a and 118b to ground. The message to be propagated thus is now stored in the selector magnets 226', the stock selection being stored in unit 119a and the price thereof in unit 118b.

Simultaneously with the previously described transference of the message, an energizing circuit for seeker relay 1051 is completed from positive battery, over wire 1093, individual contact 1089, wire 1094, winding of relay 1051 to ground. Contacts 1095, 1096 and 1097 of relay 1051 thus are closed and contacts 1071 and 1098 are opened. A locking circuit for relay 1051 is established from positive battery through contact 259 (in overlap unit 116b) normally closed, wire 1101, contact 1095, through winding of relay 1051 to ground.

Relay 1051 is now in the "not ready" or unprepared position, since it is noted that no further message has as yet been stored in the overlap units 116a and 116b associated with relay 1051, its previous message having been just transferred as previously described.

To place relay 1051 again in the "ready" position, it is necessary to set up a new message on the keyset and cause it to be transferred to overlap contacts 181' as hereinbefore described. During rotation of main shaft 177 in overlap unit 116b (previously described in connection with Figure 19), contact 259 is caused to be momentarily broken thus causing de-energization of relay 1051 to put this relay 1051 again in the "ready" position. By the automatic energization of the range key locking magnets 158, as fully hereinafter described, the range keys may not be depressed for a second quotation on any keyset 107 until the previous quotation has been transferred from its individual overlap units 116a and 116b, thus clearing that section of the channel for another quotation to be completed. Of course, it is understood that relay 1076 is operated only momentarily, just of sufficient duration to complete the transference of the message to the previously mentioned polar overlap units. The timing for the energization of relays 1056 and 1076 is taken care of by the seeker unit 117 as will presently appear.

It is now noted that the quotation message is set up on the selector magnets 226' in polar overlap units 118a and 118b preparatory to being transferred as hereinbefore described to contacts 251'. Brush 1063 now is caused to wipe over segment 1102, causing an energizing circuit for clutch trip magnet 1103 of overlap unit 118a to be established from positive battery, ring 1065, brush 1066, arm 1062, brush 1063, segment 1102, wire 1103', through winding of magnet 1103 to ground. The operation of unit 118a thus is initiated causing the storage of the message on contacts 251'.

Distributor arm 1062 continues in its rotation, causing brush 1063 to wipe over segment 1104, thus causing an energizing circuit for the seeker unit start magnet 1105 to be established from positive battery, ring 1065, brush 1066, arm 1062, brush 1063, segment 1104, wire 1106, through winding of magnet 1105 to ground. The seeker unit thus is permitted to rotate counterclockwise through an angle of 90 degrees to cause opening of previously closed contact 1041 and the closing of contact 1042. Locking contact 1045 also is caused to open momentarily sufficient to break the previously described locking circuit for relays 1056 and 1076.

It has been seen how contact 1041 of the seeker unit controls the first section of channel #1. If it so happens that the first section of channel #1 controlled by relay 1051 is "not ready," the present invention provides that the second section controlled by relay 1052 be "ready," the message stored in that section will be transferred instead, thus utilizing the signal line time to a fuller extent. A provision of this invention is to always send a channel #1 and channel #2 quotation message alternately whether it is set up on either section one or two of their respective channels. Furthermore, the seeker unit relays and contacts are so arranged that if both sections of a channel are "ready," the messages will be taken off alternately, whereby one section is not delayed by the repeated taking off of messages from its companion section. The circuits whereby this operation takes place will be described in detail.

Assuming for purpose of illustration that for the moment seeker contact 1041 of channel #1 is the sole contact therein (except the locking contact 1045) that is closed, and that the relay 1051 is in the "not ready" position and that relay 1052 is in the "ready" position, and also that the distributor arm brush 1063 is in contact with segment 1064; energizing circuits for relays 1055 and 1076a for the second section of channel #1 will be completed from positive battery, through ring 1065, brush 1066, arm 1062, brush 1063, segment 1064, wire 1067, through contact 1041, wire 1068 to point 1069, thence through contact 1096 (now closed because relay 1051 is in the "not ready" position and is therefore energized), over wire 1108, through contact 1109, through contact 1112 to point 1113, where the circuit is divided; the circuit for relay 1076a extending from thence over wire 1114 through winding of relay 1076a to ground. The circuit for relay 1055 extends from point 1113, through winding of relay 1055 to ground. Thus the seeker unit automatically selects a section two of channel #1 quotation if section one is "not ready," transfer relay 1076a closing its contacts 1089a to transfer the quotation stored in overlap units 116a and 116b of section two to the polar overlap units 118a and 118b. It will be understood that a similar operation takes place for channel #2, the relays selecting whichever section of channel #2 is "ready."

Locking circuits for relays 1055 and 1076 (now energized) are established from positive battery, through locking contact 1045, wires 1078, 1079 and 1117, contact 1118 (now closed), wire 1119 to point of division 1113, thence through winding of relay 1055 to ground. The locking circuit for relay 1076a proceeds from point 1113, over wire 1114 through winding of relay 1076a to ground.

Contacts 1089a of relay 1076a thus are closed simultaneously causing transference of the quotation message from the second section of channel #1 to overlap units 118a and 118b, as hereinbefore described. Similarly, relay 1052 of section two, channel #1, is energized by a circuit from positive battery over wire 1093 through individual contact 1089a, wire 1124, winding of relay 1052 to ground. Relay 1052 thus is placed in a "not ready" position and is locked in this position by a locking circuit similar to that previously described for relay 1051.

As the brush arm 1062 continues its rotation, its brush 1063 will wipe over segment 1124 to complete an energizing circuit for clutch trip magnet 1125 of polar overlap unit 118b from positive battery through ring 1065, brush 1066, arm 1062, brush 1063, segment 1124, wire 1126, through winding of magnet 1125 to ground, thus effecting storage of the message on contacts 251' in overlap unit 118b.

As brush arm 1062 completes its revolution, its brush 1063 comes into contact with segment 1127. The function of segment 1127 will presently appear.

Brush arm 1062 has now completed one revolution, during which time its brush 1061 has traversed the segments in ring 1027, but since no quotation message was stored in the overlap units 118a and 118b a blank message has been transmitted over the signal line 119 through the medium of brushes 1061 and 1129 and ring 1131. Now, during the next revolution of brush arm 1062 the traversing of brush 1061 over the segments in ring 1027 will effect the transmission of the quotation message previously stored in overlap units 118a and 118b. Segments numbered 1 to 17 on ring 1027 are connected to polar contacts 251' of polar overlap units 118a which is the stock selector unit, and segments 18 to 32 of ring 1027 are connected to polar contacts 251' of unit 118b which is the price and range selector. From Figure 42 it will be seen that positive or negative impulses are impressed on the segments of ring 1027 in accordance with the settings of contacts 251'. At the same time, the traversing of brush 1063 over the functional contacts 1064, 1102, etc., will effect operation of the various devices for the succeeding message to be transmitted.

Thus when brush 1063 again wipes over contact 1064 it causes positive current to be impressed on wire 1067 as previously described through seeker contact 1042, which, as previously set forth has been closed, to effect operation of seeker relay 1053 and auxiliary relay 1058 to transfer a channel #2 message to the signal line similarly as hereinbefore described in connection with relay 1051.

It will be clear from the foregoing description that polar overlap units 118a and 118b may be connected to any one set of four overlap units 116a and 116b, there being two such sets in channel #1 and two in channel #2. In Figure 42 wires 1092 of units 118a and 118b are shown as being connected to section 1, chanel #1, by contacts 1089, and to section 2, channel #1 by contacts 1089a. It will be understood that similar contacts are provided for overlap units of channel #2 which are controlled in a similar manner by magnets 1053 and 1054. Should it happen that relay 1053 controlling the first section of channel #2 be in the "not ready" position the procedure is to transfer the message from the second section of channel #2 if the relay 1054 controlling it is in the "ready" position, in the same manner as previously described in connection with relay 1051.

Succeeding rotations of brush arm 1062 will cause seeker unit contacts 1043 and 1044 to close successively to effect the operation of seeker relays 1052 and 1054 in the manner similar to that previously described. The start magnet 1105 of the seeker unit (operated by segment 1104) allows the seeker unit shaft to rotate 90° for each operation, thus closing contacts 1041 to 1044 in sequence. Likewise, in the case of relays 1052 and 1054, should these relays be in the "not ready" position and their companion relays 1051 and 1053, respectively, be in the "ready" position, the message will be transferred from the prepared relay or section controlled thereby. For example, should relay 1052 be "not ready," (therefore energized) current impressed on wire 1067 and passed through seeker contact 1043 (which controls the second section of channel #1) will pass over wire 1132, contact 1133 (now closed), wire 1134 to point 1069, thence through contact 1071 and over previously traced circuit to operate auxiliary relay 1056, as previously described.

The function of contact 1135 of relay 1052 is similar to contact 1095 of relay 1051.

*Range key lock magnet*

To prevent the possibility of a keyset operator 113 setting up a complete quotation on his set 107, and completing the same by depressing a range key, while the preceding quotation is still set up on his individual overlap units 116a and 116b, range key lock magnet 158 is provided. It will be recalled from Figure 12 that when magnet 158 is energized, it mechanically locks all range keys from being depressed. Each range key lock magnet of each keyset 107 is controlled by a circuit including alternatively a contact of the individual seeker relay and a contact of the auxiliary relay individual thereto. For example, in Figure 41, wherein the complete sequence relays and overlap units 116a and 116b for section one of channel #1 are shown, the range key lock magnet 158 will be energized to lock all range keys of the keyset for this section if either relay 1051 is deenergized and therefore in its "ready" position, or if relay 1056 is energized and therefore in the position of transferring a channel #1, section one message. This circuit is from positive, through winding of range key magnet 158, wire 1136, to point 1137, then either to wire 1138, closed contact 1098, wire 1139 to ground; or from point of division 1137 to wire 1141, contact 1142 when relay 1056 is energized, to ground.

By the circuits above traced the range key lock magnet 158 will lock all the range keys in their upward position to prevent the depression thereof to complete a quotation, as long as the previous quotation is still on the overlap units individual to that keyset 107. It will be recalled that auxiliary relay 1056 is closed and locked with the transfer relay 1076 to transfer the message from overlap units 116a and 116b to the overlap units 118a and 118b. Relay 1056 remains locked in energized position until the distributor 121 has rotated sufficiently to operate the start magnet 1105 of the seeker unit to break the locking contact 1045. When this occurs, the quotation message of section one, channel #1, controlled by relay 1051 and auxiliary relay 1056 has been set up on the overlap units 118a and 118b and this section of the system is then cleared for a subsequent quotation and therefore its range key lock magnet 158 may be released. When relay 1056 is de-energized, contact 1142 opens thus breaking one of the circuits for the range key lock magnet. The other circuit for the range key lock magnet which is closed by contact 1098 when seeker relay 1051 is "ready" or deenergized is broken when transfer relay 1076 closes individual contacts 1089, thus connecting wires 1093 and 1094 and thereby energizing seeker relay 1051 to place it in the "not ready" position.

Thus each keyset operator 113 is prevented from completing any quotation until the previous quotation set up by him on his individual overlap units has been taken therefrom by the seeker unit and transferred to the common overlap units 118a and 118b. When this occurs the range key lock magnet 158 is released and the range key may be depressed to complete the quotation and set the same on the individual overlap units 116a and 116b. It will be understood that each keyset is locked in a similar manner when its seeker relays 1052, 1053 or 1054 are in their "not ready" positions, or the corresponding auxiliary relays 1055, 1057 and 1058 are energized during the transfer of the previous quotation to the common overlap units 118a and 118b.

Error key

Should the keyset operator discover that he has depressed a wrong key, thus setting up an erroneous message in the overlap unit, he then depresses the "ERR" key. Referring to Figure 12 it is noted that the "ERR" key not only controls a contact 923 but also operates the #7 code bar, which as has been seen, is associated with the range keys and initiates operation of the overlap units 116a and 116b. Closing of contact 923 completes an energizing circuit for error relay 1145, from positive battery through contact 923 (now closed), wire 1146, winding of relay 1145 to ground. The operation of error relay 1145 causes its contacts 1147 and 1148 to close. Closing of contact 1147 completes a locking circuit for relay 1145 from positive battery through the error relay locking contact 260 in overlap unit 116b, over wire 1151, through contact 1147, through winding of relay 1145 to ground.

Normally, as has been noted, operation of overlap unit 116b will cause seeker locking contact 259, which is cam operated, to open at a predetermined moment thus breaking the energizing circuit for its associated seeker relay 1051 and placing relay 1051 in the "ready" position. However, when an erroneous message is set up on the keyset, it must be prevented from affecting relay 1051. Therefore, contact 259 is adapted to be shunted by contact 1148 (now closed) associated with relay 1145, thus preserving the energizing circuit for relay 1051 and maintaining it in the "not ready" position. Since relay 1051 thus remains "not ready" or energized, its contact 1071 is open and contact 1096 is closed. Therefore its auxiliary relay 1056 and transfer relay 1076 will not be energized when segment 1064 of distributor 121 is engaged, so that the incorrect quotation is not transferred to overlap units 118a and 118b. The contact 260 is cam operated and is adapted to be opened momentarily immediately following the opening of contact 259, thus breaking the energizating circuit for relay 1145 and restoring said relay to its normal released condition. Contacts 259 and 260 are normally closed.

Phasing means

The present invention provides that when there are no messages set up in the individual overlap units 116a and 116b, brush arm 1062 will continue to rotate for a short period, allowing six quotations to be transmitted in the present embodiment, before phasing, thus insuring the transmission of all the messages stored in the overlap units. As previously mentioned, when the transmitting distributor is in the stop position, it is prepared upon restarting to transmit a channel #1 quotation message.

A manually operated phasing key 1150 is shown in Figure 42, which key is adapted to control its associated contact 1163, and which is adapted to permit the performance manually of the operation of phasing, the automatic operation of which is about to be described. Contact 1163, controlled by phasing key 1150 is shown open in Figure 42, but in the ensuing description this contact will be assumed to have been closed.

In consequence of thus closing contact 1163, an energizing circuit for relay 1171 and start magnet 1059 is established from positive battery through contact 1161, wire 1162, contact 1163, wires 1165 and 1183, contact 1182, wires 1184 and 1169, winding of relay 1171, wire 1172, through winding of start magnet 1059 to ground. The energization of relay 1171 causes its contacts 1166 and 1174 to close and its contact 1178 to open. Contact 1178 controls the operation of relay 1179, as will presently appear.

When all of the seeker relays 1051 to 1054 are in the "not ready" or energized position, a phasing circuit is completed from positive battery through contact 1097, wire 1152, contact 1153, wire 1154, contact 1155, wire 1156, contact 1157, wire 1158, through winding of slow acting relay 1159 to ground. Relay 1159 does not operate its associated contact 1161 until after a short period equivalent to the transmission of six messages, as previously mentioned. Obviously this period may be adjusted to meet various local conditions by adjusting the time period of slow acting relay 1159.

Two controlling circuits are provided for distributor start magnet 1059; one extends from positive battery through contact 1161 of relay 1159, wire 1162, contact 1163 (now assumed to be closed) associated with the manually operated phasing key 1150, wire 1165, contact 1166 (now closed), wires 1167, 1168 and 1169, winding of relay 1171, wire 1172, through winding of start magnet 1059 to ground.

The other controlling circuit for magnet 1059 extends from positive battery through phasing contact 1046 (Figure 41), wire 1173, contact 1174 (now assumed to be closed), wires 1168 and 1169, winding of relay 1171, wire 1172, through winding of start magnet 1059 to ground. This last mentioned circuit is used to control magnet 1059 whenever the phasing contact 1046 is closed, as will presently appear.

Phasing contact 1046 is operated by a double cam 1176, as shown in Figure 41, and is adapted to be held open, whenever seeker unit 117 is prepared to effect the transfer of a channel #1 message to polar overlap units 118a and 118b, as previously described.

Now, if the phasing relay 1159 operates when all seeker relays are "not ready" and its contact 1161 opens, the first mentioned controlling circuit for start magnet 1059 is thereby broken at contact 1161, thus placing magnet 1059 solely under control of the second mentioned controlling circuit through phasing contact 1046, which circuit will be preserved until one of the pair of cam projections (Figure 41) on the phasing cam 1176 effects opening of the phasing contact 1046, which occurs when seeker unit 117 is prepared to effect the aforementioned transfer of a channel #1 message. It is noted that one complete rotation of the cam shaft and the cams of the seeker unit 117 corresponds to four complete quotations in the order of channel #1, channel #2, channel #1, channel #2, and therefore contact 1046 will will be opened whenever the seeker unit is prepared to transfer a channel #1 message, that is, whenever contact 1041 or 1043 is closed. When phasing contact 1046 opens, the controlling circuit for magnet 1059 is broken, thus bringing the brush arm 1062 to a stop with either contact 1041 or 1043 closed, thus preparing the transmitting distributor to send out a channel #1 message when it is again started into operation.

When the last mentioned controlling circuit for magnet 1059 is broken, relay 1171 in series with magnet 1059 is also released, causing opening of its contacts 1166 and 1174 and closing of its contact 1178. Closing of contact 1178 completes an energizing circuit for the restart relay 1179 from positive battery, through contact 1173, wire 1181, through winding of relay 1179 to ground.

Contact 1182 of relay 1179 thereupon closes, thus preparing an energizing circuit for the start magnet 1059 from positive battery through contact 1161 (still open), wire 1162, contact 1163, wires 1165 and 1183, contact 1182 (now closed), wires 1184 and 1169, winding of relay 1171, wire 1172, through winding of magnet 1059 to ground.

Now, when any of the seeker relays 1051 to 1054 are subsequently placed in their "ready" position their associated contact 1097, 1153, 1155 or 1157 will be opened, thus breaking the aforementioned energizing circuit for relay 1159 and causing contact 1161 of said relay 1159 to close. Thus an energizing circuit for start magnet is completed over the circuit just traced. Rotation of brush arm 1062 thus is initiated to transmit a channel #1 message. Of course, if the initiation of the rotation of the brush arm 1062 was caused by a channel #2 relay becoming "ready," a channel #1 message whose signals are composed of blank characters and numerals are nevertheless sent out to the line, since it has been noted that whenever the transmitting distributor is at rest it is prepared to send out a channel #1 message.

When the last mentioned controlling circuit for magnet 1059 thus is completed, relay 1171 in series with magnet 1059 is also operated, thus again causing its contacts 1174 and 1166 to close and its contact 1178 to open. The previously described energizing circuit for start magnet 1059 through contact 1166 again is established. Opening of contact 1178 has broken the operating circuit for relay 1179, thus opening its contact 1182 to break the aforementioned starting circuit therethrough for magnet 1059. The entire circuit is now prepared to be phased at such times, when the contacts 1097, 1153, 1155 and 1157 shall have again become closed.

In case the manual phasing key 1150 is operated to open its contacts 1163, the circuit from contact 1161 is broken, and start magnet 1059 will not operate when any seeker magnet 1051 to 1054 becomes "ready" and de-energizes magnet 1159. Transmission may thus be manually suspended.

The speed of the motor is maintained invariable by a vibrating fork 1185 (Figure 42) in conjunction with a speed indicator 1190. This system of speed control is fully shown and described in a co-pending application of the present applicant and others, filed on October 13, 1930, Serial Number 488,664. Associated with the distributor motor 1186 (Figure 42) is a load compensating means comprising a relay 1187 and resistance 1188, which will now be described. It is understood that when the transmitting distributor is at rest the motor is running and the brush arm 1062 is stopped by armature 1189 of start magnet 1059. When brush arm 1062 is in this position brush 1063 thereon is in contact with segment 1127, thus completing an energizing circuit for relay 1187 from positive battery, through ring 1065, brush 1066, over arm 1062, through brush 1063, over wire 1191, through winding of relay 1187 to ground.

Energization of relay 1187 causes its armature 1192 to be pulled up to close contact 1193. Simultaneously with the energization of relay 1187, a power circuit for motor 1186 is completed from positive battery through motor 1186, over wires 1194 and 1195, over armature 1192, through contact 1193 to ground. The motor is at this time tending to rotate the distributor arm 1062 against the resistance of friction clutch 1195, which is thus imposing a load on the motor since arm 1062 is restrained from rotation by armature 1189.

Now, when the arm 1062 is released for rotation, which is initiated as previously described, the load on the motor imposed by the friction clutch will be removed and the motor would at once tend to speed up suddenly, carrying the brush 1061 across the initial segments asynchronously. To prevent this occurrence, the above mentioned compensating means has been provided, which consists essentially in inserting a resistance into the motor circuit prior to the release of brush arm 1062, in the following manner.

When start magnet 1059 becomes energized, the rotation of brush arm 1062 is initiated. As soon as brush 1063 moves off segment 1127 the relay 1187 becomes deenergized, thus releasing armature 1192 and breaking the circuit through contact 1193. The motor current thus will be compelled to flow through the resistance 1188 to ground, reducing the motor current, thereby compensating for the load imposed by the friction clutch, which load is removed when arm 1062 is released for movement.

*Electrical circuit for monitor receiving station*

As previously mentioned, the present invention provides means for safeguarding the quotation service by supervision and correction of errors; such means including a monitor receiving station adapted to control a series of monitor tickers. The electrical circuit for the monitor receiving station is shown in Figures 43 and 44 and will now be described.

The signal impulses as they are received over line 1128 (Figure 43) and through relay 1201 cause tongue 1202 to vibrate in accordance therewith, and whenever a marking impulse is received, circuits are completed to cause energization of the selector magnets in the overlap units in the following manner. As previously described, channel #1 and channel #2 stocks are transmitted alternately through the transmitting distributor (Figure 42), this sequence being so controlled by the seeker unit 117 and its associated relays.

Now, since this monitor system is designed to be used primarily at and in conjunction with the transmitting station, receiving distributor 125 (Figures 1 and 43) is initially phased by the transmitting station. The normal position of brush arm 1204 is such that brush 1205 is contacting stop segment 1206 and brush 1207 is contacting segment 1208. Arm 1204 is held in this stop position by armature of start magnet 1212.

In connection with Figure 42, it was mentioned that in the stop position brush 1061 on brush arm 1062 was in contact with the stop segment in ring 1027, thus impressing negative or marking current on the signal line. Now, when this current passes through the polar relay 1201 (Figure 43) at the receiving station and thence to ground, it operates the relay 1201 in such manner as to close its contact 1209, and open its contact 1209'. The contact 1209' being open, the energizing circuit for start magnet 1212 is broken. However, when rotation of arm 1062 is initiated as previously described, the first segment its brush 1061 wipes over is called the start segment and is the medium through which positive or spacing current is impressed on the signal line. This impulse thus produced is called the start impulse and affects polar relay 1201 (Figure 43) such that its contact 1209 opens and its contact 1209' closes. Closing of contact 1209', thus induced by the start impulse, establishes an energizing circuit for magnet 1212 from positive battery through winding of magnet 1212, over wire 1213, through contact 1209', over tongue 1202 to ground. Magnet 1212 thus energized attracts its armature to release brush arm 1204 for rotation. The first impulse to be received is, therefore, the start impulse which is of spacing nature and which completes an energizing circuit for start magnet 1212.

The signal impulses as they are received over the line 119 and through relay 1201 cause the tongue 1202 to vibrate in accordance therewith, and whenever a marking impulse is received circuits are completed to cause energization of selector magnets 1203 in overlap units 127, 127', 128 and 128' in the manner to be presently described.

In the first place however, the normal condition of the monitor receiver system is such that auxiliary relays A, B, and C are de-energized and relay D is energized. Also that relay 1210 is energized and relays 1220, 1230 and 1240 are de-energized. This is due to the fact that brush arm 1204 is in the rest or stop position and its brush 1207 is in contact with segment 1208. In this position energizing circuits for relays D and 1210 are completed as follows: for relay 1210 the energizing circuit is established from positive battery through ring 1209, brush 1211, brush arm 1204, brush 1207, segment 1208, wire 1249, armature 1214, contact 1215, wire 1216, wire 1222, through winding of relay magnet 1210 to ground.

Energization of relay 1210 thus causes closing of its associated contacts among which are contacts 1217, 1218, and 1219, the purpose of each of which will presently appear. Closing of contact 1217 completes simultaneously a locking circuit for relay 1210, and an energizing circuit for relay D from ground through winding of relay magnet 1210, wire 1222, contact 1217, wire 1223, contact 1224, armature 1225, wire 1226, through winding of relay magnet D to positive battery. Thus a common locking circuit is established for relays 1210 and D. Energization of relay D, attracts armature 1227 and breaks contact 1228, the effect of which will hereinafter appear. Closing of contact 1218 prepares an energizing circuit for relay 1220 as will presently appear. So, too, closing of contact 1219 prepares an energizing circuit for start magnet 1245 (Figure 44) presently to be described.

Such is the condition of the entire circuit prior to the reception of the start impulse, which when received initiates rotation of brush arm 1204 as previously described. Assuming that the first stock quotation to be transmitted pertains to channel #1 and the first impulse after the start impulse is of marking nature an energizing circuit for the first individual selector magnet 1203 in the overlap unit 127 thus is completed from positive battery, wire 1282, winding of magnet 1203, over its individual wire 1232, first contact 1233, wires 1234 and 1235, segment 1236, brush 1205, over brush arm 1204, through brush 1237 and ring 1238, over wire 1239, through contact 1209, over tongue 1202 to ground.

As will be noted, the energizing circuits for selector relays 1203 in overlap units 127 and 128 are divided at points 1242 so that the corresponding selector magnets in overlap 128 may be energized in the event that the stock quotation received belongs to the category of stocks in channel #2. Similarly, the energizing circuits for selector relays 1203 in overlap units 127' and 128' are divided at 1243 so that the corresponding selector magnets 1203 in unit 128' may be energized, in the event the stock quotation belongs to channel #2. The choice of channels #1 and #2 is determined by the channelling relays 1210, 1220, 1230, and 1240; 1210 and 1220 control channel #1 and 1230 and 1240 control channel #2. As the brush arm 1204 continues to rotate, brush 1205 traverses successively its associated segments to complete energizing circuits for individual selector magnets 1203 of the selected overlap unit. It will be recalled that the first seventeen impulses of a message relate to the stock selection and the determination of whether it is a 1st, 2nd, or 3rd preferred or common. Therefore, distributor arm 1204 in rotating connects magnets 1203 of the selected overlap unit in sequence with the line relay 1201 to selectively energize these magnets in accordance with whether the incoming signals are of a marking or spacing nature.

When brush arm 1204 has completed substantially one-fourth of its revolution, brush 1207 contacts with segment 1244 to establish an energizing circuit, previously prepared by contact 1219 (associated with relay 1210), for start magnet 1245 in overlap unit 127 from positive battery through ring 1209, brush 1211, brush arm 1204, brush 1207, segment 1244, wire 1246, closed contact 1219, wire 1247, through winding of start magnet 1245 to ground.

The mechanical operation of overlap unit 127 thus is initiated to effect closing of the selectively determined contacts 1248, as hereinbefore clearly described. It will be noted here that this energizing circuit for magnet 1245 is divided at 1262, because, as will presently appear, when a channel #2 quotation is being transmitted contact 1219 will have been broken and a corresponding contact 1263 associated with relay 1230 will have been closed to complete an energizing circuit for start magnet 1264 associated with overlap unit 128, which circuit will be presently traced.

To provide the greatest amount of overlap it will be noted that start magnet 1245 is energized in advance of the complete energization of magnets 1203 in the overlap unit 127 such that the preparatory operations in the overlap unit hereinbefore set forth may be carried on simultaneously with the energization of the rest of the selector magnets 1203, and all trip arms will have been selectively positioned before bail arm 211 (Figure 17) engages the contact levers.

The message set up on the contacts of the overlap units is sent to the monitor tickers through the monitor distributors 129 and 130, as hereinafter described. Contacts 1252 and 1253 associated with overlap unit 127 are cam operated and are properly timed to complete energizing circuits for start magnets 1254 and 1255, respectively. Energization of magnets 1254 and 1255, serves to initiate operation of overlap unit 127' and monitor distributor 129, respectively. The energizing circuits for magnets 1254 and 1255 extend from positive battery through contacts 1252 and 1253 over wires 1275 and 1276 through windings of magnets 1254 and 1255 to ground. It will be understood that the timing of contacts 1252 is such that start magnet 1254 of unit 127' will be energized after its selector magnets 1203 have been operated.

As brush arm 1204 continues to rotate, brush 1207 passes off segment 1244 and a moment later establishes contactual relationship with channeling segment 1256 whereby an energizing circuit for relay 1220 previously prepared by closing of contact 1218, is now completed from positive battery through ring 1209, brush 1211, brush arm 1204, brush 1207, segment 1256, wire 1257, contact 1218, wire 1258, through winding of relay magnet 1220 to ground. This energizing circuit for relay 1220 is divided at 1259, because, as will hereinafter appear, when a channel #2 quotation is being transmitted, contact 1218 will have been broken and a corresponding contact 1261 associated with relay 1230 will have been closed to complete an energizing circuit for relay 1240, which circuit will be traced hereinafter.

Energization of relay 1220 causes closing of its associated contacts, among which is contact 1265 which completes a locking circuit for relay 1220 from ground, through winding of relay 1220, wire 1266, closed contact 1265, wire 1267, closed contact 1268, armature 1269 and wire 1271, through winding of relay A to positive. As is noted, this circuit just described establishes, simultaneously, an energizing circuit for relay A, which when thus energized attracts its associated armatures 1214 and 1225 to break contacts 1215 and 1224, respectively, and to close contact 1272. A common locking circuit thus is established for relays 1220 and A.

Breaking of contact 1224 destroys the previously described energizing circuit for relay D and locking circuit for relay 1210. Relay 1210 thus becoming de-energized releases all of its associated armatures to thereby break their individual contacts. De-energization of relay D permits contact 1228 again to become closed, and thus prepare an energizing circuit for relay C, as will presently be described.

Brush arm 1204 thereafter completes its rotation, and brush 1205 by successively passing over its associated segments 18 to 32 completes, sequentially, the energizing circuits for selector relays 1203 in overlap unit 127' by way of closed contacts of relay 1220. Energization of start magnet 1254 is so timed as to initiate the operation of overlap unit 127' so that the closing of contacts 1273 therein will be effected after all the selector magnets 1203 have been energized and the transferring operation performed, as hereinbefore set forth.

Segments 17 to 32 of distributor 125 will thus selectively transfer the received quotation for the price and range of the stock to contacts 1273 of overlap unit 127'. It is understood, in this connection, that although in order to clarify the description it has appeared that brush arm 1204 has rotated intermittently, such is not the case in practice. On the contrary, brush arm 1204 upon being released, rotates smoothly and regularly throughout a complete revolution, thus initiating the various operations with regularity. Brush arm 1204 having returned to its stop position, the monitor system thus is conditioned to receive for retransmission to the monitor tickers a stock quotation pertaining to channel #2.

While the brush arm 1204 thus is in the stop position, its brush 1207 is again in contactual relation with segment 1208, this time establishing an energizing circuit for relay 1230 from positive battery through ring 1209, brush 1211, brush arm 1204, brush 1207, segment 1208, wire 1249, armature 1214, contact 1272, (now closed), wire 1315, through winding of relay 1230 to ground. Energization of relay 1230 thus effects closing of its associated contacts which include contacts 1261, 1263 and 1316. Closing of contact 1316 establishes a locking circuit for relay 1230 from ground, through winding of relay 1230, wire 1317, contact 1316, wire 1318, contact 1319, armature 1321, wire 1322, through winding of relay B, to ground. An energizing circuit for relay B is thus established by the circuit just described. Energization of relay B thus attracts its armature, thereby breaking contact 1268 and destroying the locking circuits for relays A and 1220. De-energization of relay A thus effects closing of its associated contacts 1224 and 1215 and opening of its contact 1272. De-energization of relay 1220 restores all of its associated contacts to their open positions. Closing of the contacts associated with relay 1230 serves to prepare energizing circuits which will subsequently be traced when the reception of a channel #2 message is hereinafter described.

Before describing the effects resulting during the succeeding revolution of arm 1204, which effects are somewhat similar to those hereinbefore described for the channel #1 message, the propagation of the channel #1 message through the monitor distributor 129 to the conductor 109' directed to the monitor ticker will now be described.

Since the initiation of rotation of brush arm 1277 of monitor distributor 129 is effected when the selectively determined contacts 1249 of overlap unit 127 are closed, and since the brush arm 1277 proceeds to rotate and send out the first or stock selection portion of a channel #1 message while the second or price selection portion is being set up on overlap unit 127', it is apparent that a further overlap is provided. In the preferred form, the brush arm 1277 and 1278 of the monitor distributors 129 and 139 are timed to rotate one-half as fast as arm 1204 of receiving distributor 125, since it is apparent that the messages received on distributor 125 are transferred alternately to the monitor distributors 129 and 130.

The normal or stop position of brush arm 1277 of monitor distributor 129 is such that marking current is impressed on the wire 109' directed to the monitor tickers (or if desired, to reperforators). This circuit extends from positive battery over wire 1281 (in overlap unit 127), wire 1283, segment 1274, brush 1285, brush arm 1277, brush 1286, ring 1287, and wire 109', through the winding of magnet of remotely disposed monitor ticker 108, to ground.

As is clearly illustrated in Figure 44 each selector magnet in overlap units 127 and 127' is connected to individual segments on the monitor distributor 129 in the same sequence as obtains in the overlap units, with the exception that the group of segments comprising each letter or figure is preceded by a start segment and followed by a stop segment and is also supplied with such additional segments as to render it conformable to the six unit code shown in Figures 5 and 7. That is, the letter and figure code segments are numbered 11 to 16, 21 to 26, 31 to 36, and so forth; the start segments are numbered 10, 20, 30 and so fourth; and the stop segments are numbered 17, 27, 37, and so forth.

It is observed that wire 1284 is connected to a number of segments. It can now be readily noted that in the light of Figures 5 and 7, which illustrates the six-unit code, these segments supply the current or marking impulses which are common to the various code combinations. Similarly, the blank or dead segments, for example 1288, are comparable to the no-current or spacing impulses, which are common to the various code combinations.

As is well known, the selector mechanism of the ticker is retained in its stop position until the reception of a start or no-current impulse, which when received starts the selector mechanism in operation. Now, when magnet 1255 is energized in the manner previously mentioned, rotation of brush arm 1277 is initiated and as brush 1285 thereon traverses first the segment 1288 a start or no-current impulse is sent to the monitor ticker, which as has been noted initiates rotation of its selector cam drum. The nature of the impulses impressed on the next five segments 1289 is governed by the selectively determined condition of contacts 1248 in overlap unit 127 individual to these segments 1289. As brush 1285 passes over segment 1291 a no-current or spacing impulse is transmitted. This impulse is common to all of the letter code combinations, as seen from Figures 5 and 6. Segment 1292 is permanently charged by wire 1284 and the impulse sent therethrough is always of marking nature and constitutes the stop impulse of the code combination. Moreover, the next two series of segments 1280 and 1290 are similar in character and relate to the next two letters code combinations in the stock quotation, each series preceded by a blank or "dead" start segment and followed by a stop segment connected to wire 1284.

Segment 1293 is the start segment pertaining to the preferred stock signification, and of course, impulses of spacing nature are sent therethrough. Segments 1294 control the impulses of spacing nature which are common to all of the code combinations relating to any index of the stock. Segments 1295 and 1296 are connected to individual index contacts 1248 in overlap unit 127 and the nature of the impulses sent therethrough is selectively determined by the condition of their individual contacts 1248 to select the proper preferred index. Segments 1297 and 1298 are permanently charged by wire 1284 and the impulses sent therethrough are always of marking nature and constitute the shift impulse and the stop impulse, respectively, of the code combination relating to the preferred stock index.

Segment 1299 is the start segment pertaining to the range index of the stock quotation, through which impulses of a spacing nature are transmitted. Segments 1301 are connected to individual contacts 1273 in the overlap unit 127', and the nature of the impulses sent therethrough is selectively determined by the condition of their individual contacts 1273. Segment 1302 is blank and controls the impulse of spacing nature which is common to all of the code combinations relating to the range index of the stock. Also, segments 1303 and 1304 are permanently charged by wire 1284 and impulses sent therethrough are always of marking nature and constitute the shift and stop impulses, respectively, of the range code combination.

Segment 1305 is the start segment relating to the tens digit of the stock quotation and serves to transmit an impulse of a spacing nature. Segment 1306 is blank and controls the impulse of spacing nature which is common to all of the code combinations relating to the tens digit of the stock quotation. Segments 1307 are connected to individual contacts 1273 in the overlap unit 127', and the nature of the impulses sent through these segments is selectively determined by the condition of their individual contacts 1273. Segments 1308 and 1309 are permanently charged by wire 1284 and impulses sent therethrough are always of marking nature and constitute the shift and stop impulses, respectively, of the tens code combination. The next succeeding series of segments 1310 is similar in character and relates to the units code combination of the stock quotation.

Segment 1311 is the start segment pertaining to the fractions digit of the stock quotation, through which spacing impulses are transmitted. Segments 1312 are blank and control the impulses of spacing nature which are common to all of the code combinations relating to the fractions digit of the stock quotation. Segments 1313 are connected to individual contacts 1273 in the overlap unit 127' and the nature of the impulses sent therethrough is selectively determined by the condition of their individual contacts 1273. Segments 1314 and 1274 are permanently charged by wire 1284 and impulses sent through them are always of marking nature and constitute the shift and stop impulses, respectively, of the fractions code combination. Segment 1274 as previously set forth is also the stop segment for the entire stock quotation, that is, once brush arm 1277 is released it will make a complete revolution, not stopping until segment 1274 is again reached.

It will be recalled that the transmitting system shown in Figures 41 and 42 is so arranged that the seeker relays cooperate to alternately send out messages from channel #1 and channel #2. Therefore, upon completion of a channel #1 quotation as above described, a channel #2 quotation will be received over the incoming line 1128 (Figure 43). Furthermore, it will be remembered that the channeling device 126 including relays A, B, C, and D, is now so conditioned that relay 1230 is energized to receive a channel #2 message. This is true since after the brush arm 1204 returns to its stop position after transmitting a channel #1 message, relay 1230 is energized over a circuit previously traced and including contact 1272, which was then closed due to energization of relay A. When the relay 1230 closes its contacts, a locking circuit is completed therefor, including relay B which is also thus energized. By these circuits, the formerly energized relays A and 1220 were de-energized. Thus the channeling device 126 has prepared the overlap unit 128 and relay 1230 to receive a channel #2 message. In this condition of the monitor receiver, relay 1230 is energized and relay B is energized, relays A, C and D being deenergized.

A description will now be given of the sequence of effects resulting during the rotation of brush arm 1204 (Figure 43) in the reception of a channel #2 stock quotation. The start impulse affects start magnet 1212 in a manner to initiate the rotation of the brush arm 1204. If the first impulse after the start impulse is of marking nature an energizing circuit for individual selector magnet 1203 in overlap unit 128 thus is completed from positive battery over wire 1325, through winding of individual selector magnet 1203, wire 1326, contact 1327, wire 1328, thence through dividing point 1242, over wire 1235, through segment 1236, brush 1205, brush arm 1204, brush 1237, and ring 1238, wire 1239, through contact 1209, over tongue 1202 to ground.

As brush 1205 wipes over the succeeding segments, energizing circuits are completed for individual selector magnets 1203 in overlap units 128 and 128' when the signals received are of marking nature. On the other hand, when the signals received are of a spacing nature, the individual selector magnets will not become energized.

As in the instance previously mentioned for a channel #1 message, when brush arm 1204 has completed substantially one-fourth of its revolution, brush 1207 again contacts with segment 1244 to establish an energizing circuit, previously prepared by the closing of contact 1263 (associated with relay 1230) for start magnet 1264 in overlap unit 128 from positive battery, through ring 1209, brush 1211, brush arm 1204, brush 1207, segment 1244, wire 1246, through dividing point 1262 (it is remembered that contact 1219 is now open), thence over wire 1329, contact 1263, wire 1331, through winding of magnet 1264 to ground. The mechanical operation of overlap unit 128 is thus initiated to effect closing of the selectively determined contacts 1332, as previously described. As previously mentioned, to provide the greatest amount of overlap start magnet 1264 is energized in advance of the complete energization of magnets 1203 in overlap unit 128 so that the preparatory operations in the overlap unit may be carried on simultaneously with the energization of the rest of the selector magnets 1203.

Contacts 1333 and 1334 associated with overlap unit 128 are cam operated and are properly timed to complete energizing circuits for start magnets 1335 and 1255a, respectively. Energization of magnets 1335 and 1255a serves to initiate operation of overlap unit 128' and monitor distributor 130, respectively, over obvious circuits, similar to circuits for start magnets 1254 and 1255.

Now, as brush arm 1204 continues to rotate, its brush 1207 passes off segment 1244 and over a short gap to contact with segment 1256, to establish an energizing circuit for relay 1240, previously prepared by the closing of contact 1261 associated with relay 1230. This circuit extends from positive battery through ring 1209, brush 1211, brush arm 1204, brush 1207, segment 1256, wire 1257, through dividing point 1259 (it is noted that contact 1218 is open at this time) wire 1339, contact 1261, wire 1341, through winding of relay 1240 to ground.

Energization of relay 1240 causes closing of its associated contacts, which includes contact 1342, the closing of which establishes a locking circuit for relay 1240 from ground, through winding of relay 1240, wire 1343, contact 1342, wire 1344, through contact 1228 (now closed), armature 1227, over wire 1345, winding of relay C to ground. As is noted, this circuit establishes simultaneously, an energizing circuit for relay C, which when thus energized attracts its armature 1321 to break its associated contact 1319. A common locking circuit thus is established for relays 1240 and C.

Breaking of contact 1319 destroys the previously described energizing circuit for relay B and the locking circuit for relay 1230. Relay 1230 thus becoming deenergized releases all of its associated armatures to thereby break their individual contacts. The de-energization of relay B permits its associated contact 1268 to become closed, and thus again prepare an energizing circuit for relay A when a channel #1 message is again to be propagated.

Brush arm 1204 thereafter completes its rotation, and brush 1205 successively completes energizing circuits for individual selector magnets 1203 in overlap unit 128'. The energization of start magnet 1335 of unit 128' is so timed as to initiate operation of overlap unit 128' so that the closing of contacts 1346, therein, will be effected after all the selector magnets 1203 have been energized and the transferring operation performed. The propagation of the channel #2 message through the monitor distributor 130 is similar to that of a channel #1 message through distributor 129, hereinbefore fully described.

While the brush arm 1204 thus is again in the stop position, its brush 1207, is in contact with segment 1208 and this time reestablishes an energizing circuit for relay 1210 from positive battery, through ring 1209, brush 1211, brush arm 1204, brush 1207, segment 1208, wire 1249, armature 1214, through contact 1215 (now closed) over wire 1216, through winding of relay 1210 to ground. Energization of relay 1210 again effects closing of its contacts among which, as has been noted, is contact 1217 which upon closing establishes a locking circuit for relay 1210 from ground, through winding of relay 1210, wire 1222, contact 1217, wire 1223, contact 1224, armature 1225, wire 1226, through winding of relay D to positive. This locking circuit, simultaneously establishes an energizing circuit for relay D which when energized attracts its armature 1227 to break contact 1228. Breaking of contact 1228 destroys the common locking circuit for relays C and 1240, thus permitting contact 1319 associated with relay C to close and the contacts associated with relay 1240 to open. The monitor system again is placed in readiness to receive and propagate to the monitor tickers a channel #1 message.

Referring to Figure 43, a load compensating means is also provided for the monitor receiving distributor motor 1347 and is precisely the same in construction and operation as that shown in Figure 42 and previously described in connection therewith, the load compensating means comprising essentially a relay 1348 and resistance 1349. A cut-out switch 1351, which may be manually operated, is provided in line 1213 whereby the monitor receiver may be cut off from the line if desired.

Ticker operation

As previously explained, the monitor tickers 108 of channel #1 will record the outgoing quotations for stocks assigned to this channel irrespective of whether the stocks are in section one or section two thereof. These monitor tickers 108 embody a selective mechanism responsive to the permutation code used in transmitting, and are preferably similar to the ticker mechanism shown and described in the co-pending application referred to above, in which a case selecting condition is added to each code combination of selecting conditions. The tickers 108 of the present system differ, however, from that disclosed in said co-pending application in that a novel typewheel is provided whereby the range indexes of the stock are printed on the ticker tape. This typewheel preferably has the range index designations or symbols disposed in the "Figures" case of the typewheel.

By the use of this novel ticker mechanism with the range symbols added thereto, a novel ticker tape such as shown in Figure 11 is produced having the additional range symbols thereon. Such mechanisms may be used on existing ticker circuits over which signals are transmitted to effect printing of the "high," "low" and other additional information not now printed on ticker tapes. By providing receiving distributors similar to 125 (Figures 1 and 43) connected to line 119 by way of a relay 1201, and distributors similar to monitor distributor 129 connected directly to the receiving distributor, ticker circuits may be provided for operating tickers 108 at any desired point in the system. In such circuits, channeling device 126 and overlap units 127, 127' and 128, 128' may be eliminated, since each ticker connected in such circuits should give complete quotations for all stocks. In this way the improved tickers above described may be operated by signals from the same line which transmits complete quotations for stock board operation so that properly edited quotations will appear on the ticker tapes. It will be understood that it is not necessary to provide a receiving distributor 125 and a ticker distributor 130 for each ticker. One such installation may be made in each locality where the edited ticker service is desired. Each single ticker circuit will then be operated by the incoming code signals which operate the stock boards, and any number of tickers may be connected in such circuits.

Each such ticker so connected into the line will therefore record all stocks quoted over the line 119 irrespective of the channels to which the stocks were arbitrarily assigned for the purposes of transmission. Thus the same system for operating complete quotation boards may also be used to transmit and operate stock tickers to produce edited ticker tape records of the transactions.

Operation of complete transmitting system

In operation of the transmitting system so far described, incoming quotations are received on tickers 106. The stocks are arbitrarily divided into channel #1 and channel #2, and the "high and low" editors telephone the proper high-low designation of each stock to editors 112. An editor 112 is assigned to each channel section, and a different group of stocks is assigned to each editor 112. Each editor 112 indicates on tape 111 issuing from his ticker 106 the stocks to be transmitted over his channel section with their "high," "low," and similar designations. The operator 113 for each channel section then transmits the quotations marked on his tape 111.

With the system at rest, seeker unit 117 is arranged to transfer a message from channel #1 to common overlap units 118a and 118b and relays 901 to 907 are de-energized. We will assume that one keyset operator 113 of channel #1 starts transmitting.

Depression of the first key for the first letter of the stock to be quoted allows cam shaft 135 of the keyset to make one revolution, allowing selective closing of contacts 911 to 915 according to the code signals of the letter, and allowing closing of contact 910. Sequence relay 901 and relay Z are closed and locked, and closed contacts 911 to 915 energize selected magnets 226 of overlap unit 116a. The first stock letter controls the first five selector magnets 226.

Depression of the second letter key energizes magnets 902 and Y, breaking locking circuits for magnets 901 and Z and the second group of five magnets is operated in a similar manner to the first group. Then the third stock letter key is depressed, energizing relays 903 and X and selectively setting the third group of magnets in unit 116a. If a preferred stock quotation is being made, contacts 918, 919, or 920 and 921 are closed by the "First preferred," "Second preferred" or "Third preferred" keys respectively. The sequence relays are not affected by the preferred contacts 918 to 921, but the preferred relays (the last two relays 226 of unit 116a in the present embodiment) are selectively energized.

Normally the operation now continues to the price of the stock by depressing the first figures key for the "tens" quotation, thus closing contact 916 (common to all figures keys), energizing relays 904 and Z and breaking locking circuits of relays 903 and X, and thus transferring the code setting of contacts 911 to 915 to unit 116b. The proper keys are then depressed to set up the units and fractions, causing sequence relays 905 and 906 to connect the keyset contacts 911 to 915 to the units and fractions magnets of unit 116b. Depression of any figures key operates number 6 code bar to close contact 916 to effect the sequential operation of these relays.

The proper range key is depressed completing the message, and a number 7 code bar is operated closing contact 917 and energizing range magnet 907. The range selector magnets of overlap unit 116b are thus set by selected contacts 911 to 915.

Furthermore, range magnet 907 energizes start magnets 196a and 196b for both overlap units 116a and 116b. Contacts 181' of units 116a and 116b are thus selectively closed in accordance with the energization of selector magnets 226.

As previously explained, if the stock designation comprises less than three letters it is not necessary to send blank signals corresponding to the unused letters, since the tens key may be operated at once to start the price portion of a complete quotation. In this case, operation of the tens magnet 904 serves to deenergize all previously energized sequence relays, and set the tens selector magnets of unit 116b.

If the "tens" quotation for the stock being quoted is unchanged, the stock selection is accomplished as above described, following which the "No-reset" key is operated in place of the "tens" key. Depression of this "No-reset" key operates the #6 code bar, and contact 916 is thereby closed to step the sequence relays forward to receive the "units" quotation. Also the "No-reset" key directly closes contact 922 which energizes selector magnet 1030 which is the third of the range group of magnets in unit 116b. The units and fractions are then transmitted as above described, and the sequence relays are positioned to receive the range selection. Assuming that the range is "Last" the "L" key (Fig. 12) will be depressed.

Referring to the table hereinbefore given in which the range keys are grouped in pairs, it will be noted that the "Last (TUF)" key transmits a code signal MSSM. However, due to the previous action of the "No-reset" key the third range magnet 1030 has been actuated so that instead of the transmitted signal being MSSM, it is in reality MSMM, a marking condition for the third element of the code signal having been introduced. Thus the "Last (UF)" is selected. Therefore, by the combined action of the "No-reset" key and the "Last (TUF)" key the actual setting of the range selector magnets 226 is a "Last (UF)," and the index drum 522 of the stock board (Figs. 30, and 31, sheet 14) will be set to release only the units and fractions dials of a "Last" quotation and the tens dial will not be released.

If the quotation does not include a tens value the blank key (BL) is operated in lieu of a tens key which will step the sequence relays to the units portion of the stock quotation.

As a keyset operator 113 completes a quotation message and operates the range key thereof, thereby setting up the complete quotation on his individual overlap units 116a and 116b, he can set up a succeeding quotation on his overlap units 116a and 116b, except for the final or range key depression, as the various magnets 226 of his overlap units may be reset in accordance with a new quotation since the selector levers of magnets 226 are restored as soon as the contact levers of the overlap units are selectively set. However, as hereinbefore set forth in detail, no operator can depress his range key while a quotation is set up on his overlap contacts since until the overlap contacts are restored, the magnet 158 individual thereto will be energized due to the fact that his individual seeker unit relay, for example, relay 1051 will be "ready" or deenergized because the previous quotation has not as yet been transferred from the overlap contacts. The locking circuit for range key lock magnet 153 will remain closed by way of the individual auxiliary relay, for example, relay 1056, until the previous quotation has been transferred to the common overlap units 118a and 118b. When the transfer is effected the auxiliary relay will be deenergized to break the other locking circuit for the range key magnet, and the operator may then depress any range key, completing the succeeding quotation, which will then be set up on his individual overlap units 116a and 116b.

By reference to Figure 1 it will be seen that each keyset 107 has an individual bank of sequence relays 115 and individual overlap units 116a and 116b. It will be understood therefore that any or all keysets 107 may be operated either simultaneously or in any order that the incoming quotations are received. The only limitation on a keyset operator is that he can not set up a second complete quotation before the prior one has been taken off by the seeker unit. It will however be seen that a substantially complete quotation overlap is provided which very materially speeds the transmitting operations.

A complete quotation message is thus stored in overlap units 116a and 116b ready for transfer to the transmitting distributor 121 (Figure 1). It will be recalled that the transmitting distributor 121 stops in the position to transmit a channel #1 message. Therefore when the shaft 177 of overlap unit 116b makes one complete revolution in response to energization of its start magnet 196b by depression of a range key it breaks contact 259 momentarily. This will break the locking circuit for magnet 1051 of section 1, Channel #1, thus de-energizing this magnet and placing it in its "ready" position. The contacts associated with relay 1051 are thus reversed and are brought to the position shown in Figure 41. The positioning of magnet 1051 in its "ready" position will open its contact 1097, breaking the circuit which energizes relay 1159 of the phasing unit (Figure 42). A circuit is thus closed by contact 1161 to start magnet 1059 of the transmitting distributor 121.

Thus the transmitting distributor 121 is automatically started when one of the relays 1051 to 1054 is placed in its "ready" position. In the present example relay 1051 is "ready" since it was assumed that the stock quotation is in section 1, channel #1.

Distributor arm 1062 then rotates until segment 1064 is engaged, when auxiliary relay 1056 and transfer relay 1076 are energized, relay 1076 transferring the setting of the contacts 181' of overlap units 116a and 116b to polar overlap units 118a and 118b respectively. Closing of the contacts 1089 by transfer relay 1076 again energizes relay 1051 by way of wires 1093 and 1094, placing this relay in "not ready" position. Relay 1051 will remain "not ready" until another complete quotation is received and stored in its overlap units 116a and 116b, when shaft 177 of unit 116b will open the locking circuit of relay 1051 by momentarily opening contact 259. Then segment 1102 is engaged by the brush arm 1062, to operate start magnet 1103 of polar overlap unit 118a, whereby positive or negative potential is applied to the first seventeen segments of the distributor 121, in accordance with the setting of the stock selector magnets in overlap unit 118a.

Next, the seeker unit start magnet 1105 is operated by segment 1104. The seeker unit 117 makes one-fourth of a revolution or 90° rotation, opening contact 1041 and closing contact 1042, and breaking the locking circuit for relays 1056 and 1076 by momentarily breaking locking contact 1045. Thus contact 1042 is closed to prepare the transmitting apparatus for a channel #2 message when the same is stored, channel #2 messages being controlled by seeker relays 1053 and 1054.

Next, start magnet 1125 of polar overlap unit 118b is energized by way of segment 1124 of transmitter 121 to apply positive or negative potential on the price controlling segments of the distributor in accordance with the setting of magnets 226' of this unit.

Since the distributor 121 must rotate through at least six revolutions before coming to rest, during its next revolution the distributor will transmit the positive and negative impulses applied to its segments by the polar overlap unit to the outgoing line 119. During this revolution of the distributor seeker unit contact 1042 is closed, and a channel #2 message is transferred to polar overlap units 118a and 118b.

During the previous revolution of seeker unit 117 contact 1045 was momentarily broken to break the locking circuit for relays 1056 and 1076. Thus the section 1, channel #1 keyset operator may now operate a range key to complete a next quotation, since lock magnet 158 is de-energized.

If the seeker relays 1051 to 1054 now are all in a "not ready" or energized position their contacts 1097, 1153, 1155, 1157 are all closed. These contacts are connected in series, thus energizing relay 1159 to stop the distributor 121 after approximately six revolutions since relay 1159 is slow acting and will not operate until distributor 121 rotates six times. Energization of magnet 1159 will place start magnet 1059 under control of phasing contact 1046 whereby when the phasing contact 1046 next opens when the seeker unit 117 operates, the second circuit for start magnet 1059 is broken and distributor 121 is stopped with the seeker unit 117 again in a position to transmit a channel #1 message. Now, when any seeker unit magnet 1051 to 1054 is de-energized to indicate a "ready" condition, magnet 1159 is de-energized whereby the starting circuit for magnet 1059 is closed and distributor 121 again rotates.

It has been previously explained in detail how the seeker unit relays operate to select a channel #1 message alternately with a channel #2 message. The seeker relays are furthermore so arranged that the sections of each channel are taken off alternately if both sections of the channel are "ready." For example, assuming that both sections of channel #1 are "ready" (that is, a complete quotation has been set up by both keysets 107 and completely transferred to their individual overlap units 116a, 116b) when the seeker unit closes contact 1041 of channel #1, then both relays 1051 and 1052 will be de-energized or "ready." Now, when distributor 121 engages segment 1064, the positive impulse through wire 1067 passes to contact 1041, and operates the first section of channel #1, since contact 1071 of relay 1051 is now closed but contact 1133 of relay 1052 is open. Therefore, a channel #1, section 1 quotation is now selected.

Assuming further that after the seeker unit has operated to close contact 1042, thus taking a channel #2 message, and rotates further to close contact 1043, to again take a channel #1 message, and assuming further that again both sections of channel #1 are "ready," the seeker unit will now select section 2 as follows:

The positive impulse over line 1067 now passes through closed contact 1043, contact 1041 being open. This impulse passes over wire 1108 but since the relay 1051 is now "ready," its contact 1096 is open. Therefore the impulse passes to contact 1109 of relay 1052 to thus select the second section of channel #1. The same mode of operation occurs in channel #2, the sections thereof being taken off alternately.

By this novel means of alternatively selecting the messages from those channels and sections thereof which are "ready," it will be clear that no keyset 107 will be tied up while the messages from the adjacent keyset repeatedly are taken off. Of course it will be understood that the seeker relays also operate to take a quotation from either section of a channel that is "ready" irrespective of which contact of that channel is closed. For example, if contact 1041 corresponding to section 1, channel #1, closes when section 1 of this channel is not "ready," then section 2 is selected. Thus there is no loss in time by transmitting a blank message when one section of a channel is "ready," and the other section is "not ready." If this occurs, the "ready" section of the channel is always selected and its message transmitted.

If during transmission the keyset operator 113 depresses a wrong key, he then depresses the "Error" key which closes contact 923 and also operates the number 7 code bar (which is operated also by the range keys) and initiates operation of overlap units 116a and 116b. Error relay 1145 is thus energized to close contacts 1147 and 1148, thus locking up relay 1145. Contact 1148 shunts the contact 259 which controls seeker relay 1051, whereby this seeker relay is not de-energized to indicate a "ready" position. Therefore, the erroneous message is not transferred to the polar overlap unit. Contact 260 is opened immediately following the opening of contact 259 thus again opening or de-energizing the relay 1145.

*Monitor receiver operation*

Referring now to the monitor receiver, Figures 43 and 44, each outgoing message actuates the polar relay 1201 of the monitor receiving system to thereby operate the monitor tickers 108 of channels #1 and 2.

The monitor receiving system is so arranged that stocks quoted for channel #1 are separated and returned to the channel #1 monitor tickers, and stocks quoted in channel #2 are returned to the monitor tickers of this channel, by electrical circuits and relays previously described and operating generally in the following manner.

Since the outgoing signals are of a polar nature they actuate polar relay 1201 to impress marking or spacing conditions on each segment of monitor receiving distributor 125. Remembering that the signals are sent out alternately from channels #1 and 2, always starting with channel #1, the relays of channeling device 126 will be positioned when in° rest condition so as to send first a channel #1 message to the channel #1 monitor tickers. In this condition relays A, B and C are de-energized, and relay D is energized. Also relay 1210 is energized when the brush 1205 is in engagement with stop segment 1206.

Relay 1210 being energized, its contacts are closed for the reception of the stock selection portion of the channel #1 message by way of overlap unit 127. Thus the selector magnets 1203 of overlap unit 127 are selectively energized by the incoming signals as the arm 1204 of receiving distributor 125 passes over the segments 1236.

After magnets 1203 of overlap unit 127 are selectively energized, its start magnet 1245 is energized by way of segment 1244 to close all selected contacts 1248 in unit 127, and also close contacts 1252 and 1253 by properly timed cam mechanism. This energizes start magnet 1255 of monitor distributor 129 and start magnet 1254 of overlap unit 127'.

When relay 1210 closed, it prepared an energizing circuit for relay 1220 by way of contact 1218. Segment 1256 of distributor 125 is next engaged by brush 1207 to complete the energizing circuit for relay 1220. When relay 1220 is closed, the price controlling segments on distributor 125 selectively energize magnets 1203 of overlap unit 127'. When relay 1220 closes, relay A is also closed in the channeling device 126 and these two relays are locked closed. Relay 1210 and relay B are now de-energized by breaking of contact 1224 associated with relay A. Receiving distributor 125 then completes its rotation to selectively energize magnets 1203 of overlap unit 127' in accordance with the price and "High-Low" range of the stock.

The receiving distributor 125 is now in position to transfer a quotation for a stock in channel #2, relay 1230 being now energized by way of stop segment 1206 and contact 1272 of energized relay A. Relay 1230 energizes relay B by way of contact 1316, and these two relays are locked, and relays 1220 and A are de-energized. Contacts 1233 of relay 1230 are thus closed to transfer a channel #2 quotation of polar overlap unit 128. The next revolution of receiving distributor 125 then transfer the stock selection of the channel #2 quotation to the proper segments of distributor 130 of channel #2, as follows: When segment 1244 of the receiving distributor is engaged, start magnet 1264 of overlap unit 128 is energized to thereby energize the associated segments of distributor 130 in accordance with the setting of magnets 1203. Also the start magnet 1335 for overlap unit 128' is energized, as is also start magnet 1255a of distributor 130, these circuits being closed by properly timed camming contacts.

When segment 1256 is contacted the relay 1240 closes its contacts whereby the selecting magnets 1203 of overlap unit 128' may be selectively energized by the incoming signals.

The channeling device 126 automatically operates to transfer from a channel #1 to a channel #2, quotation in sequence, and if a blank message for channel #1 is received the channeling device goes through its cycle of movements transmitting a blank signal, and then transfers and transmits a channel #2 message.

Returning now to the monitor distributor 129, brush arm 1277 is initiated in rotation when start magnet 1255 is energized by way of the timed contact in overlap unit 127. In the stop position of monitor distributor 129, a marking or stop condition is impressed on the line 109' to stop monitor tickers 108. When the brush arm 1277 starts rotation it impresses a start or spacing impulse on the line which starts monitor tickers 108. The next five segments 1289 of distributor 129 impress selective marking and spacing conditions on the line in accordance with the received signals and then segment 1291 impresses a no-current or spacing impulse, followed by a stop impulse from segment 1292. The next two series of segments also relate to the stock designation in accordance with the received signals to select the second and third letters of the stock, each group of five code signals being preceded by a start (spacing) impulse, and followed by a stop (marking) impulse.

Then the code combination relating to the preferred stock index is transmitted by segments 1294. Then follow the segments relating to the range of the stock, followed by the "tens," "units" and "fractions" designations. The last segment 1285 of monitor distributor 129 is also a stop segment for the complete stock quotation whereby brush arm 1277 transmits a stop impulse after one revolution.

Thus the monitor tickers of channel #1 will be operated to print on their tapes a complete quotation as transmitted. In the meantime, the segments of monitor distributor 130 will be selectively energized and the next quotation will be a channel #2 message which will energize the monitor tickers associated with channel #2.

The outgoing signals for each channel section operate the monitor ticker 108 allotted thereto in the manner above set forth in detail to record only the quotations transmitted in the channel section individual thereto. The monitor tapes 123 and the edited tapes 111 then pass before the checkers assigned to the individual channel sections who compare the outgoing quotations with the edited tapes and immediately correct any errors made by instructing the operator 113 to transmit the correct quotation.

Having described the transmitting end of the system, the receiving circuits and their operation will now be described.

*Electrical circuit for single-step receiving station*

The general arrangement of the apparatus at the receiving station is indicated in Figure 2, and the circuit connections therefor are shown in Figures 45 and 46. The operation of these receiving units will now be described.

Referring to Figure 2, the upper portion thereof shows a receiving station 102 of the single-step type, and the lower portion shows a receiving station 103 of the type using magnetically operated step-by-step indicators. Receiving station 102 will be described first. The code signals transmitted from the distributor 121, Figures 1 and 42, are received by way of line 119 on a receiving relay 1400 and thence pass to receiving distributor 1401, Figure 2. These signals then pass to overlap units 1402 and 1403, unit 1402 being adapted to receive the signals for the selection of the stock, and the unit 1403 adapted to receive code signals for the price designation thereof. The stock selecting code signals operate the selector magnets of unit 1402 to close groups of contacts which are connected to the stock selector 1404, in which the particular stock is selected. Stock selector 1404 is directly connected to the stock board 1409 to energize the magnet of the selected stock.

From the hereinbefore given explanation of the operation of the stock board (Figs. 30 to 33) it will be recalled that solenoid 542 of the selected stock must operate after the price selecting unit has operated. When the price selecting unit operates it positions all index barrels 522 for the selected range, and also operates all vertical shafts 375 or 376 connected thereto (depending upon whether it is a channel #1 stock or a channel #2). After the index barrels have been positioned, it is then necessary to operate the selected stock solenoid 542 to thereby lift the tray member 547 of the selected stock, thus engaging the testing levers 546 thereof with the index barrel. Thus selected latches 568, 569 and 571 are operated to release their indicating drums 519. Therefore, timing units 1405 and 1406 are provided to delay operation of the selected stock solenoid 542 until the price selecting unit has operated. There is a timing unit for each channel since it will be recalled that there is a price selector for each channel; namely, unit 1407 (385) for channel #1 and unit 1408 (385') for channel #2. Therefore, transfer relays 1449 and 1451 are provided to connect the correct timing unit and price selector with price overlap unit 1403, according to which channel the stock being quoted is placed. Each transfer relay 1449 and 1451 is connected to the stock board whereby the selected transfer relay is controlled by the selected stock magnet, stocks in channel #1 controlling transfer relay 1449 and stocks in channel #2 controlling transfer relay 1451.

With this general understanding of the various units making up the receiving station, reference will now be had to Figs. 45 and 46, for a complete description of the electrical connections between the units and their general operation. The receiving distributor 1401, Fig. 45, is provided with a receiving relay 1400 connected to the incoming line 119 whereby armature 1412 is caused to vibrate in accordance with the received code signals. The distributor has a rotating brush arm 1419 adapted to be released by a start magnet 1410. When a start impulse is received over line 119, start magnet 1410 of distributor 1401 is energized from positive battery, through start magnet 1410, wire 1414, contact 1415, armature 1412 to ground.

Overlap units 1402 and 1403 are similar to the overlap units shown in Figs. 17 to 19, and fully described hereinbefore. Similar reference characters are therefore used to indicate like parts. Furthermore, the stock selector 1404 is shown in detail in Figs. 20 to 22, and the detailed operation thereof has been given hereinbefore. Also the price selectors 1407 and 1408 have been fully described in connection with Figures 23 to 29, and the stock board 1409 has been described in connection with Figures 3 and 4, and Figures 30, 31 and 32. Therefore, similar reference characters will be used for similar parts of these various units.

It will be recalled that the transmitting distributor 121 transmits first the code signals for the selection of the stock, followed by the range index thereof, and then the tens, units, and fractions of the price. Therefore, the signals will be received over line 119 in the same order, and the first seventeen segments of the receiving distributor 1401 are adapted to select the stock. The first seventeen segments of receiving distributor 1401 are connected by individual wires 1417 to the seventeen selector magnets of overlap unit 1402. When marking impulses are received over the line, circuits are completed to effect energization of selector magnets 226a and 226b in overlap units 1402 and 1403 in the following manner.

If the first impulse after the start impulse is of a marking nature, an energizing circuit for the first selector magnet 226a in stock selecting overlap unit 1402 is completed from positive battery, over wire 1416, winding of first magnet 226a, its individual wire 1417, through first segment 1418, brush 1420 (which is now in contact with segment 1418) brush arm 1419, ring 1421, wire 1422, contact 1423, tongue 1412 to ground. The other selector magnets 226a in overlap unit 1402 are similarly affected successively as brush 1420 engages the next sixteen segments if marking impulses are received. If spacing impulses are received, the energizing circuits for the selector magnets 226a are broken at 1423 and consequently the magnets are not energized.

Selector magnets 226b of the price and range unit 1403 are connected to individual segments of distributor 1401 by individual wires and are similarly set by spacing or marking impulses as received over the line 119 as brush arm 1419 engages their individual segments.

When brush 1420 has passed over all the segments up to and including segment 1425, the selector magnets 226a in overlap unit 1402, will have been either energized or deenergized in accordance with the received code signals to select the stock to be quoted. Simultaneously with the traversing of brush 1420 over approximately the next three segments, the contacting of brush 1426 with segment 1427 causes the energization of clutch trip magnet 196a of overlap unit 1402, which as previously described, initiates operation of the overlap unit 1402, to close the selectively determined contacts 181a. The energizing circuit for magnet 196a is completed from positive battery, through winding of magnet 196a, wire 1429, segment 1427, brush 1426 through ring 1431 to ground.

The remaining segments from 1425 to 1432 inclusive are electrically connected to the selector magnets 226b in overlap unit 1403 for the range and the price. Contemporaneously with the passing of brush 1420 over segments 1425 to 1432 the mechanical operation of overlap unit 1402 is taking place, closing the selected contacts 181a to complete individual circuits from positive battery over wire 1433, through selected contacts 181a, individual wires 1434, windings of individual selector magnets 287 in the stock selector unit 1404, over wire 1435 to ground. The message set up in the overlap unit 1402 and thus transferred to the selector magnets 287 in the stock selector 1404 represents the abbreviation of the particular stock selected. Overlap unit 1402 is operated before unit 1403 for the reason that the energization of stock selector magnets 287 must have been selectively determined before the initiation of operation of stock selector unit 1404, as will presently appear.

Now, when brush 1426 of distributor 1401 passes over segment 1438 energizing circuits are completed for clutch trip magnets 196b and 304 in overlap unit 1403 and stock selector 1404, respectively. Thus the mechanical operations of overlap unit 1403 and stock selector 1404 are initiated simultaneously. The selection of a particular stock selection bar to effect closing of its associated contact 355 is accomplished by the coincidence of a series of aligned notches in a group of code bars, following which setting the stock bars are released to allow the selected bar to close its contact 355, as fully described hereinbefore.

Energizing circuits for magnets 196b and 304 are completed from positive battery, windings of magnets 196b and 304, over wires 1444 and 1445, segment 1438, brush arm 1419, ring 1431 to ground.

The mechanical operation of overlap unit 1403, hereinbefore described, effects closing of its selectively determined contacts 181b to prepare energizing circuits for selector magnets 436a and 436b of price selectors 1407 and 1408 of channels #1 and #2 respectively, which energizing circuits are executed or controlled by multiple contact transfer relays 1449 and 1451 respectively, as will presently appear.

Since two price selecting units 385 are provided at the receiving station, one for the stock in channel #1 and one for the stock in channel #2, it is necessary that there be a selection between these two price selectors, in accordance with which channel the stock being quoted is assigned. For this purpose, therefore, each contact 355 of stock selector 1404 closes a circuit which includes its individual stock solenoid 542 and a contact which determines the selection of the proper price selecting unit 1407 or 1408.

Referring to Figure 46, it will be noted that each stock selecting solenoid 542 may be connected to either wire 1457 for price selecting unit 1407 of channel #1, or to wire 1511 for price selector unit 1408 of channel #2. Furthermore, it will be noted that the wire 1457 is multipled to similar contacts associated with each stock selector solenoid 542, as is also wire 1511.

If the particular selecting solenoid 542 is in the category of stocks included in channel #1, it will be connected to wire 1457 to therefore energize the circuit for channel #1 price selector 1407. On the contrary, if the stock is in channel #2, its solenoid 542 will be connected to wire 1511 for channel #2 price selector 1408. It will be recalled that the stock bars 293 and 293' (Figs. 20-22) may be disconnected from the stock selector and a different stock bar substituted therefor. Furthermore, the individual units 374 making up the stock board (Fig. 4), may be disconnected from the stock board and different units substituted therefor. Therefore, it is necessary that means be provided whereby each individual contact 355 of stock selector 1404 may be connected to either channel #1 price selector or channel #2 price selector. For this purpose, each stock solenoid 542 is connected in a circuit having a manually adjustable switch 1456' which may be connected to contact 1455 multipled to wire 1457 for channel #1, or which may be connected to contact 1456 multipled to wire 1511 for channel #2. Thus ready interchangeability of the stock selector bars and the stock units is provided, and if the stock being removed was in a different channel from the stock which is being inserted on the board, the contacts 1455 and 1456 may be arranged accordingly to connect the newly inserted stock to its proper channel.

Assuming that the stock selected is included in the category of stocks comprising channel #1 individual contacts 355a in the stock selector 1404 are closed substantially simultaneously with selectively determined contacts 181b in price determining overlap unit 1403. The closing of contact 355a completes an energizing circuit for relays 1452 and 1453 from positive battery over wire 1442, contact 355a, wire 1450, winding of relay 1453, wire 1454, through winding of marginal stock selecting solenoid 542a, contact 1455 (now closed), wire 1457, through winding of relay 1452 of channel #1 price selector 1407, wires 1458 and 1459, through resistance 1461, contact 1462 of timing unit 1405 (now closed) to ground. Incidentally, contact 1462 is normally closed, but is opened by cam 1460 for a very short interval toward the end of the cycle of operations of the timing unit 1405, as will hereinafter appear. Energization of relay 1453 will effect closing of its associated contact 1463 to complete a locking circuit for relays 1452 and 1453 from positive battery over wires 1464 and 1465, through contact 1463 and over the previously described circuit through relays 1453 and 1452, resistance 1461 and contact 1462 to ground. Energization of relay 1452 will effect closing of its associated contacts 1466 and 1467 to complete energizing circuits for start relay 1468 of price selector 1407 and transfer relay 1449 respectively, to be presently described.

In order to prevent operation of stock solenoid 542 at this time, for the reason hereinbefore explained, each solenoid 542 is marginal and does not operate until resistance 1461 is shunted out by the closing of contact 1469, as will presently appear. The closing of contacts 1466 completes an energizing circuit for relay 1468 from positive battery over wire 1471, through contact 1466, over wire 1472, through winding of relay 1468, resistance 1473 to ground. The energization of magnet 1468 effects the closing of its associated contact 1474 to complete the power supply circuit for motor 387a. Resistance 1473 is provided in order to prevent excessive current flow through relay 1468, when this relay is connected to the power line for motor 387a, as shown. Thus it is apparent that the motor 387a, which supplies the motive power to effect the mechanical transference of the price and range selection to the stock board, as seen in Figures 23 and 24 and fully described hereinbefore, is operated intermittently; that is, only at the time a stock price is to be changed, thus obviating the necessity of running the motor continuously.

Closing of contact 1467 by relay 1452 completes an energizing circuit for transfer relay 1449 from positive battery through winding of relay 1449, wire 1476, contact 1467, wire 1477, contact 1478 of timing unit 1405 to ground. Incidentally contact 1478 is normally closed, and is opened toward the end of the cycle of operation of timing unit 1405 by its associated cam 1479. Energization of magnet 1449 effects the closing of its associated contacts 1481, to complete energizing circuits for selector magnets 436a prepared by the aforementioned selectively determined contacts 181b of price overlap unit 1403. For example, a circuit will be completed from positive battery over wire 1433, through individual contact 181b, over associated wires 1483 and 1484 through individual contact 1481, wire 1485, through winding of individual selector magnet 436a, wire 1486 to ground. Selector magnets 436a thus are energized to effect the selection by means of code disc selectors in a manner hereinbefore set forth, of the price and range of the particular stock.

It will be recalled (see Figs. 23 and 24) that each price selector embodies four selecting units 415, 416, 417 and 418. Each unit has four selector magnets 436 for selectively positioning the notched disks thereof. Unit 415 selects the range of the stock, unit 416 selects the "tens" value of the price, unit 417 the "units" value, and unit 418 the "fractions" value. These units are designated 415a to 418a for channel #1 and 415b to 418b for channel #2.

Suitably mounted on the mainshaft 177 in the overlap unit 1403 are timing cams 1489 and 1491 adapted to co-act with contacts 1492 and 1493 respectively. These cams and contacts may be similar to cam 258 and contacts 259 and 260, Fig. 19. Contact 1493 controls the energizing circuit for clutch trip magnets 397a and 397b which initiate the mechanical operation of the price selectors for channels #1 and #2, respectively, as hereinbefore clearly described. The energizing circuit for magnet 397a is at first prepared by closing of contact 1488 associated with transfer relay 1449 and is executed by the closing of contact 1493 thus completing the circuit from positive battery through winding of magnet 397a, wire 1496, contact 1488, wire 1507, through contact 1493 to ground.

When the selected price selector is thus operated, the main shaft 407 (Fig. 23) is rotated, and cam 404 causes the feeler levers 428 to engage the previously set armature levers 433. The disks 423 are thus selectively moved to new positions, releasing each stop arm 452 which in rotating to a new position, drives its gear 384 and corresponding shafts connected thereto. Thus each index barrel 522 (Figs. 30 and 31) is set, and driving shafts 375 and 376 are rotated to new positions.

Contact 1492 controls the energizing circuit for clutch trip magnets 1499 and 1501, which initiate the operation of timing units 1405 and 1406 for channels #1 and #2, respectively. The energizing circuit for magnet 1499, for example, is at first prepared by the closing of contact 1487 associated with transfer relay 1449 and is executed at the proper time by the closing of contact 1492 thus completing the circuit from positive battery, over wire 1504, through winding of magnet 1499, over wire 1505, through contact 1487, over wires 1506 and 1498, through contact 1492 to ground.

The final operation in the cycle consists in the energization of selected solenoid 542 sufficiently to render it operative. This operation is controlled by the timing unit 1405 and is effected by the closing of contact 1469 at the proper time, which causes resistance 1461 to be shunted out and thereby permit a mentioned circuit from positive battery over wires 1464 and 1465, contact 1463, winding of relay 1453, wire 1454, through winding of solenoid 542, contact 1455, wire 1457, winding of relay 1452, wire 1458, through contact 1469 (which is now momentarily closed) through contact 1462 to ground. The effect of the energization of solenoid 1455 will clearly appear hereinafter. The last step in the cycle of operations of the timing unit is to open momentarily the contacts 1462 and 1478 to break all of the previously described circuits, and place the apparatus in readiness to receive the succeeding quotation. Should the succeeding quotation represent a stock in channel #2, contact 355b, for example, of stock selector 1404 will close; and since the circuit is closed over contact 1456 of channel #2, the circuit will be completed over wire 1511 and through winding of magnet 1512 instead of over wire 1457 and through magnet 1452 as previously described for channel #1. Of course, it is apparent that each stock may be connected to either channel #1 or channel #2 by opening contact 1456 and closing contact 1455, or by opening contact 1455 and closing contact 1456. The respective circuits in channel #2 are similar to those previously described in channel #1 and need not here be traced.

Referring to Figure 45, it is observed that a load compensating means for motor 1515 is provided, which means comprises essentially a relay 1516 and a resistance 1517, the function and operation of which is substantially the same as that hereinbefore described in connection with Figure 42.

*Operation of single step receiving station*

The single step receiver shown in Figures 45 and 46 operates in the following manner: Normally in the position of rest the parts will be as shown in Figures 45 and 46. When a start condition is received over line 119, receiving relay 1400 will move tongue 1412 into engagement with contact 1415, thus completing an energizing circuit for start magnet 1410 of receiving distributor 1401. When distributor arm 1419 starts rotating the load compensating device including relay 1516 and resistance 1517 operates as previously described to prevent motor 1515 from speeding up at the start.

As marking or spacing conditions are received over the line, the first seventeen stock selecting segments of distributor 1401 are energized or de- energized, and since these segments are directly connected by individual wires 1417 to selector magnets 226a in stock overlap unit 1402, the individual selector magnets 226a are selectively energized in accordance with the received code signals.

When segment 1427 is engaged by brush 1426, start magnet 196a of overlap unit 1402 is energized. As previously explained in detail, this overlap unit then operates and its bail closes the selected contacts 181a. Contacts 181a are connected by individual wires 1434 to magnets 287 of stock selector 1404. Therefore, trip levers 278 (Fig. 21) are selectively tripped in accordance with the code combination of signals.

Selector magnets 226b of the price overlap unit 1403 are similarly selectively energized as brush arm 1419 continues its rotation. When segment 1438 is engaged, start magnet 304 of stock selector 1404 is energized, as is also clutch trip magnet 196b of the price overlap unit 1403. Operation of the stock selector 1404 causes rotation of main shaft 296 (Figs. 20 to 22) and the first operation is a release of the previously set permutation bars 272 which are freed to move to their new positions in accordance with the tripping of the selector magnets 287. The permutation bars 272 are then again locked and the selector levers 274 are restored to position whereby the next selection may proceed. Next the stock selector bars 293, 293' are released to permit one stock bar to close its individual contact 355.

Assuming that the selected stock is in channel #1, a circuit will be closed to the selected stock solenoid 542, and its corresponding locking magnet relay 1453, from positive battery over wire 1442, closed contact 355, wire 1450, relay 1453, wire 1454, solenoid 542, contact 1455, common wire 1457, relay 1452, wires 1458 and 1459, resistance 1461, contact 1462 to ground. Due to resistance 1461 the stock solenoid 542 does not operate at this time.

However, closing of contact 1466 of relay 1452 energizes start magnet 1468 for motor 287a of channel #1 price selecting unit 1407. Furthermore, closing of contact 1467 of relay 1452 energizes transfer relay 1449 of channel #1.

While these circuits are being closed by stock selector 1404, price overlap unit 1403 operates and the setting of magnets 226b is transferred by way of individual wires 1483, wires 1484, contacts 1481 of transfer relay 1449 (now energized) to selectively energize selector magnets 436a of the price selector 1407. Had the stock to be quoted been in channel #2 the transfer relay 1451 would have been energized to transfer the setting of overlap unit selector magnets 226b to the price selector 1408 for channel #2.

Thus the selector magnets 436a are selectively energized to determine the range of the stock and the tens, units and fractions value of the quotation. Since start magnet 397a of the price selecting unit has not yet been energized, the individual units of the price selector do not yet operate.

The next step in the operation is closing of contacts 1492 and 1493 to energize the start magnets for the timing unit 1405, and the price selector 1407, respectively. Cams 1489 and 1491 which operate contacts 1492 and 1493 are mounted on and driven by the main shaft 177 of overlap unit 1403 and are so timed that the contacts engage only after correct timing intervals to allow the preceding operations to take place.

Cam 1491 operates first to allow its contact 1493 to close, thus energizing start magnet 397a of the price selector 1407 by the closed contact 1488. It will be understood that if transfer relay 1451 is energized instead of transfer relay 1449 the closing of contact 1493 will energize start magnet 397b of price selector 1408 for channel #2.

When the price selector 1407 operates, cross shaft 407 (Fig. 23) is driven to rotate individual shafts 421 of the four selector units 415, 416, 417 and 418. Cam 404 then operates link 475 to oscillate the bell cranks 431, moving the selector fingers 428 into engagement with the previously set armature levers 433. The discs of each selector unit are thus positioned in accordance with the setting of their armature levers and a new rod 446 drops into aligned notches of said discs. Thus each stop arm 452 is released for rotation, clutch 450 is engaged and stop arm 452 and its gear 384 rotates to a new position, when the newly-selected rod 446 disengages clutch 450 and stops rotation of arm 452 and its gear 384.

Rotation of gear 384 for the range of the stock causes corresponding rotation of the horizontal shaft 379 and all range controlling vertical shafts 377 connected thereto. See Fig. 24, Figs. 3 and 32. Thus all index barrels 522 of the selected channel (in this instance channel #1) are rotated to a position in accordance with the received code combination selecting the range of the stock to be quoted. Furthermore, horizontal and vertical shafts connected to the tens, units and fractions selector units also rotate to selectively determined positions, thus tensioning all springs 532 (Fig. 33). However, at this time all dials are still latched in their stationary position and cannot move.

Now the system is in position to allow the stock selecting solenoid 542 to operate. This is accomplished by closing contact 1492 operated by cam 1489 of overlap unit 1403. Closing of contact 1492 energizes start magnet 1499 of timing unit 1405. It will be clear if transfer relay 1451 is closed instead of relay 1449 that contact 1492 will energize start magnet 1501 of timing unit 1406 for channel #2. Rotation of the timing unit 1405 first allows closing of contact 1469 to shunt resistance 1461, thus allowing sufficient current to pass through the stock selecting solenoid 542 to operate the same.

Referring to Figs. 30 to 33, operation of the selected solenoid 542 moves the tray member 547 upwardly to engage the feeler levers 546 with the previously set index barrel 522. In accordance with the openings 545 in index barrel 522 encountered by lugs 556 of the feeler levers 546, certain latches 568, 569 and 571 are released. Thus one or more groups of indicators 519 corresponding to the stock to be quoted are released whereby the drums 524 thereof rotate to the selective position determined in accordance with the previous rotation of their shafts 515, 516 and 517. As previously explained in detail, if the quotation includes a hundreds digit, the hundreds dial is operated by the tens dial for the initial quotation, and a second quotation is then sent to set the tens, units and fractions dials. Since only one stock solenoid 542 is energized it will be clear that no other dials will be released for rotation and therefore the quotation will be set upon only one stock unit 374 corresponding to the selected stock.

Further rotation of timing unit 1405 opens its contacts 1462 and 1478 to break the locking circuits for the previously selected stock solenoid 542 and the transfer relay 1449. After one rotation the timing unit is stopped until its start magnet 1499 is again energized.

In the meantime shaft 177 of overlap unit 1403 will have completed its rotation, returning the cams 1489 and 1491 to the positions shown, breaking contacts 1492 and 1493. The parts are thus returned to their initial position.

It will be understood that subsequent quotations may be received and set up on the overlap unit 1402 and 1403 while the above operations are taking place, since the overlap units are so constructed that their selector levers are reset immediately following each initial operation of these units. The stock selector 1404 also resets its latches at once, and opens the previously closed contact 355. However, the circuit for the selected stock solenoid 542 is locked closed by its relay 1453. Therefore, a complete overlap is provided whereby reception of quotations may be continuous.

The mechanical operations involved in the various units making up the single step receiver above described will be clearly understood from the description of each unit hereinbefore given.

Having described in detail the single step receiver, a description will now be given of the electrical connection for the step-by-step receiving station 103 (Fig. 2).

*Electric circuit for step-by-step receiving station*

The electrical circuits pertaining to the modification of the present invention in which electro-magnetically operated step-by-step indicators are employed will now be described. These circuits are shown in Figures 47 and 48, and also diagrammatically at 103 in Fig. 2.

It will be noted from Figure 2 that the single step receiver 102 and the step-by-step receiver 103 may be operated from the same incoming line 119, and the same signals operate both types of receivers. Furthermore, the ticker circuits previously described in detail are operated by the same signals from incoming line 119. It will thus be apparent that a very flexible system is employed in which various types of novel receiving apparatus herein shown and described may be connected to a single circuit, and the same signals will operate all the various types of receiving mechanisms connected to the line. It will be understood that other types of receivers may be connected to line 119 and may be operated by the same signals.

The general arrangement of the units making up the step-by-step receiving station 103 of Fig. 2 will now be described. A receiving distributor 1601 is provided which is generally similar to receiving distributor 1401, and upon which incoming signals are received from line relay 1600.

The first group of signals pertaining to the selection of the stock pass to overlap unit 1602 and then to the stock selector 1604 which is similar in character to stock selector 1404 previously described.

The incoming signals pertaining to the price of the selected stock operate overlap unit 1603, and the setting thereof operates either translating unit 1605 or 1606 depending upon whether the quotation is in channel #1 or channel #2. The selected translating unit 1605 or 1606 then operates the step-by-step dials of the selected stock on stock board 1609. With this general outline of the system in mind, a description will now be given of the specific circuit connections between the various units, reference being had to Figures 47 and 49.

The signal impulses as they are received over line 119 operate relay 1600 of receiving distributor 1601 and cause the tongue 1634 to vibrate in accordance therewith. Circuits are thus completed through contact 1610 of relay 1600 to cause selective energization of magnets 226a and 226b of overlap units 1602 and 1603 in a manner similar to that described in connection with the single step receiver, Fig. 45. When spacing impulses are received over line 119 the individual circuits for selector magnets 226a and 226b are broken by engagement of tongue 1634 with contact 1635.

It will be recalled in connection with Figures 35 to 40 that the selection of the range of the stock must be made before the price thereof is selected. Therefore, the range selecting magnets 226a are positioned in the stock overlap unit 1602 since this unit operates before the price selecting unit 1603. The first twenty-one segments of distributor ring 1612 are therefore connected by individual wires 1649 to the twenty-one selector magnets 226a in overlap unit 1602.

It will be noted that when brush 1643 has traversed the first twenty-one numbered segments of ring 1612, the actuation of selector magnets 226a in overlap unit 1602 will have been selectively determined. Simultaneously with the traversing of brush 1643 over the next three segments, numbered 22, 23 and 24, the contacting of brush 1654 with segment 1655 causes energization of clutch trip magnet 196a of overlap unit 1602, which as previously described, initiates the mechanical operation of the overlap unit to close the selectively determined contacts 181a. The energizing circuit for magnet 196a is completed from positive battery, through winding of magnet 196a, wire 1657, segment 1655, brush arm 1629, ring 1658 to ground.

The first seventeen contacts 181a of overlap unit 1602 are connected to their individual selector magnets 287 in stock selectors 1604, 1604a by wires 1640. Any number of stock selectors 1604, 1604a may be provided depending upon the size of the stock board and the number of stocks quoted thereon. Each wire 1640 is multipled by wire 1650 to its corresponding selector magnet in each stock selector. It will be understood that although various selector magnets 287 in the stock selector units may be energized, only one stock bar 293 (Figure 22) will be released to close its contact 355.

The remaining segments of ring 1612 from #22 to the stop segment 1646 are electrically connected to the selector magnets 226b in overlap unit 1603, the operation of which is initiated electrically, as will presently appear. When brush 1643 is engaging segments #29, 30 and 31, brush 1654 engages segment 1659 which is connected to clutch trip magnets 304 and 304a in stock selectors 1604 and 1604a. Energization of these magnets is effected by completing circuits from ground, through ring 1658, brush arm 1629, segment 1659, wires 1665 and 1666, windings of respective magnets 304 and 304a to positive battery, thus initiating the mechanical operation of all stock selectors 1604, 1604a connected to the receiving distributor.

Bus bars 1667 and 1668 control the stocks included in channels #1 and #2, respectively, and all channel #1 stock contacts 355 are connected to bus bar 1667 and contacts 355' of channel #2 stocks are connected to bus bar 1668.

Each indicator recess in the stock board is provided with contacts for both channel #1 and channel #2, and the indicator units 701 may be so inserted that they contact with the desired bus bar in accordance with which channel the stock is assigned. For this purpose there is provided for each unit a manually adjustable switch 1690 similar to switch 1456' previously described in connection with price selectors 1407 and 1408. Referring to Figure 48, wires 1660 control the group of indicator units 1671 in channel #1, and wires 1670 control a similar group 1697 in channel #2. Wires 1660 and wires 1670 lead to the translator units 1605 and 1606 respectively, the function of which has been previously set forth.

The message set up in overlap unit 1602 represents the abbreviation of the stock and the range index, the contacts 181a associated with wires 1669 determining the range. Overlap unit 1602 is operated before overlap unit 1603 for the reason that the particular stock indicator unit 1671 or 1697 and range index therein must be selectively determined and put in readiness for exhibiting the price, as will be presently set forth, which is controlled by overlap unit 1603. Contacts 181a in unit 1602, which determine the stock, are electrically connected by wires 1640 and 1650 to their respective selector magnets 287 in the several stock selectors, 1604, 1604a, etc. Selector magnets 287 of the stock selectors thus are energized in accordance with a predetermined cycle of code combinations and effect selection of the proper stock selector bar, in a manner previously set forth, to close its associated contact 355. Closing of a contact 355 of channel #1 completes an energizing circuit for marginal stock relay 1673 from ground, through windings of marginal relay 1673, wire 1674, through contact 355, over the channel #1 bus bar 1667, through winding of relay 1675, through resistance 1680 and over wires 1676 to positive battery. Energization of relay magnet 1675 causes closing of its contact 1703 to effect the operation of translating unit 1605 of channel #1 as will presently appear. Relay 1673 has not at this time become energized to close its associated contacts 1700 due to the presence of resistance 1680 in the circuit. Magnet 1675, on the other hand, requires only a comparatively weak current for its actuation. However, the closed stock selecting contact 355 remains closed until an actuating current for relay 1673 is passed through it, as will presently appear.

It will be understood that there is a marginal stock relay 1673 for each stock of channel #1, and a similar stock relay 1698 for each stock of channel #2, each such stock relay being connected by individual wires 1674 or 1699 to its individual stock selecting contact 355 or 355'.

If a stock in channel #1 is selected relay magnet 1675 will be energized, since it is connected to common bus bar 1667 of channel #1, and effect the closing of its associated contact 1703 to complete a circuit from positive battery through wire 1706, contact 1703, wire 1707, contact 813 of translating unit 1605 (which is normally closed), wire 1708, through winding of clutch trip magnet 793a of translating unit 1605 to ground. Energization of magnet 793a thus initiates operation of translating unit 1605 of channel #1, as previously described; the sequence of the electrical functions of which is as follows.

Contacts 719, 728, 812 to 814 and 816 are operated by properly timed cams 801 to 806 in the translating unit and are illustrated in Figure 38. Similar contacts in unit 1606 likewise are operated by similar cams, when this unit operates for a channel #2 quotation.

The first contact to be momentarily closed in unit 1605 is contact 812, which completes an energizing circuit for clutch trip magnet 196b in overlap unit 1603, from positive battery through winding of magnet 196b, wires 1731 and 1729, through contact 812 to ground. Magnet 196b thus will become energized and cause the initiation of the mechanical operation of price overlap unit 1603, in a manner previously described. Thus certain contacts 181b in unit 1603 will become closed in accordance with the received message impressed on selector magnets 226b of unit 1603. Immediately following the initiation of operation of over-lap unit 1603, contacts 1738 and 1739 therein become closed. These contacts are cam operated and correspond to contacts 259 and 260, Fig. 19.

Closing of contact 1738 will complete an energizing circuit for the selected marginal stock relay 1673, which circuit by shunting out the high resistance 1680, previously mentioned, will now permit sufficient current to be impressed upon magnet 1673 to enable it to actuate its associated contacts 1700. This circuit is completed from positive battery through contact 1738, in overlap unit 1603, wire 1741, over channel #1 bus bar 1667, closed stock contact 355, over wire 1674, through winding of selected relay 1673 to ground. A locking circuit for stock relay 1673 is completed immediately from ground through winding of said magnet 1673, wire 1678, through closed contact 1679, wires 1681, and 1682, through contact 814 (which is now closed) in translating unit 1605, to positive battery. Contact 355 is thereafter broken as the stock selector completes its cycle of operation and again comes to rest in its normal position, as hereinbefore disclosed.

As previously noted, the range selection is impressed on range selector magnets 740a and 740b in units 1605 and 1606 respectively, over wires 1669, at the time that the stock overlap unit 1602 is operated. Wires 1669 are multipled to range selector magnets 740a of translating unit 1605 and to range selector magnets 740b of unit 1606. Thus both the groups of range selector magnets are positioned to select the range of the stock being quoted. However, since only one translating unit is to be operated, it will be clear that the setting of the range selector magnets of the other translating unit will have no effect.

From Figures 35 to 40, showing the translating unit, it will be recalled that selector magnets 740 for range selector 744 do not have their armature levers 750 locked and therefore these armature levers at once assume their newly selected positions upon energization of the range selector magnets. Now when start magnet 793a of translating unit 1605 operates, it being assumed that the present quotation is in channel #1, cam 766 and main drive shaft 742 of the unit is rotated. Cam 766 at once carries feeler levers 760 for the range selector 744 into engagement with the armature levers 750 thereof. As previously described in detail, the discs of this range selector 744 at once assume their new positions and its stop arm 770 rotates to a newly selected position thus driving the range selecting unit 791, Fig. 35, by way of gears 787 and 788. Resultant rotation of shaft 789 carries the various range selecting cams 851 to new positions in accordance with the code combination selecting the range of the stock quoted. Cam 795 now allows rotation of the bail 843, Fig. 39, and the feeler levers 824 are positioned in accordance with the setting of the range selecting cams 851. Then the transfer levers 829 engage the feeler levers 824 to reposition the contacts 855 for selecting the range of the stock.

Referring again to Fig. 48, various ones of the contacts 855a of translating unit 1605 will thus close. It should be understood that if the quotation being made involves a change in the hundreds digit, the upper contact 855a of unit 1605 will be closed to change the hundreds indicator unit 701. In some instances two groups of the contacts 855a will be closed, to change the quotations for two horizontal rows of indicators 701. For example, if a quotation is the "last" and also a "high" for the day, both the "last" and "high" sets of indicators should be simultaneously changed. Thus two groups of the contacts 855a will be selectively closed by their cams 851.

It will be understood that the range controlling contacts 855a and 855b are multipled to all stock units such as 1671 and 1697. However, due to the fact that only one stock controlling relay such as 1673 or 1698 is energized, only one group of dials for the selected stock will be energized.

Now the selected dials of the selected stocks may be pulsed back to blank position in order to reposition them for the new quotation.

Immediately following the closing of contacts 855a, each of the restoration contacts 723 is closed ten successive times by cam 725 to effect the restoration of the selected indicator units 701 (Figure 34), to blank positions, as previously described. The closing of contacts 723 completes individual circuits from positive battery through contacts 723, over wires 1716 to 1721 through closed contacts 855a, over wires 1660, through closed contacts 1700 of the selected stock magnet 1673, through windings of magnets 702 of selectively determined indicator units 701 in selected stock unit 1671, through contact 717, ring 714, over wire 1723 to ground.

As previously described in connection with Figure 34, contacts 717 and 718 are automatically affected after the indicator drums 703 (Figure 34) have been rotated in a step-by-step manner to their blank position. The purpose of thus affecting contacts 717 and 718 is to effect the restoration of the indicator drums to their blank positions, preparatory to rotating each drum step-by-step from the blank postiion to the succeeding selection. No matter what position the drums have assumed in their previous selected position, the ten restoring impulses sent through contacts 723 will be of sufficient number to actuate selected magnet 702 until the drum has returned to "blank," at which time the contact 717 will be automatically affected; and the surplus of restoring impulses, resulting from the difference between the number of impulses required to rotate the drum from its previous position to the blank position and the ten transmitted impulses, will have no effect, since the circuit thus prepared by contact 717 remains ungrounded until subsequently completed by the closing of the actuating ground contact 719, as previously described in connection with Figure 34.

During the period while the selected indicator drums were being restored to their blank positions, the stop arms of selectors 745, 746 and 747 for the tens, units, and fractions, respectively, are mechanically restored to their normal or blank position as previously described. That is, the selector levers 760 (Fig. 36) will have engaged armature levers 750, which are in their blank position. Each stop arm 770, Fig. 36, is released and returned to blank position. In so doing the contacts 722T, 722U, 722F (analogous to contacts 722, Fig. 34) will be opened and closed successively but no impulses will be sent to the selected indicator drums, contact 728 being open at this time. Thus the selected dials are returned to blank positions, and the tens, units and fractions selectors 745, 746 and 747 are also returned to their blank position.

The next step is to selectively energize selector magnets 740a of selectors 745, 746, 747, thus preparing for the new selection on the dials. The first step in this operation is closing of contact 816 of translating unit 1605 which completes an energizing circuit for transfer relay 1733 from positive battery, wire 1734, winding of relay 1733, wire 1735, contact 816 to ground. From an inspection of Figure 47, it will be apparent that transfer relays 1733 and 1733' are associated with translating units 1605 and 1606, respectively. It will also be apparent that the contacts 181b of the price overlap unit 1603 are multipled by wires 1737 through contacts 1736 and 1736' associated with the two transfer relays 1733 and 1733'. Therefore, if the stock to be quoted is in channel #2 and translating unit 1606 for channel #2 is being operated, transfer relay 1733' will be energized at this time to set the selector magnets 740b for a channel #2 quotation by way of translating unit 1606.

The energization of relay 1733 causes the closing of its associated contacts 1736. The closing of contacts 1736 complete circuits from positive battery, through the closed contacts 181b in overlap unit 1603 (which contacts have been closed in accordance with the tens, units and fractions figures of the received quotation, as previously mentioned), over individual wires 1737, through associated contacts 1736, windings of associated selector magnets 740a of units 745, 746 and 747 to ground. Certain of magnets 740a thus become energized, thereby selectively determining, in a manner hereinbefore described, the number of times contacts 722T, 722U and 722F are to be successively opened and closed to transmit actuating impulses to the individual indicator units 701 of group 1671.

Preceding the pulsing of contacts 722T, 722U and 722F, contact 728 is caused to be closed. Simultaneously therewith, contact 719 is momentarily closed to complete an initial energizing circuit for the selected dial magnet 702 prepared, as previously mentioned, by contact 717; this circuit being completed from positive battery through contact 728, contacts 722T, 722U and 722F, through previously closed contacts 855a, wires 1660 and 1742, through closed contacts 1700, windings of individual magnets 702, and their associated contacts 717 and 718 (now both engaging tongue 716, Fig. 34) over wires 1743, 1744, through contact 719 to ground. Only the first actuating impulse traverses this circuit; because, after the first impulse has actuated an individual magnet 702, its contact previously made between contact 717 and individual extension 716 is again broken and contact between contactor 717 and individual ring 714 is automatically made to complete the following energizing circuit for each selected dial magnet 702; from positive battery through contact 723, through contacts 722T, 722U and 722F, through closed ones of contacts 855a over wires 1660 and 1742, through contacts 1700, through windings of individual magnets 702, and thence through their associated contacts 717, through ring 714, over wire 1723 to ground. The remaining actuating impulses through contacts 722T, 722U and 722F will follow this circuit. The circuit through contactor 718 will remain open until the sending of restoration impulses, as previously described.

Referring to Figure 48, it is noted that stock unit 1697 is controlled by channel #2 in a manner similar to unit 1671 in channel #1. In the case of unit 1697, however, the closing of a particular contact 355' (Figures 22 and 47) will initiate the operation of translating unit 1606 by completing an energizing circuit for relay magnet 1702, from positive battery over wire 1677, through resistance 1745, through relay 1702, over channel #2 bus bar 1668, through contact 355', over wire 1699, through winding of stock relay 1698 to ground. For the same reasons as pointed out hereinbefore in connection with relay magnet 1673, relay 1698 will not actuate its associated contacts 1746 until contact 1739 in overlap unit 1603 is caused to be closed thus shunting out resistance 1745.

The operation of translating unit 1606 for channel #2 is initiated by the closing of contact 1704 in a manner similar to the initiation of operation in unit 1605 and the sequence of operations is identical thereto.

Referring to Figure 47, it is noted that a load compensating device for motor 1751 is provided, which comprises essentially a relay 1752 and a resistance 1753, the function of which is the same as that previously set forth in connection with Figure 42.

The various units (represented by rectangular outline) and the circuits comprising Figures 1 and 2 having been described in detail, the system diagrams there shown now assume their full significance.

Operation of step by step receiver

The operation of the receiving station shown in Figs. 47 and 48 is as follows. The code signals are received over line 119, said signals consisting of marking or spacing conditions which are successively impressed on the segments of distributor ring 1612. The start impulse energizes the distributor start magnet to allow rotation of distributor 1601, the load compensating resistance 1753 preventing initial excessive speed. The received code signals are thus transferred to selector magnets 226a and 226b of the stock and price overlap units 1602 and 1603. When start magnet 196a of unit 1602 is energized by segment 1655, various contacts 181a are closed in accordance with the code signals to thus energize selectively the magnets 287 in stock selectors 1604, 1604a, etc.

Next segment 1659 of distributor 1601 is engaged and start magnets 304, 304a of stock selectors 1604, 1604a are energized. Although only two stock selectors 1604, 1604a are shown it will be understood that as many such selectors are provided for a complete installation as are necessary. Operation of the start magnets of the stock selectors allows these units to operate to close one contact 355 or 355'. All contacts 355 for channel #1 are connected to bus bar 1667 and channel #2 contacts 355' are connected to bus bar 1668.

Assuming now that the quotation is for stock ABC, "High," 45½, and further that stock ABC is assigned to channel #1. Therefore, the corresponding contact 355 will be closed and an energizing circuit will be prepared for stock relay 1673. However, each stock relay is marginal and relay 1673 will not operate at this time due to the inclusion of resistance 1680 in its circuit.

Relay 1675 for channel #1 is energized each time a channel #1 stock contact 355 is closed and, therefore, contact 1703 is closed, and translating unit 1605 for channel #1 is initiated in operation by energization of start magnet 793a. Next, contact 812 of translating unit 1605 closes to energize start magnet 196b of price overlap unit 1603. Contacts 1738 and 1739 at once close, contacts 1738 shunting resistance 1680 out of the circuit of the selected stock relay 1673. Therefore, sufficient current passes through this relay to energize it, closing contacts 1700 and 1679, and contact 1679 locks selected stock relay 1673 by way of contact 814 in the operated translating unit 1605.

The range selecting magnets 740a and 740b of range selectors 744a and 744b of both translating units 1605 and 1606 will have been previously set when their contacts 181a of the stock overlap unit closed. Therefore, magnets 740a of selector 744a (since the stock in the example given is in channel #1) will have selectively positioned their armatures to select a "High" quotation. Operation of translating unit 1605 causes the range selector 791 (Figure 39) to operate the cams 851 so that contacts 855a for a "High" quotation are closed. If it is desired to simultaneously change any other row of dials, for example, the "Last" row, the contacts 855a for the "Last" dials will also be closed at this time, the "H L—" key (Figure 12) being operated instead of the "Hi" key.

The system is now in position to pulse the selected dials back to blank position. Therefore, pulser 725 now engages contacts 723 to step the selected dials of the selected stock back to blank position.

In the meantime selectors 745a, 746a and 747a for the tens, units and fractions, respectively, have returned to their blank position due to operation of translating unit 1605. Contacts 722 associated with these units will be closed during this operation, but no impulses will be transmitted to the dials, since contact 728 at this time is open. Next, the selected setting of the price selector magnets 226b is transferred to selector magnets of units 745a, 746a and 747a by closing of transfer relay 1733 which is accomplished by closing of cam operated contact 816.

The dials are now ready to be stepped to their new positions. Cam operated contacts 728 and contact 719 are now closed. The translating unit 1605 now lifts selector levers 760 (Figure 36) into engagement with their armature levers 750, and stop arms 770 for the "tens," "units" and "fractions" selectors 745a, 746a and 747a assume their new positions, and their contacts 722T, 722U and 722F are closed accordingly. That is, contact 722T will be closed four times for the digit "4," contact 722U will be closed five times for the digit "5," and contact 722F will be closed four times for the fraction ½. These impulses are transmitted to the selected dials of the selected stock by way of closed contacts 855a and closed contacts 1700 to set the dials in their new position to indicated 45½, in a manner hereinbefore described in detail.

Each of the various units making up the receiving station returns to its initial position in accordance with the hereinbefore given description of the operation of the units. As previously explained in detail, a complete overlap of operations is provided whereby receiving of quotations may be continuous. If a channel #2 quotation is received, the above operations are carried out by way of translating unit 1606. If the user of a stock board desires to receive quotations of a different stock, one of the magnets 1673 may be connected to the proper stock selecting contact 355 for the new stock and subsequent quotations for this stock will actuate the dials of the units associated with magnet 1673.

Although certain portions of this invention have been described in detail, it will be clear other various units and parts may be substituted for those shown. Furthermore, the various units shown and described in detail are obviously capable of use in other combinations than that shown herein. Although this invention has been described in connection with and applicable to a stock price quotation system, it will be clear that it is not limited to such use, being adapted for use in any system for the distant transmission of intelligence.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to be secured by Letters Patent is:

1. In a telegraph system, a plurality of channels, a plurality of transmitting units for each channel capable of simultaneous operation for establishing message matter and each arranged to transmit messages having equal numbers of impulse intervals, a channel common to said channels, means for successively shifting from a transmitting unit of one channel to a transmitting unit of another channel, establishing a communicative condition with the common channel and for rendering the other transmitting units likewise effective, a plurality of receiving devices connected to said common channel, and means to associate invariably certain of said receiving devices with corresponding ones of said transmitting units.

2. A system for telegraphic transmission of a series of messages over a multiplex system; a transmitter mechanism assigned to each channel; a transmitting distributor common to all transmitters; signal storage means connected thereto; and a seeker unit embodying means to connect said storage means in sequence with said transmitter mechanism under control of an operative condition of its associated transmitter and independent of the signals transmitted.

3. In a multiple-channel telegraph system for the transmission of a plurality of messages which are divided into groups for transmission, a plurality of transmitters, a group of said transmitters associated with each channel; means in each transmitter to transmit a series of code signals representing a message; a single transmitting distributor; a seeker unit comprising means to associate said distributor with successive groups of said transmitters in sequence; means to test in rotation the transmitters in a group; and means to connect said distributor to a transmitter in which a series of code signals has been stored.

4. A system for multiple-channel telegraphic transmission comprising a plurality of transmitting units assigned to each channel, each transmitting unit embodying a keyset, a storage device adapted to receive and store a complete message, and means to associate said storage device with said keyset, a single transmitting distributor; and a seeker unit responsive to an operative condition of said transmitting units embodying means to connect said transmitting distributor in sequence with the transmitting units of said channels.

5. In a multiple channel telegraph system, a plurality of keysets for each channel; a storage device for each keyset; a single transmitter; a seeker unit adapted to successively associate the common transmitter with the storage devices of said channels; and means to automatically connect said transmitter with any storage device of a channel in which a complete message is stored.

6. In a telegraph system, a plurality of keysets; message storing devices connected with each keyset; a common transmitter; a switching device adapted to successively associate said transmitter with each of said storing devices, and means operated independently of any of said key sets but under control of a predetermined condition of activity on the part of at least one of said key sets for impelling said device.

7. In a telegraph system, a plurality of keysets; message storing devices individual to each keyset; a common transmitter; a seeker device for successively associating said transmitter with each of said storing devices; and means operative following the operation of each keyset for locking said keyset from operation until said seeker device has effected the association of said transmitter and the storing device individual to said keyset.

8. In a telegraph system, a plurality of groups of keys; signal storage devices individual to each group responsive to non-polar signals; a common transmitter; a seeker device for successively associating said transmitter with each of said storage devices; and a common signal storage device intermediate said seeker and said transmitter for changing said non-polar signals to polar signals.

9. In a telegraph system, a plurality of transmitters; a common transmitting distributor having itinerant communication with said plurality of transmitters; means to start said distributor by the setting up of a message on any transmitter; and means operative to stop said distributor when no message is set up on any transmitter, said last-named means maintaining operation of said distributor for a predetermined number of transmission intervals after all transmitters have no messages set up thereon.

10. In a telegraph system, a plurality of transmitters for transmitting messages each composed of a plurality of groups of code impulses; a distributor common to said plurality of transmitters for transmitting the groups of code impulses initiated by said transmitters; means to connect said transmitters to said distributor in succession; and means operative to stop said distributor invariably in position to transmit a message from certain of said transmitters.

11. The invention as defined in claim 10, in combination with means to start said distributor by the setting up of a message on any transmitter.

12. In a telegraphic transmission system comprising a plurality of transmission channels; a plurality of transmitters for each channel; a common transmitting distributor having itinerant communication with said plurality of transmitters; means for connecting said distributor with the transmitters of the channels in succession; and means for invariably stopping said distributor in position to transmit a message from one of said channels.

13. In a quotation board, a plurality of indicator mechanisms; two sets of operating means for said indicator mechanisms, including shafts adapted to be driven by each operating means; and means to connect each indicator mechanism to the shafts of either operating means.

14. In a telegraph system, an overlap unit comprising a series of contacts, a series of primary control members, a series of secondary contact control members, means to operate selectively the primary members in sequence, means to operate simultaneously the selected secondary members and set the contacts in combinations corresponding to the setting of the secondary members; a selector comprising a series of code elements; and means to simultaneously set said code elements according to the setting of said contacts, said selector being adapted to select a number of members greater than the number of code elements.

15. In a communication system for quotation code signals identified with an item and the price thereof, said items being divided into groups, a telegraph circuit, a receiving distributor connected to said circuit, a pair of storage devices, one for storing the signals relating to the item selection and the other for storing the signals relating to the price, all as received by said distributor from said circuit, an item board having a plurality of indicators for each item, each indicator being normally latched in position, means for selecting certain indicators of any item by signals stored in said item selection storage device, a plurality of channels, a plurality of price selectors for operating selected indicators, one for each of said channels, means for selecting in accordance with signals stored in said item signal storage device the price selector of the channel to which the item being quoted is assigned, means operated by the selected price selector for conditioning all indicators of its price selector for operation as determined by the signals stored in the price storage device, and means thereafter responsive to the operation of the indicator selecting means for unlatching certain of the conditioned indicators of the selected item for resetting.

16. In a communication system for code signal messages divided into groups, each message being divided into two portions, a telegraph circuit, a pair of storage devices responsive to the signals transmitted over said circuit, one for storing the signals of one portion of each message and the other for storing the signals relating to the other portion thereof, an item board having a plurality of indicators for each item, each indicator adapted to be stepped to indicating position by electrical impulses, means for selecting certain indicators of one item by signals stored in one storage device, a plurality of channels, a plurality of translating units, one for each channel, each unit adapted to transmit over its channel impulses determined by the operation of the storage device for the other portion of the message to the selected indicators, means responsive in accordance with the indicator selecting portion of the message for selecting the translating unit of the channel to which the item being quoted is assigned, and means operated by said translating unit for pulsing the selected indicators to selected new positions in accordance with the code signals stored on the storage device for the second portion of the message.

17. In a communication system for quotation code signals identified with selecting an item and the price thereof, said items being divided into groups, a telegraph circuit, a pair of storage devices responsive to the signals transmitted over said circuit, one for storing the signals relating to the item selection and the other for storing the signals relating to the price, an item board having a plurality of indicators for each item, each indicator adapted to be stepped to indicating position by electrical impulses, means for selecting certain indicators of one item by signals stored in one of said storage devices, a plurality of channels, a translating unit for each channel, each unit adapted to transmit over its channel impulses determined by the operation of the storage device for the price part of the message to the selected indicators, means responsive in accordance with the indicator selecting portion of the message for selecting the translating unit of the channel to which the item being quoted is assigned, and means operated by said translating unit for pulsing the selected indicators to blank positions and thereafter pulsing them to selected new positions in accordance with the code signals stored on the price storage device.

18. In a telegraph system for the transmission of messages, each message composed of a plurality of code signals; a series of contacts corresponding in number to the number of code elements comprising said signals; a corresponding series of primary control members; a corresponding series of secondary control members; means to operate selectively the primary members in sequence; means to operate selectively the secondary members simultaneously and set the contacts in combinations corresponding to the setting of the secondary members; said setting means adapted to set said contacts in accordance with a preceding message while said primary members are selectively operated in accordance with a next succeeding message.

19. A transmitter including a rotatable shaft, a stop arm secured to said shaft, a plurality of stop members individually selectable to be brought into stopping position with said arm, a set of notched discs rotatably positionable to permutatively select one of said members by affording to it an alignment of notches into which it may be received, and means to transmit electrical code signals in accordance with the positions in which said shaft and stop arm is arrested.

20. In a telegraph transmitter, a rotatable element, means to stop said element in each of a plurality of positions including a plurality of circumferentially disposed stop members and a set of notched discs variously positionable to individually select said members into stopping position by presenting an alignment of notches thereto, and means to transmit electrical signals in accordance with each position at which said element is stopped.

21. In a telegraph transmitter, a selector mechanism including a rotatable element, means to stop said element in each of a plurality of positions including circumferentially disposed stop members, a set of notched permutation discs positionable to individually select one of said members into operative position, means to transmit electrical impulses in accordance with each of said stop positions, a set of key levers, and means under electrical control of said key levers to position said set of discs.

22. In a telegraph transmission system, a plurality of circuits, transmitting apparatus individual to each circuit for issuing messages thereover including a set of levers, and means for generating messages consisting of electrical impulses generated permutably for each character of the message in accordance with the variable operation of said levers, a storage device individual to each of said circuits for momentarily retaining the permutably arranged impulses generated by the transmitting apparatus individual thereto, a transmission circuit common to said circuits, transmitting apparatus in said transmission circuit, and means for successively rendering each of said storage devices in which a message is stored operative with the transmitting apparatus in said transmission circuit and for avoiding the operative connection of the storage devices therewith when no message is stored therein.

23. In a transmission system, a main circuit, a transmitter connected to one end of said circuit and arranged to transmit variable messages, a plurality of tributary circuits to which said main circuit is common, each tributary circuit including means to determine the messages to be communicated to and transmitted by said transmitter, a device for bringing each of said tributary circuits into communication with said transmitter including a seeker apparatus continuously operative during the communicative condition of any of said tributary circuits, means for completing electrical connection between said transmitter and conditioned ones of said tributary circuits successively, means for suspending the activity of said seeker apparatus during the non-communicative condition of any of said tributary circuits, and a receiver connected to the other end of said main circuit for recording the variable messages from said transmitter.

24. In an indicating device, a plurality of rotatable indicators, a shaft upon which said indicators are carried, individual spring elements for imparting a torque to said indicators, stop members secured to said shaft for cooperation with said indicators, engagement means carried by said indicators and effective to cooperate with said stop means upon encountering them in one direction and for being deflected upon encountering them in the other direction, release members individual to each indicator, and a coded member operative by its selective position to permit certain one or ones of said release members to be released simultaneously.

25. In a transmission system, a plurality of transmitting devices each including means for generating variable impulse signals comprising a plurality of characters constituting a complete message, a transmitting distributor having capacity for accommodating one of said devices for transmitting all impulses for all characters of a message during each complete rotation, means for associating each device with said distributor during consecutive rotations, a receiving distributor in synchronism with said transmitting distributor, a plurality of receiving mechanisms corresponding in number to said transmitting devices and each having means for recording all of the characters of a message transmitted by said devices, and means for associating consecutive rotations of said receiving distributor with predetermined ones of said receiving mechanisms.

26. In a telegraph system, a plurality of transmitting devices each including means for generating variable impulse signals comprising a plurality of characters constituting a complete message, a rotary distributor having capacity for accommodating all of the signals of one of said devices and for a complete message during each complete rotation thereof, means for associating each device with a corresponding rotation of said distributor in predetermined sequence, a rotary receiving distributor in synchronism with said transmitting distributor, a plurality of receivers corresponding in number to that of said transmitting devices and each having means for recording all of the characters of a message transmitted by said devices, and means for associating each of said receivers with a corresponding one of said transmitting devices during associative rotations of said transmitting and receiving distributors.

27. In a transmission system, a transmitting distributor and a receiving distributor each adapted to continuous cyclic rotation, a plurality of transmitters corresponding in number to the predetermined number of consecutive cycles of said transmitting distributor, a plurality of receivers corresponding in number to the predetermined number of consecutive cycles of said receiving distributor, means including said distributors responsive to a communicative condition of any of said transmitters for associating therewith the corresponding one of said receivers, and means responsive to a non-communicative conditions of any of said transmitters for substituting in its stead and during its predetermined cycle another of said transmitters.

28. A display board including a plurality of rows of indicating devices, motor means for imparting rotative motion to said device, stop means individual to each of said devices for arresting said devices in various radial positions, a rotatable member having various coded portions radially disposed thereof, means for selectively positioning said member, and elements controlled by said various coded portions for correspondingly releasing certain ones of said stop means.

29. In combination, a plurality of indicators, motor means tending to actuate said indicators, a plurality of release means for said indicators, a rotatable drum having coded solid and open portions along its elements, and feelers associated with each of said means and disposed in a longitudinal position adjacent said drum so that in accordance with the registration of each coded element opposite said feelers certain ones of said release means may be operated for releasing said indicators.

30. In a telegraph system, a plurality of groups of keys, means for generating electrical impulses in accordance with the actuation of each of said keys, a set of storage devices individual to each group of keys for storing signals generated thereat, a transmitter having the cyclic signaling capacity of one of said groups of keys, a seeker for successively associating said transmitter with each of said storage devices, and a set of storage devices intermediate said seeker and said transmitter for providing an overlap in the transmission thereat.

31. In a telegraph transmission system, a plurality of tributary circuits, a plurality of transmitters one included in each of said tributary circuits for generating for each operation equal length permutation signals each indicative of a character of a message, a storage device individual to each transmitter including instrumentalities for storing the permutation signals generated by operation of said transmitters, a storage device common to said plurality of storage devices for storing the recited signals, switching means for progressively associating each of said plurality of individual storage devices with said common storage device whereby the permutation signals stored in said individual storage devices will be transferred to said common storage device, a circuit common to said tributary circuits, and means for transmitting to said common circuit the signals stored in said common storage device.

32. The combination set forth in claim 31 including a transmitting distributor for releasing over the common circuit the permutation signals stored in said common storage device.

33. In a signaling system, a source of signals comprising a plurality of groups of character code signals transmitted in continuous succession, a receiving distributor arranged to receive said signals during a predetermined time interval, and means associated with said distributor for retransmitting said plurality of groups of signals over a substantially longer time interval.

34. In a signaling system, a source of signals comprising a plurality of groups of character code signals transmitted in continuous succession, a receiving distributor arranged to receive said signals during a predetermined time interval, and means associated with said distributor for applying additional signal conditions to said received signals and retransmitting said plurality of groups of signals over a substantially longer time interval.

35. In a signaling system, a source of signals comprising a plurality of groups of character code signals transmitted in continuous succession, a receiving distributor arranged to receive said signals during a predetermined time interval, means associated with said distributor for retransmitting said signals over one channel during a substantially longer time interval and means for receiving signals on said receiving distributor, corresponding to another message, during the difference in said time intervals, for retransmission over another channel.

36. In a signaling system, a source of signals, a distributor having receiving segments corresponding to a plurality of groups of character code signals received during each revolution of the distributor, two sets of storage elements associated with said distributor each set arranged to store impulses identified with a plurality of characters, means for applying signals received on said receiving segments alternately to said sets of storage elements during successive revolutions of the distributor and retransmitting means associated with each set of storage elements for transmitting the character signals stored in said sets of storage elements.

37. In a signaling system, a source of signals, a distributor having receiving segments corresponding to a plurality of character code groups of signals received during each revolution of the distributor, two sets of storage elements associated with said distributor each set arranged to store impulses identified with a plurality of characters, means for applying signals received on said receiving segments alternately to said sets of storage elements during successive revolutions of the distributor, and separate retransmitting means associated with each set of storage elements arranged to retransmit the character signals stored in said sets of storage elements.

38. In a signaling system, a source of signals, a distributor having receiving segments corresponding to a plurality of character code groups of signals, two sets of storage elements associated with said distributor, means for applying signals received on said receiving segments alternately to said sets of storage elements during successive cycles of operation of the distributor, and separate retransmitting means associated with each set of storage elements arranged to insert printer control conditions in each character code group of signals and to retransmit said signals over a period in excess of the period of reception thereof.

39. In a signaling system, a source of signals, a distributor having receiving elements, a plurality of sets of storage elements associated with said distributor each set arranged during a single revolution of said distributor to store signals for a plurality of characters, and transfer relays controlled by said distributor during each revolution thereof for applying signals received on said receiving elements to said sets of storage elements in succession during successive revolutions of the distributor.

40. In a signaling system, a source of signals, a distributor having receiving elements, a plurality of sets of storage elements associated with said distributor each set arranged to store signals identified with a plurality of successive characters during a single revolution of said distributor, and transfer relays controlled by said distributor during each revolution thereof for applying signals received on said receiving elements with said sets of storage elements in succession during successive revolutions of the distributor.

41. In an apparatus of the character described, the combination of a receiving distributor, a set of storage devices for storing pulses received over said distributor, a pair of retransmitting devices, a pair of printers, circuits adapted to be made across one of said retransmitting devices for operating one of said printers to print information stored in certain of said storage devices, and circuits adapted to be made across the other of said retransmitting mechanisms for controlling the other of said printers to print information stored in the other of said storage devices.

42. In a signaling system, a source of signals, a distributor arranged to receive a plurality of groups of character code signals during one cycle of operation thereof, and means associated with the distributor for retransmitting said groups of character code signals during two cycles of operation of the distributor.

43. In an apparatus of the character described, the combination of a receiving distributor, a set of storage devices for storing pulses received over said distributor, a pair of retransmitting devices, a pair of printers, circuits adapted to be made across one of said retransmitting mechanisms for operating one of said printers to print information stored in certain of said storage devices, and circuits adapted to be made across the other of said retransmitting mechanisms for controlling the other of said printers to print information stored in the other of said storage devices.

44. In a signaling system, a source of signals comprising a plurality of series of groups of code signals transmitted in continuous succession, a receiving distributor arranged to receive said series of signals in succession, means associated with said distributor for retransmitting the first series of signals received over a particular one of a plurality of channels and for retransmitting the next series of signals received over another of said channels.

45. In a signaling system, a source of signals comprising a plurality of groups of code signals transmitted in continuous succession, a receiving distributor arranged to receive said signals during a predetermined time interval, a plurality of storage elements for said signals equal in number to the number of impulses transmitted in such continuous succession, and means for repeating said signals from said storage elements over a substantially longer time interval.

46. In a signaling system, a source of signals, a distributor arranged to receive a plurality of groups of character code impulses during one cycle of operation of said distributor, a single set of storage devices equal in number to the number of character code impulses received by said distributor during one cycle of operation of said distributor, and means associated with said storage devices for retransmitting said groups of character code impulses during a time period equal to the time of two cycles of operation of said distributor.

47. In a stock quotation system, a receiver comprising a single receiving distributor, a stock quotation board comprising two sections, each section including a plurality of groups of electromagnetically operated indicators, means operable during each operation of said distributor by signals received over said distributor for selecting any group of indicators on either of said sections for operation, means associated with each section and responsive to impulses received for storing signals corresponding to the price to be set up on the selected indicators, means for directing said impulses into the price storage means associated with the section including the chosen indicators, and impulse controlling means individual to each of said price storage means for operating the selected indicators under control of said price storage means whereby the selected indicators on either section may be operated while selection and price information is stored for the selection and operation of indicators on the other section.

48. A telegraph system comprising a lane of traffic, a number of transmitters operable in predetermined order each transmitter including a plurality of elements and means for setting said elements in varying permutations to determine the variable message to be transmitted over the lane of traffic and normally occupying the full lane time. means independent of the transmitter for entering one or more additional transmitters onto the lane, said additional transmitters when entered assuming their proper share of the lane time and determining the variable messages to be transmitted through their operation, receivers corresponding to the transmitters, and means connected to said lane and operating in response to the messages transmitted for causing each receiver to receive the message of its corresponding transmitter.

49. A telegraph system comprising a lane of traffic, a transmitting station associated with said lane and provided with a plurality of transmitters each adapted to transmit variable messages, a receiving station associated with said lane and provided with a plurality of intelligence receivers identified with said transmitters, said transmitting station including a sequence device operable through successive positions individual to each transmitter for determining their order of operation, means for preparing an additional transmitter for entrance on the lane, means for operatively associating the entering transmitter with the lane when the sequence device reaches the position assigned to the entering transmitter, and means for causing the receiver corresponding to its transmitter rendered effective through operation of its transmitter.

50. A telegraph system comprising a lane of traffic, a plurality of keyboard devices each embodying a plurality of elements arranged to be set in varying permutations to determine variable messages of communication, a signal storage means for each keyboard device for storing the messages from said devices, a sequence device serving to determine the order of the release of message signals from said storage means, means for transmitting the variable message signals stored in said storage means over said lane of traffic, receivers corresponding to the keyboard devices, and means connected to said lane and operating in response to the messages transmitted for causing each receiver to receive the message of its corresponding keyboard device.

51. A telegraph system comprising a lane of traffic, a plurality of transmitters, means for entering any of said transmitters for communication over said lane, a signal storage means common to said transmitters, a sequence device serving to determine the order of transfer of signals from said transmitters to said storage device, and a distributor operatively connected to said storage device for transmitting the impulses stored therein as a result of the operation of said transmitters.

52. A telegraph system comprising a lane of traffic, a plurality of transmitters each embodying a plurality of elements arranged to be set in varying permutations and arranged to store and determine selectively the variable message matter for subsequent transmission, means for operatively associating said transmitters with said lane successively so that each transmitter occupies its proportionate share of the full lane time for the transmission of characters stored in said transmitters, means for entering with said associated transmitters another transmitter for transmission of variable message matter stored therein over said lane when the full lane time will be divided equally among said several transmitters, receivers corresponding to the transmitters, and means connected to said lane and operating in response to signals transmitted over said lane for causing each receiver to receive the variable message matter transmitted by its corresponding transmitter through the permuted operation of elements embodied therein.

53. In a telegraph system, a plurality of transmitters, a single set of transmitting contacts operable in cycles, a sequencing device having means individual to each of said transmitters for operatively and invariably associating one of said transmitters with said contacts during each cycle of operation thereof and selective means for varying the number of transmitters operable in turn over said contacts.

54. In a telegraph system, a plurality of transmitters, a lane of traffic, a sequencing device having elements individual to each transmitter for operatively associating said transmitters in succession with said lane of traffic, control means for each transmitter, means for selecting said elements in cyclic order to complete circuits for said control means successively and means for passing over predetermined of said elements to select a succeeding one whereby the transmitter individual to said passed-over element is rendered ineffective to transmit signals of any kind over the lane of traffic.

55. In a telegraph system, a lane of traffic, a plurality of transmitters, a distributor operating in cycles to transmit over said lane of traffic permutation signals originating at one of said transmitters and local impulse means associated with said distributor for operatively associating one of said transmitters with said distributor and for selecting another transmitter for association therewith on a succeeding transmitting cycle thereof.

56. In a telegraph system, a lane of traffic, a plurality of transmitters operatively associated with said lane and normally occupying the full lane time, means for preparing an additional transmitter for entry on to the lane and a timing device for determining the time of entry of said additional transmitter, said additional transmitter when entered assuming its proper share of the lane time.

57. In a telegraph system, a plurality of substations associated with a central station, a lane of traffic extending from said central station to a remote station, means for transmitting from any of said sub-stations over said lane of traffic and means for varying the rate of transmission from each substation in accordance with the number of substations transmitting.

58. In a telegraph system, a plurality of transmitters, a transmitting distributor having a set of contacts common to all of said transmitters, and means for transmitting a single code combination at a time over said common contacts from a variable number of said transmitters in predetermined order.

59. In a permutation code telegraph system a transmitting distributor having a contact for each unit of the permutation code, a single impulse storage device individual to each of said contacts, a plurality of transmitters, means for transferring character signals from each of said transmitters to said impulse storage devices, a sequencing device for determining the order of transfer of said character signals from said transmitters to the storage devices, a lane of traffic and means including said contacts for transmitting each character signal stored in said storage devices over said lane of traffic.

60. In a telegraph system, a lane of traffic, a plurality of telegraph transmitters, a control circuit for each transmitter, a sequencing device having a contact element individual to each transmitter and included in the associated control circuit, means for completing said control circuits successively through said contacts to control said transmitters to transmit character signals at a predetermined frequency over said lane of traffic and selective means for passing over desired ones of said contacts without completing the associated control circuits, whereby to vary the number of transmitters operating over said lane of traffic, the frequency of transmission of character signals over the lane remaining unchanged.

61. In a telegraph system, a lane of traffic, a plurality of transmitters, a sequencing device having an element individual to each transmitter and serving when selected to condition the associated transmitter to transmit character signals over said lane of traffic, means for selecting said elements in predetermined order and selective means for passing by one or more of said elements without conditioning the associated transmitter or transmitters for operation whereby to vary the number of transmitters operating over the lane of traffic while maintaining the frequency of transmission of character signals thereover unchanged.

62. In a permutation code telegraph system, a central station, a plurality of substations, a transmitting distributor at said central station having a set of contacts, said set comprising an individual contact for each unit of the permutation code, means for transmitting character signals from each substation to said main station, a line terminating at said central station and means including said single set of contacts for transmitting each of said character signals in succession over said line.

63. In a telegraph system, a lane of traffic capable of transmitting only a single signal at a time, a plurality of transmitters associated therewith and means including a sequencing device for operating a variable number of said transmitters at different times and dividing the entire lane time between the operating transmitters.

64. A telegraph system comprising a lane of traffic, transmitters associated therewith, means for operating $n$ transmitters to send over said lane of traffic, or $n-1$ of said transmitters as desired, said means including means for utilizing at least a part of the lane time of the inoperative transmitter when $n-1$ transmitters are operative.

65. An expanding channel system comprising a plurality of sources of signals and means for controlling the mixing of the signals including a relay individual to each source of signals, contacts of the relays being in series relation.

66. In a telegraph system, a lane of traffic, a plurality of transmitters associated with said lane of traffic and means for operating a variable number of said transmitters to transmit over the lane and for dividing the capacity of the lane between the operating transmitters, said means including means for connecting each transmitter to the lane of traffic for a definite, predetermined time in a predetermined order.

67. In a telegraph system, a plurality of transmitters, a transmitting distributor having a channel comprising a common set of contacts utilized by all of said transmitters, automatic sub-channeling means operative at regular intervals and independently of signals from said transmitters for transmitting from each of said transmitters through said distributor in a predetermined order, and means associated with said sub-channeling means for varying the number of transmitters utilizing said common set of contacts.

68. In a telegraph system, a plurality of transmitters, a single lane of traffic, a sequencing device, means including said device for associating said plurality of transmitters in succession for definite predetermined periods of time with said lane of traffic to transmit signals from each transmitter thereover, and means for automatically rendering said sequencing device ineffective to associate idle ones of said transmitters with said lane of traffic.

69. In a telegraph system, a lane of traffic, a plurality of transmitters, means operating automatically to channel periodically over said lane of traffic, signals originating at any operated one of said plurality of transmitters, and means acting in timed relation to said automatically operating means for associating an operated one of said transmitters with said operating means and for determining when other transmitters are under operation so as to be associated periodically with said lane.

70. In a telegraph transmission system, a transmitting distributor having a set of contacts communicating with a single channel of traffic, a plurality of transmitters each having a corresponding set of contacts, a sequencing device for associating the contacts of said plurality of transmitters with those of said transmitting distributor in a predetermined succession, and means associated with said sequencing device for eliminating any one of said transmitters from said succession when said transmitter is not being operated.

71. In a telegraph system, a common lane of traffic, a plurality of transmitters, means for channeling each one of said transmitters with said common lane of traffic automatically in accordance with a predetermined sequence, and an apparatus operative in timed relation with said automatic channeling means for selecting for operation said transmitters of said sequence that are in readiness for transmission.

72. In a telegraph system, a plurality of transmitters, a single lane of traffic, a sequencing device, means including said device for associating said transmitters in succession for definite and invariable periods of time with said lane of traffic to transmit for each period of association an invariable number of signals in each transmitter thereover, and means for rendering the sequencing device ineffective to associate selected ones of said transmitters with said lane of traffic.

73. In a telegraph system, a lane of traffic, a plurality of transmitters, means operating periodically to transmit over said lane of traffic a definite and invariable number of signals originating at one of said transmitters for each operation, and means acting in timed relation to said first means for operatively associating one of said transmitters with said first means and for determining the succeeding transmitter to be so associated therewith whereby the said succeeding transmitter transmits the same definite and invariable number of signals.

74. In a telegraph system, a lane of traffic, a plurality of channels each provided with means for generating code telegraph signals, means for varying the number of channels operating over said lane of traffic, means for sending at least one character from an operating channel before transmission from one of the other operating channels commences, and means for causing the operating channels to transmit invariably the same number of character signals for each period an operating channel is connected to said lane of traffic per unit of time.

75. In a telegraph transmission system, a series of transmitters independently operative to issue message signals, a traffic lane common to said transmitters, apparatus for determining when each one of said transmitters is being operated to generate message signals, and a channeling device for normally associating each one of said transmitters with said traffic lane in a preferred sequence and responsive to said determining apparatus for omitting from said sequence transmitters not being operated during any particular period.

76. In an exchange channeling system, a distributor apparatus comprising a continuously operative switch, a series of independent signal generating stations, and means for operatively associating said switch with each one of said signal generating stations, which is active in its function of generating signals, in a contiguous succession and omitting from said contiguous succession any of said stations which is inactive therein.

HOWARD L. KRUM.